(12) United States Patent
Deng

(10) Patent No.: US 8,546,972 B2
(45) Date of Patent: Oct. 1, 2013

(54) VERTICAL WIND POWER GENERATOR

(76) Inventor: Yunhe Deng, Guangzhou (CN)

( * ) Notice: Subject to any disclaimer, the term of this patent is extended or adjusted under 35 U.S.C. 154(b) by 30 days.

(21) Appl. No.: 13/384,239

(22) PCT Filed: Sep. 17, 2009

(86) PCT No.: PCT/CN2009/001041
§ 371 (c)(1),
(2), (4) Date: Feb. 7, 2012

(87) PCT Pub. No.: WO2011/006284
PCT Pub. Date: Jan. 20, 2011

(65) Prior Publication Data
US 2012/0126542 A1 May 24, 2012

(30) Foreign Application Priority Data
Jul. 16, 2009 (CN) .......................... 2009 1 0041159

(51) Int. Cl.
*F03D 9/00* (2006.01)
*H02P 9/04* (2006.01)

(52) U.S. Cl.
USPC .............................................. 290/55; 290/44

(58) Field of Classification Search
USPC ................. 290/44, 55; 415/2.1, 4.1, 4.2, 4.3, 415/4.4, 4.5; 416/7, 132 B; 244/153 R
See application file for complete search history.

(56) References Cited

U.S. PATENT DOCUMENTS

| 4,112,311 A | * | 9/1978 | Theyse | 290/44 |
| 5,146,096 A | * | 9/1992 | McConachy | 290/44 |
| 2009/0096213 A1 | * | 4/2009 | Berglund | 290/44 |

* cited by examiner

*Primary Examiner* — Tulsidas C Patel
*Assistant Examiner* — Thomas Quigley
(74) *Attorney, Agent, or Firm* — Morris Manning & Martin LLP; Tim Tingkang Xia, Esq.

(57) ABSTRACT

A vertical wind power generator comprises a tower column (1), at least one generator unit (2), at least two blades (3), an excitation control device (16), a rotation rectifying device (161), a bidirectional frequency converter (15), flanges (7-13), bearings (4-6), a cooling system, a crane (80) and a lift system. The generator unit (2) comprises a bracket (201), a generator (202) and an exciter (203). The bracket (201) comprises an outer bracket (2011) and an inner bracket (2012). The generator (202) comprises a stator (2021) and a rotor (2022). The exciter (203) comprises a stator (2031) and a rotor (2032). The vertical wind power generator can be manufactured at reduced cost, be rapidly started, improve the utilization efficiency of wind power, have a better cooling effect on the generator (202) and increase its operating life, and therefore reduce maintenance cost and time.

17 Claims, 16 Drawing Sheets

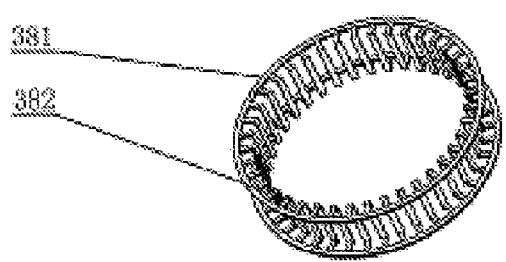
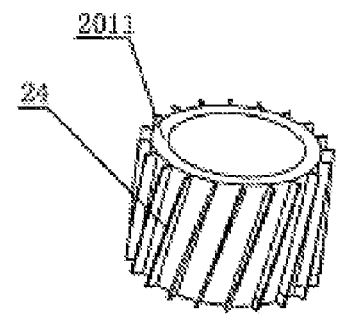
fig. 14   fig. 15
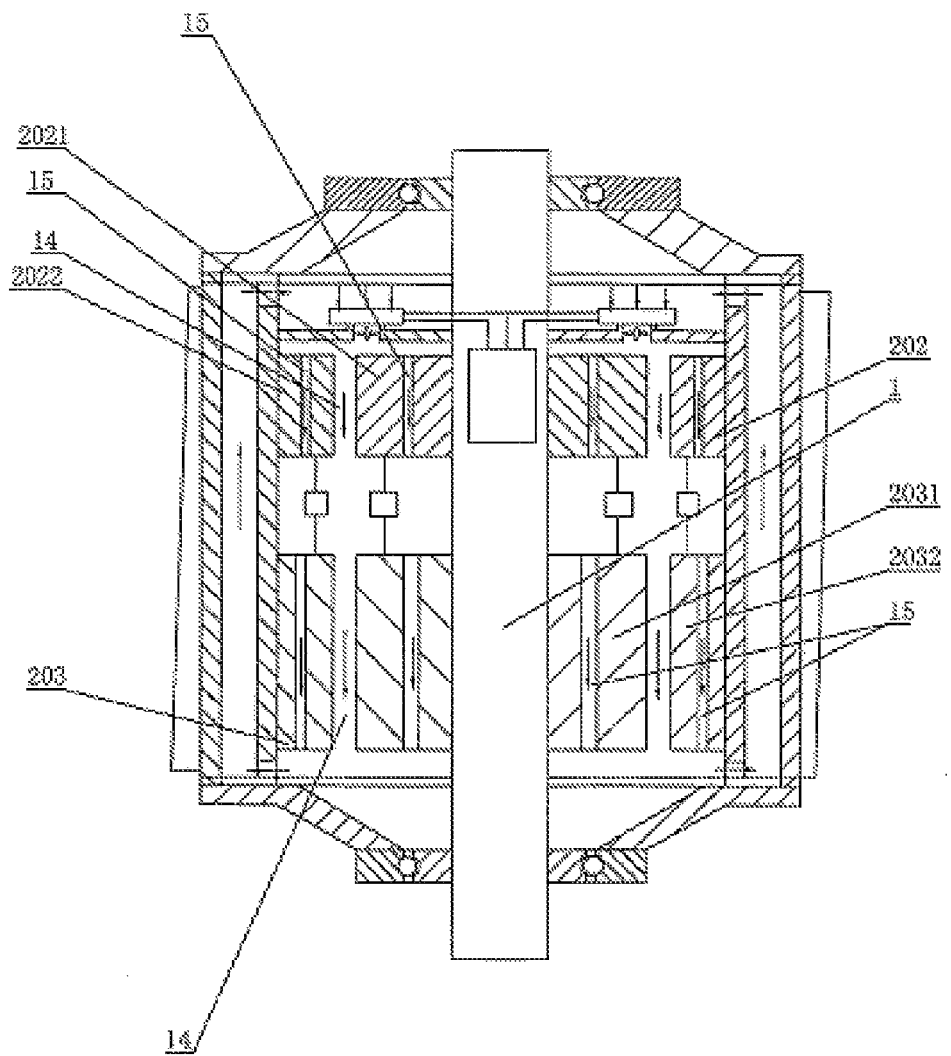
fig. 16

VERTICAL WIND POWER GENERATOR

TECHNICAL FIELD

The present invention relates to a vertical wind power generator.

BACKGROUND

Nowadays, non-renewable energy resources are becoming less and less, and even some energy has been consumed, therefore, as wave energy, combustible ice, coal bed gas and microbes, these energy sources will become the new energy widely used by human. Wind power, as a renewable energy, has been brought into use in many areas and equipment, and its technology is becoming mature slowly. Modern wind power generator mainly comprises horizontal axis wind power generator and vertical axis wind power generator. Vertical axis product and horizontal axis product are different. In vertical axis wind power generator, the rotating shaft is installed on the vertical axis, perpendicular to the ground, not affected by the wind direction when the vertical axis wind power generator are working, so no adjustment are required when the wind direction changes.

Wherein, Darrieus turbine belongs to one of the vertical wind power generator, the turbine is comprised of a vertical rotating shaft, a top rotor center on the top of the rotating shaft, blades, a bottom rotor center on the bottom of the rotating shaft, a gearbox connected to the rotating shaft, a generator connected to the gearbox. The upper end of the blades connects at the top rotor center, and lower end of the blades connects at the bottom center, driving the vertical rotating shaft to rotate after the blades rotates, and the rotating shaft transfers the power to the generator by the gearbox provided on the bottom, so as to make the generator generate electricity. Because such wind power generator is too big, the rotating shaft is usually high, in order to strengthen its stability, by dragline from the top of the rotating shaft to the bottom surface, even though the rotating shaft is strengthened, its occupied area is bigger, which undermines efficient use of the land; in addition, the power transmission chain is too long in the wind power generation process, therefore the power losses too much energy in the course of transmitting, which is not conducive to efficient use of energy; furthermore, only can the power generating device generate electricity when it comprises the gearbox, generator, transmission shaft and other sets of components, and the structure of the power generating device is complex, once the power generating device breaks down, its maintenance and repairs are too difficult and only can the large components be lift when erecting the tower crane besides the generator, therefore, the maintenance cost is high and the maintenance time is long, which directly affects the working efficiency of the wind power generator.

In the vertical wind power generator of application No. 200910038122.9 filed by the present applicant, it comprises a tower column, a generator and at least two blades, and at least one power generating device is provided on the tower column; the power generating device is comprised of a first lower flange plate and a first upper flange plate, a first bearing block, a first bearing, a first generator, a generator central column, a second bearing, a second bearing block, a second lower flange plate and a second upper flange plate; the first lower flange plate is fixed with the tower column, the first upper flange plate is located on the first lower flange plate and fixedly connects to the first lower flange plate, the first bearing block is fixed on the first upper flange plate, the first bearing is comprised of a first outer ring, a first steel ball group and a first inner ring, the first inner ring is fixed on the first bearing block, and the first outer ring and the first steel ball group can rotate around the first inner ring; the first generator comprises a first inner stator and a first outer rotor, the first inner stator is located on the first inner ring, and the first outer rotor is located on the first outer ring and fixedly connects to the first outer ring; the generator central column fixedly connects to the first inner stator; the second bearing, the second bearing block, the second lower flange plate and the second upper flange plate are provided above the generator central column in sequence, the second upper flange plate is fixed with the tower column, the second lower flange plate is located below the second upper flange plate and fixedly connects to the second upper flange plate, the second bearing block is located below the second lower flange plate and fixedly connects to the second lower flange plate, the second bearing is comprised of the second outer ring, the second steel ball group and the second inner ring, the second inner ring is located below the second bearing block and fixedly connects to the second bearing block, and the second outer ring and the second steel ball group can rotate around the second inner ring; the upper end of the blades fixedly connects to the second outer ring, and the lower end of the blades fixedly connects to the first outer ring. This kind of invention has simple structure, safe, occupies less area, cost less, and has high utilization efficiency of wind power; however, it has high requirements for the bearing, the size of the outer ring of the bearing needs to be equal to that of the outer rotor of the generator, the larger the generator is, the larger the needed diameter of the bearing is. A large bearing causes high production costs, a bearing with a diameter of 5 m needs about 300-400 thousand, and that with a diameter of 3 m needs hundreds of thousands, on the other hand, it is not easy to assemble a large bearing.

In wind power generator, high and low utilization efficiency of wind power depends on the construction and the structure of the blade; nowadays, the shape of a blade of a vertical wind power generator varied, such as fan-shaped structure, the sail-shaped structure, φ-shaped structure, etc., in these structures, φ-shaped structure has the highest utilization efficiency of wind energy, but due to changes in wind speed and wind power is uncertain, resulting in the size of the windward side of the blade out of control, therefore, it's difficult to prevent the failure and even damage of the vertical wind power generator caused by excessive wind speed.

The generator will produce heat at work, in particular the high-power generator, if not cooling the generator, the generator will be burned, reducing the life of the generator. Nowadays, the normally conducted cooling method is water cooling or installing a fan in one end of the generator. Conducting the method of water cooling, it needs to layout a lot of waterway, which has complex structure and is difficult to achieve the required water seal, causing the damage of the motor insulation, and affecting the life of the motor; an outer rotor energy saving wind power generator is disclosed in Chinese patent of No. 200520032333.9, comprising an outer rotor, a stator, a fixing shaft and a bearing, the stator is fixed on the fixing shaft, the outer rotor is fixedly installed on the bearing through the upper and lower end cover by the magnet installed on the shell and inner wall, there are louvers on the two ends of said shell. In this structure, because part of the heat of the generator evolutes through the louvers, there is no heat exchange in the whole structure, causing poor heat dissipation.

With further study of wind power generator, when it works, the blades suffer strong wind; therefore, this requires a larger capacity of blades, there is a kind of vertical wind power generator, comprising at least one generator unit; the said generator unit includes a stand column, a generator and at least two blades; the said generator includes a stator and a rotor, the stator is provided on the stand column, and the rotor is provided outside of the stator; a first flange is provided on the lower end of the said rotor, and connects to the rotor; a first bearing on the lower end of the first flange on the stand column, and the outer ring of the first bearing connects to the first flange; a second flange is provided on the upper end of the said rotor, and the second flange connects to the rotor; a second bearing is provided on the upper end of the second flange on the stand column, and the outer ring of the second bearing connects to the second flange; a third bearing is provided above of the second bearing on the stand column, the upper end of the said blades connect to the outer ring of the third bearing, and the lower end of the blades connect to the outer ring of the second bearing. The vertical wind power generator with this kind of structure, the movement of the blades drives the rotor to rotate through the second bearing and the second flange, the torque of the rotor is provided by the blades and mainly provided by the lower end of the blades; because the lower end of the blades connects the generator as load, when the vertical wind power generator works, the deformation of the lower end of the blades is small, and that of the upper end of the blades is large, which causes the stresses on the upper end and lower end of the blades are different, therefore, the blades to damage easily.

BRIEF SUMMARY

The aim of the present invention is to provide a vertical wind power generator. Using the structure of the present invention, the manufacturing cost of the vertical wind power generator can be reduced; when the generator is hard to start, it can be rapidly started; the size of the windward side of the blades can be adjusted, in order to automatically adjust the power of the wind power generator, prevent the failure of the wind power generator caused by excessive wind speed, and enhance the utilization efficiency of the wind energy; good cooing effect can be achieved on the generator, stability of the generator can be enhanced, and the operating life of the generator can be increased; it becomes easy to maintain, the maintenance cost and time can be reduced, and the detection to the generator is facilitated.

To achieve the abovementioned aim, a vertical wind power generator comprises a tower column, at lease one generator unit and at least two blades; the central axis of the said tower column is perpendicular to the horizontal plane.

The said generator unit includes a bracket, a generator and an exciter; the bracket includes an outer bracket and an inner bracket; the said generator includes a stator and a rotor, the stator is fixedly ringed on the tower column, the rotor of the exciter is provided outside of the stator of the exciter and is fixedly provided on the inner bracket, a generator stator winding is provided on the stator, and a generator rotor winding is provided on the rotor.

The said exciter includes an exciter stator and a exciter rotor, the exciter stator is fixedly ringed on the tower column, the exciter rotor is provided outside of the exciter stator and is fixedly provided on the inner bracket, an exciter stator winding is provided on the said exciter stator, and a exciter rotor winding is provided on the exciter stator.

There provided an excitation control device and a rotation rectifying device inside the said bracket, the generator stator winding links with the exciter stator winding through the excitation control device, and the generator rotor winding links with the exciter rotor winding through the rotation rectifying device; the said generator stator winding is linked with a bidirectional frequency converter; the other end of the bidirectional frequency converter is linked with a power grid, and linked with the excitation control device.

The lower end of the said bracket is provided with a first flange with different cross sections on the upper end and lower end, the lower end of the first flange is provided with a first bearing, the outer ring of the first bearing connects with the small end of the first flange, the inner ring of the first bearing is fixedly ringed on the tower column, and the big end of the first flange connects with the lower end of the bracket; the upper end of the said bracket is provided with a second flange with different cross sections on the upper end and lower end, the upper end of the second flange is provided with a second bearing, the outer ring of the second bearing connects with the small end of the second flange, the inner ring of the second bearing is fixedly ringed on the tower column, and the big end of the second flange connects with the upper end of the bracket; a third bearing is provided above the said second bearing, the inner ring of the third bearing is fixedly ringed on the tower column.

The said blade includes at least one blade unit; the cross section of the said blade unit is olive-shaped with big middle and two small ends, and one end of the two small ends is arc-shaped and the other end is a tip; the said blade unit includes a skeleton and a blade body, the blade body is installed on the skeleton, one end of the blade body is provided with a first blade tip and the other end of the blade body is provided with a second blade tip on the radial direction of the blade unit, the tail of the first blade tip is the arc shape of the said blade unit, the tail of the second blade tip is the tip of the said blade unit, the head of the first blade tip stretches into the blade body, and the head of the second blade tip stretches into the blade body; a first moving device, which drives the first blade tip to move along the radial direction of the blade unit, is provided between the said skeleton and the first blade tip, and, a second moving device, which drives the second blade tip to move along the radial direction of the blade unit, is provided between the said skeleton and the second blade tip; a first guide rail group is provided between the said first blade tip and the blade body, a second guide rail group is provided between the said second blade tip and the blade body, and the said blade unit after connected is arc-shaped; the upper end of the said blade connects with the outer ring of the third bearing, and the lower end of the blade connects with the outer ring of the second bearing.

A cooling system is provided on the said generator unit, the said cooling system includes a fan blade, a cooler, a seal plate and a fan; a bracket duct is provided between the said outer bracket and the inner bracket; a duct is provided on the said stator, rotor, exciter stator and exciter rotor; an air outlet is provided on the lower end of the inner bracket, and an air inlet is provided on the upper end of the inner bracket; the bracket duct connects with the air outlet and the air inlet; the fan blade is provided obliquely on the outer wall of the outer bracket; the said seal plate is provided on the tower column, and is located in the upper end of the inner bracket; the fan is provided on the seal plate, and the cooler is provided above the fan.

A crane is provided on the top of the said tower column.

The said tower column is a hollow tower column, and a lift system is provided in the tower column.

Compared with the prior art, in the abovementioned structure of the present invention, the generator unit and blades are supported only depending on the tower column, making the occupied area of the whole vertical wind power generator small; compared with the way of transferring energy by complex transmission mechanism and using huge vertical rotating shaft, the structure of the blades, the outer ring of the bearing and the outer rotor fixed as whole with each other, which is designed in present invention, makes the generator rotor equal to one part of the blades, and the rotate speed of the blade is that of the generator rotor, which greatly reduce the loss in the course of energy transmission, and enhance the utilization efficiency of the wind power; compared with the prior tower rack vertical wind power generator, in present invention, the generator unit and blades are supported by the hollow tower column, which ensures the stability of the wind power generator and reduces the dosage of the steel, and the present invention simplifies effectively the transmission mechanism of the wind power generator, and greatly reduces the production cost of the vertical wind power generator and the cost of the wind power.

Providing the exciter makes it possible to adjust exciting current correspondingly according to the change of the load of the generator, in order to keep the voltage in the generator a constant value; it can increase the static stability when the generators operates in parallel; it can increase the transient state stability when the generators operates in parallel; it will do de-excitation when something goes wrong in the generator to reduce the loss of fault; it can implement the maximum excitation limit and minimum excitation limit to the generator according to operational requirements.

The first flange and the second flange are provided as having different cross sections on the upper end and lower end, the small end of the first flange connects with the outer ring of the first bearing, and the small end of the second flange connects with the outer ring of the second bearing, so that the size of the bearing can be reduced, and the marked bearing can be bought in the market, thus reducing the manufacturing cost of the vertical wind power generator and making the generator easy to install.

Because the first moving device is provided between the first blade tip and the skeleton, the second moving device is provided between the second blade tip and the skeleton, the first guide rail group is provided between the first blade tip and the blade body, and the second guide rail group is provided between the second blade tip and the blade body, the blade can adjust the size of the windward side according to the wind power size, in order to automatically adjust the power of the wind power generator, and to prevent the failure of the vertical wind power generator caused by the excessive wind speed; because the cross section of the blade unit is olive-shaped with big middle and two small ends, one end of the two small ends is arc-shaped and the other end is a tip, and the said blade units after connected are arc-shaped, so making the blade of this kind structure have high utilization efficiency of wind power.

When the cooling system with the abovementioned structure works, the fan works to form wind current, and cool wind goes through the ducts of the exciter rotor, the exciter stator, the rotor and the stator, playing the role of cooling the exciter and the generator, at this time, the cool wind becomes hot wind, going into the bracket duct through the air outlet, doing heat exchange with the outside air by the outer wall of the outer bracket at here, and hot wind becomes cool wind and then wind current goes into the cooler through the air inlet, becoming cooler at here, and then flowing into the inner cavity of the wind power generator by the fan to form an inner cycle. Because the fan blade is provided outside the outer bracket and the fan blade is provided obliquely on the outer wall of the outer bracket, when the bracket rotates, the fan blade rotates along with it, at this time, the upper and lower wind pressure difference is formed on the fan blade, making the outside air near the generator form wind current flowing from high pressure to low pressure, that is, form an outer cycle, so the efficiency of heat exchange between the wind current in the inner cycle and the outside is increased, the cooling effect on the generator is improved and the structure is simple.

Providing the crane can make the maintenance staff and the detection staff can work on the crane, preventing the requirement of large scale equipment to maintain and detect the wind power generator to the scene, greatly reducing the maintenance cost, and saving the maintenance time.

Because the tower column of the present invention is hollow, and the lift mechanism is provided in the tower column, it becomes simple and safe to maintain and detect the vertical wind power generator.

As an improvement, a third flange is provided above the second flange on the said tower column, and the third flange connects with the second flange; a fourth flange is provided above the third flange on the said tower column, and the fourth flange connects with the outer ring of the said third bearing; a connection for transmitting torque is provided between the said third flange and the fourth flange, the upper end of the connection connects with the fourth flange, and the lower end of the connection connects with the third flange; the upper end of the said blade connects with the fourth flange, and the lower end of the blade connects with the third flange.

In the vertical wind power generator with the above-mentioned structure, because the third flange and the fourth flange are provided, the connection for transmitting torque is provided between the said third flange and the fourth flange, the upper end of the connection connects with the fourth flange, and the lower end of the connection connects with the third flange, the torque of the generator rotor not only has the transmission from the lower end of the blades, but also has the transmission from the connection, and the torque of the connection is transmitted to the connection mainly through the movement of the blades by the upper end of the blades, and thus when the vertical generator works, the pressure on the upper end and the lower end of the blades come to a balance, making the blades not easy to be distorted and damaged due to deformation, and increasing the operating life of the blades and the vertical wind power generator.

As a specification, the said connection is a hollow pipe, the said hollow pipe is ringed outside the tower column, the upper end of the hollow pipe connects with the fourth flange, and the lower end of the hollow pipe connects with the third flange. Using the hollow pipe as the connection, its structure is simple and it is easy to manufacture; and, when the hollow pipe rotates along with the third flange and the fourth flange, it will not form rotation resistance at the hollow pipe to affect the power of the wind power generator.

As an improvement, the said connection includes at least two connecting rods, the upper end of the said connecting rods connects with the fourth flange, the lower end of the connecting rods connects with the third flange, and the said connecting rod is provided on the circle, which is outside the tower column and is concentric with the cross section of the tower column; a reinforcing rib is provided along the direction of the cross section of the tower column on the said connecting rods. Using the kind of structure, the structure is simplified and the weight of the vertical wind power generator is reduced. The reinforcing rib is provided to increase the strength of the connection formed of connecting rods.

As an improvement, a stator holder is provided on the lower end face of the said stator, and the stator holder is fixedly ringed on the tower column; an exciter stator holder is provided on the lower end face of the said exciter stator, and the exciter stator holder is fixedly ringed on the tower column; a first bearing holder is provided on the lower end face of the inner ring of the said first bearing, and the first bearing holder is fixedly ringed on the tower column; a second bearing holder is provided on the lower end face of the inner ring of the said second bearing, and the second bearing holder is fixedly ringed on the tower column; a third bearing holder is provided on the lower end face of the inner ring of the said third bearing, and the third bearing holder is fixedly ringed on the tower column.

Providing the stator holder can increase the accuracy and fastness of the position that the generator stator is installed on the tower column; the exciter stator holder is provided to increase the accuracy and fastness of the position that the exciter stator is installed on the tower column; a first bearing holder is provided to increase the accuracy and fastness of the position that the first bearing is installed on the tower column; a second bearing holder is provided to increase the accuracy and fastness of the position that the second bearing is installed on the tower column; a third bearing holder is provided to increase the accuracy and fastness of the position that the third bearing is installed on the tower column;

As an improvement, a damper winding are provided on the said rotor, the damper winding include an end ring and a damper bar, and the damper bar is installed on the end ring. The said damper winding is equal to the winding of the rotor. When the generator is hard to start, the generator is used as motor, and thus the asynchronous start of the motor can be achieved, increasing the power generation efficiency of the vertical wind power generator.

As a specification, the said first flange is cone platform-type, horn-type, "convex"-shape or stepped; the second flange is cone platform-type, horn-type, "convex"-shape or stepped. Using cone platform-type or horn-type, the cross section from the big end to small end of the first flange is uniformly transited, the cross section from the big end to small end of the second flange is uniformly transited, and significant inner stress will not produced in the first flange and the second flange. Therefore, the strength of the first flange and the second flange is high, and can withstand greater force, at the same time, the size of the outer ring of the bearing is reduced, reducing the cost of the vertical wind power generator; using "convex"-shape or stepped, the flanges can be processed using common equipment with simple processing procedure, thus reducing the processing cost and processing time of the flanges.

As an improvement, a fifth flange is provided between the said bracket and the first flange, the upper end face of the fifth flange connects with the bracket, and the lower end face connects with the big end of the first flange; a sixth flange is provided between the said bracket and the second flange, the upper end face of the sixth flange connects with the big end of the second flange, and the lower end face connects with the bracket; a seventh flange is ringed outside the outer ring of the said second bearing, the upper end face of the seventh flange connects with the third flange, and the lower end face connects with the small end of the second flange.

Providing the fifth flange can facilitate the connecting of the first flange and the bracket; the sixth flange is provided to facilitate the connecting of the second flange and the bracket; the seventh flange is provided, and the inner surface of the seventh flange and the outer surface are an interference fit, in this case, it's enough that the second flange and the third flange connect with the seventh flange, without the need to process screw hole or weld on the outer ring of the second bearing, hence reducing the processing cost of the bearing, enhancing the strength of the outer ring of the second bearing, and simplifying the installing procedure.

As an improvement, an eighth flange is provided between the lower end of the said blade and the third flange, a ninth flange is provided between the upper end of the blade and the fourth flange.

Providing the eighth and ninth flange can facilitate the connecting of the blade and the third and fourth flanges.

As a specification, the said first moving device is a first hydraulic system, and the second moving device is a second hydraulic system; the said first hydraulic system includes a first hydraulic pump, a first hydraulic valve, a first hydraulic pipe and a first hydraulic cylinder; the said first hydraulic cylinder includes a first hydraulic cylinder body, a first piston, a first piston rod and a first seal device, the said first hydraulic cylinder body connects with the skeleton far from one end of the first piston rod, and the first piston rod connects with the first blade tip far from one end of the first hydraulic cylinder body; the said second hydraulic system includes a second hydraulic pump, a second hydraulic valve, a second hydraulic pipe and a second hydraulic cylinder; the said second hydraulic cylinder includes a second hydraulic cylinder body, a second piston, a second piston rod and a second seal device, the said second hydraulic cylinder body connects with the skeleton far from one end of the second piston rod, and the second piston rod connects with the second blade tip far from one end of the second hydraulic cylinder body.

Using the hydraulic system as the moving system, its stationarity of transmission is good, and it can be used on the moving equipment with big power, and can achieve stepless speed regulating.

As an improvement, the said first moving device is a first pneumatic system, the first pneumatic system includes a first air compressor and a first pneumatic cylinder, the first pneumatic cylinder includes a first pneumatic cylinder body, a first pneumatic piston, a first pneumatic piston rod and a first pneumatic seal device, the said first pneumatic cylinder body is installed on the skeleton, and the first pneumatic piston rod connects with the first blade tip far from one end of the first pneumatic cylinder body; the said second moving device is a second pneumatic system, the second pneumatic system includes a second air compressor and a second pneumatic cylinder, the second pneumatic cylinder includes a second pneumatic cylinder body, a second pneumatic piston, a second pneumatic piston rod and a second pneumatic seal device, the said second pneumatic cylinder body is installed on the skeleton, and the second pneumatic piston rod connects with the second blade tip far from one end of the second pneumatic cylinder body.

Using the pneumatic cylinder system as the moving device, because its power medium is gas, it has light weight, and the resource of the medium is rich and is pollution-free; because the viscosity of the gas is small, therefore, the resistance between the gas and pneumatic cylinder body is small.

As an improvement, the said first moving device includes a first screw rod, a first nut, a first motor, at least two first linear bearing and first bearing block, the said first bearing block is installed on the blade body, the first linear bearing is installed on the first bearing block, the said first nut is installed on the first blade tip, one end of the said first screw rod connects with the first motor, the said first screw rod engages with the first nut, and a first coupler is provided between the said first motor and the first screw rod; the said second moving device includes a second screw rod, a second nut, a second motor, at least two second linear bearing and second bearing block, the said second bearing block is installed on the blade body, the second linear bearing is installed on the second bearing block, the said second nut is installed on the second blade tip, one end of the said second screw rod connects with the second motor, the said second screw rod engages with the second nut, and a second coupler is provided between the said second motor and the second screw rod.

Using the screw rod, nut, and linear bearing as the moving device, its transmission accuracy is high.

As an improvement, a first seal strip is provided on the end of the said blade body near the first blade tip, and a second seal strip is provided on the end of the said blade body near the second blade tip; a blade reinforcing rib is provided between the said skeleton and the blade body.

Providing the seal strip can prevent the rain and dust into the blade unit; when the vertical wind power generator works, it can prevent the forming of convection on both ends of the cross section of the blade unit, hence affecting the work efficiency of the vertical wind power generator. The blade reinforcing rib is provided to enhance the connecting strength of the skeleton and the blade body.

As an improvement, an external cooler is connected on the said cooler, and is provided in the tower column.

The work process of the abovementioned structure is: the external cooler transports the cooling liquid into the cooler by a liquid-feeding pipe; the cooling liquid undergoes heat exchange in the cooler, and then changes into water and flows into the external cooler by a drainpipe so as to be cooled, and the abovementioned process continues to cycle. Adding the external cooler can improve the cooling effect of the wind current in the inner cycle in the cooler, and thus enhance the cooling effect on the generator and increase the operating life of the generator.

As a specification, the said crane comprises a rotating tower, a crane arm, a balance arm, a balance weight, a crane car, a car running mechanism, a hook, an inhaul cable, a hoisting mechanism and a controlling system; the rotating tower is provided on the top of the tower column, the crane arm and balance arm are installed on the rotating tower, the balance weight is installed on one end of the balance arm, the car running mechanism is provided on the crane arm, the crane car is provided on the car running mechanism, the hook is provided below the crane car, the hook connects with one end of the said inhaul cable, and the other end of the inhaul cable connects with the hoisting mechanism; the said car running mechanism is a guide rail provided on the crane arm, and the said crane car is provided on the said guide rail; a balance arm pull rod is provided between the top of the said rotating tower and the balance arm, one end of the balance arm pull rod fixedly connects with the top of the said rotating tower, and the other end of the balance arm pull rod fixedly connects with the balance arm; a crane arm pull rod is provided between the top of the said rotating tower and the crane arm, one end of the crane arm pull rod fixedly connects with the top of the rotating tower, and the other end of the crane arm pull rod fixedly connects with the crane arm.

As to the crane of the abovementioned structure, because there provided the rotating tower, crane arm, crane car, car running mechanism, hook, inhaul cable, and hoisting mechanism, the operators can install, maintain and detect the vertical wind power generator on the crane with no need for additionally constructing a tower or a crane equipment, saving cost and time; because the balance arm and the balance weight, the weight of one end of the crane arm is balanced, ensuring the structure stability of the crane and increasing the crane load of the crane; because the rotating tower is provided, the rotating tower can rotate 360°, and because the crane car is provided, the crane car can move on the car running mechanism, in this case, the distance on the horizontal direction between the hook and the generator can be adjusted; because the hoisting mechanism, inhaul cable and hook are provided, the hook can move on perpendicular direction through the hoisting mechanism by the inhaul cable, the operators can work anywhere in the wind power generator, effectively saving the operating time. The said guide rail has simple structure, and is easy to manufacture. The balance arm pull rod and came arm ensure the structure stability of the crane and increase the crane load of the crane.

As a specification, the said lift system is an elevator, and the said elevator includes a lift car and a lift car lift mechanism.

As to the detection and maintenance on the vertical wind power generator, the operators may detect and maintain the wind power generator by taking the lift car of the elevator, making the maintenance more convenience, and at the same time reducing maintenance cost and time.

As an improvement, a brake device is provided on the outer rings of the said first bearing, the second bearing and the third bearing.

The rotational speed of the vertical wind power generator rotor changes as the wind speed, and the bigger the wind speed is, the rotational speed of the generator rotor, and thus the more the output electrical quantity is, but the generator has an extreme power of itself, when the actual power is bigger than the extreme power, the generator may be burned, therefore, the rotate speed of the generator rotor should be controlled, and thus the providing of the brake device effectively controls the rotate speed of the generator rotor.

BRIEF DESCRIPTION OF THE DRAWINGS

FIG. 14 is the pictorial view of the damper winding;

FIG. 15 is the structure diagram showing the fan blade is installed on the outer wall of the outer bracket;

FIG. 16 is the structure diagram showing the exciter is installed below the generator;

DETAILED DESCRIPTION

The detailed description of the present invention is provided in the following, in combined with the drawings the embodiments.

The First Embodiment

Figure 1:
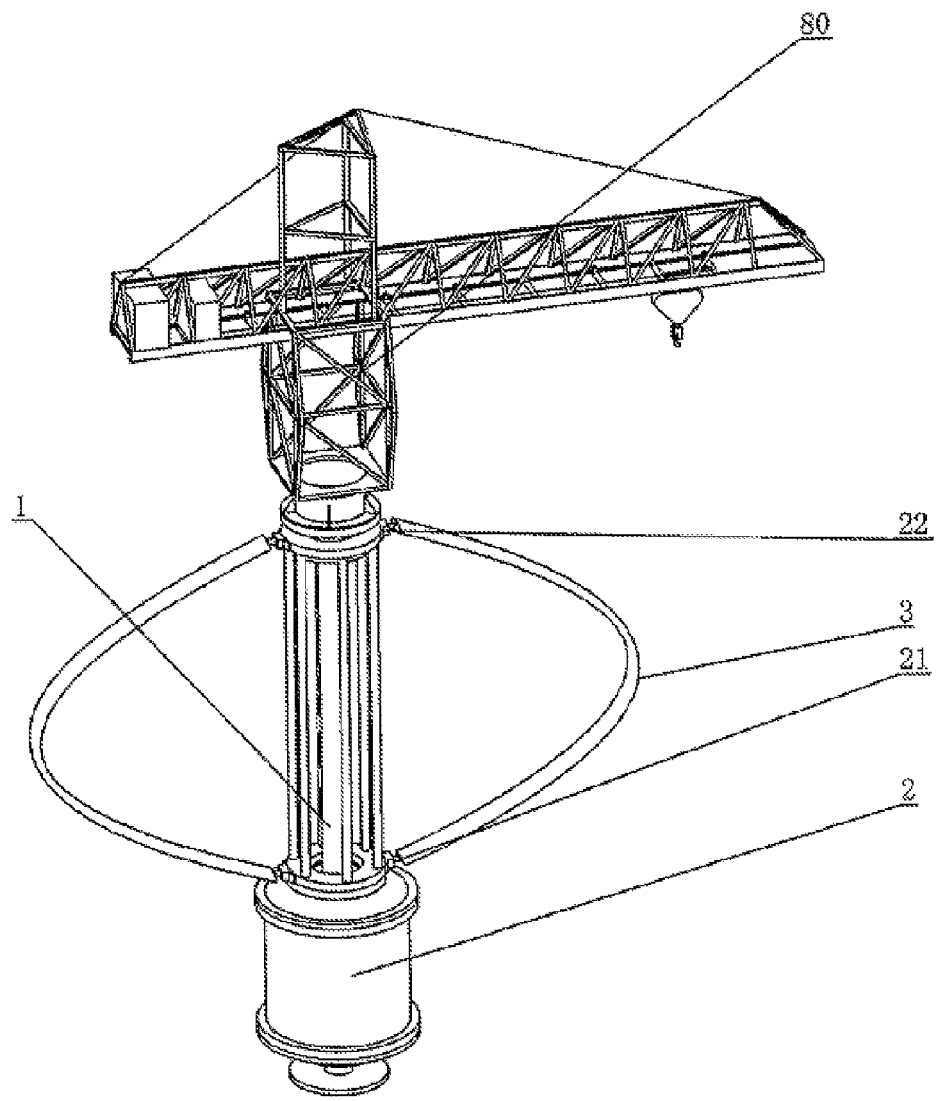
FIG. 1 is the pictorial view of the vertical wind power generator of the generator unit.
Figure 2:
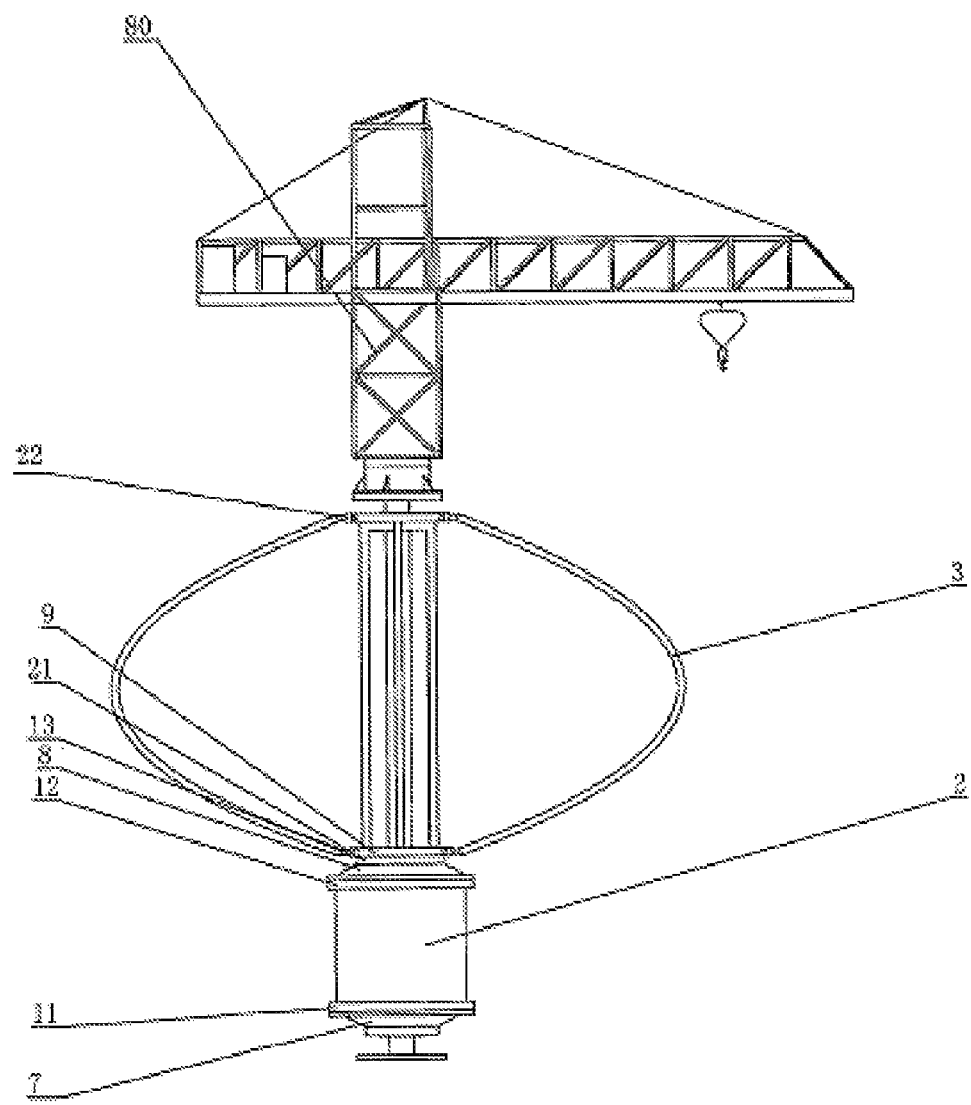
FIG. 2 is the front view of the vertical wind power generator of the generator unit.
Figure 3:
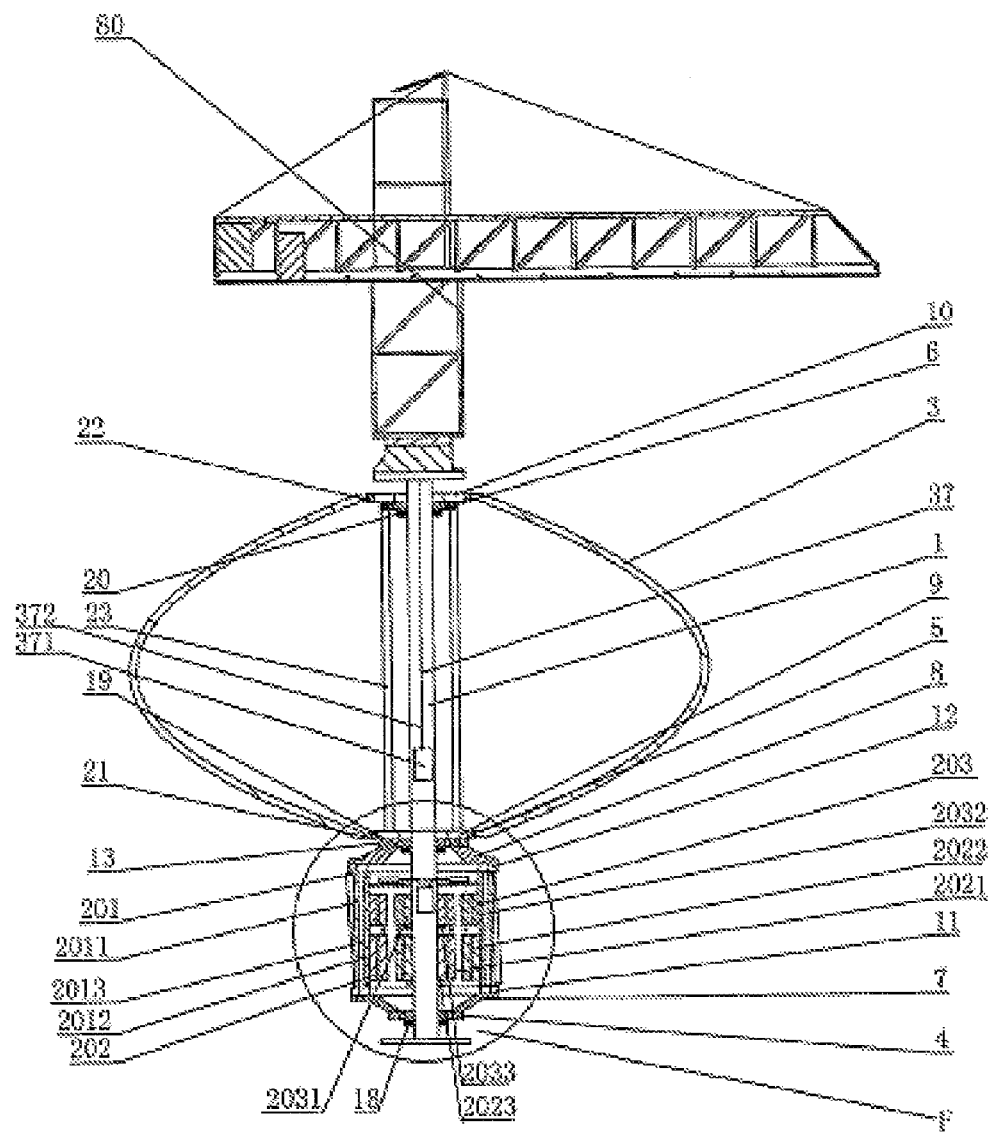
FIG. 3 is the cutaway view of the vertical wind power generator of the generator unit.

The vertical wind power generator as shown in FIG. 1 to FIG. 3, includes a tower column 1, at least one generator unit 2, at least two blades 3, a first bearing 4, a second bearing 5, a third bearing 6, a first flange 7, a second flange 8, a third flange 9, a fourth flange 10, a fifth flange 11, a sixth flange 12, and a seventh flange 13, and in this embodiment, the generator unit 2 is one, the blades 3 are two, the central axis of the tower column 1 is perpendicular to the horizontal plane, and the said tower column 1 is a hollow structure.

Figure 4:
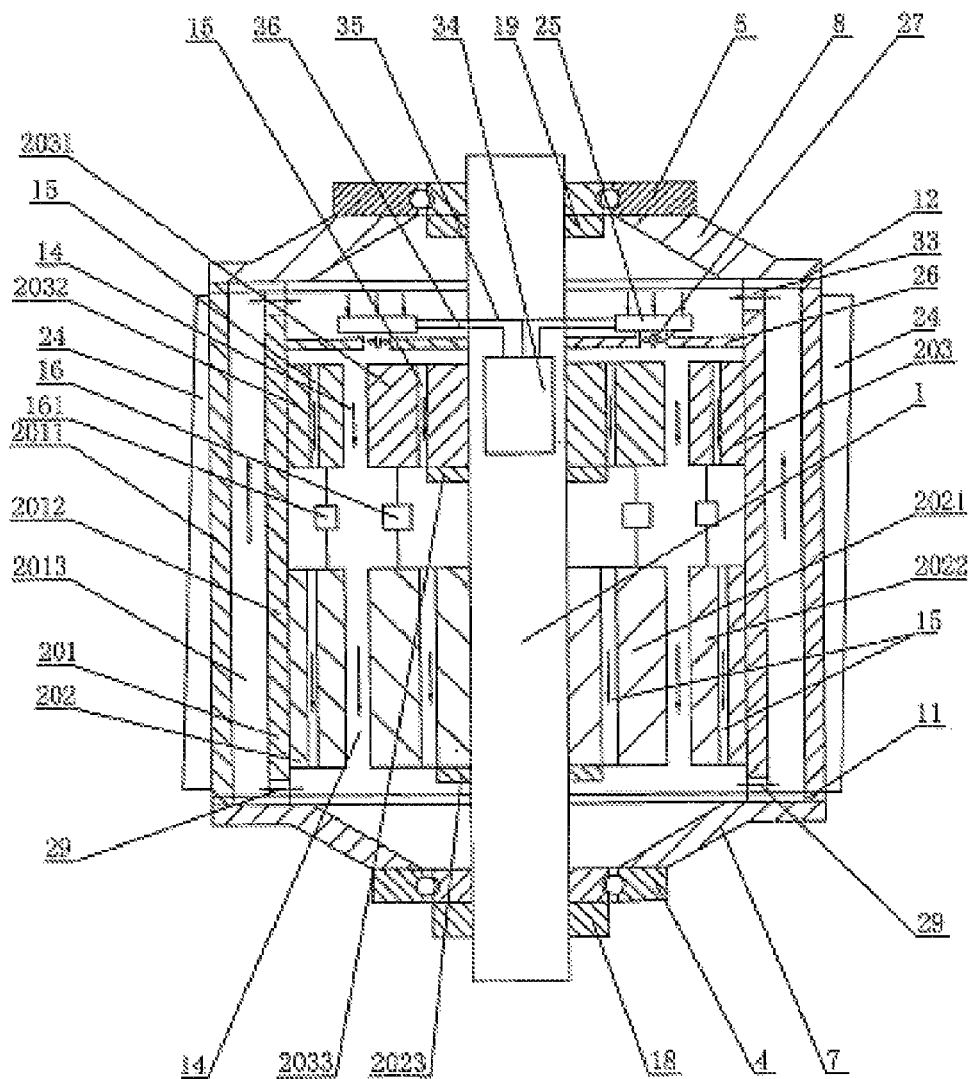
FIG. 4 is the partial enlarged view of F in FIG. 3.

As shown in FIG. 3 and FIG. 4, the said generator unit 2 comprises a bracket 201, a generator 202 and an exciter 203.

See FIG. 3 and FIG. 4, the said bracket 201 is comprised of an outer bracket 2011 and an inner bracket 2012, the outer bracket 2011 is provided outside the inner bracket 2012, and a bracket duct 2013 is formed between the outer bracket 2011 and the inner bracket 2012.

Figure 13:
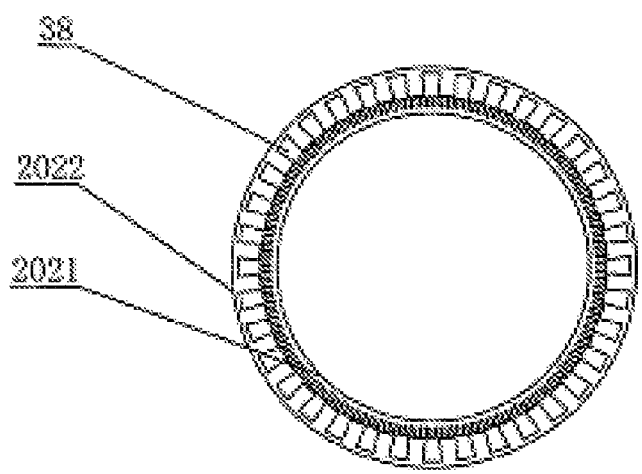
FIG. 13 is the structure view showing the damper winding is installed on the generator rotor.

See FIG. 3 and FIG. 4, the said generator 202 comprises a stator 2021 and a rotor 2022, the stator 2021 is fixedly ringed on the outer wall of the tower column 1, the rotor 2022 is provided outside the stator 2021, and is fixedly installed on the inner wall of the inner bracket 2012, a generator stator winding (not shown) is provided in the stator 2021, a generator rotor winding (not shown) is provided in the rotor 2022, an air gap 14 is provided between the stator 2021 and the rotor 2022, and ducts 15 is provided in the stator 2021 and the rotor 2022; a damper winding 38 is installed on the rotor 2022, as shown in FIG. 13 and FIG. 14, the damper winding 38 comprises an end ring 381 and a damper bar 382, and the damper bar 382 is installed on the end ring 381.

See FIG. 3 and FIG. 4, the said exciter 203 comprises an exciter stator 2031 and an exciter rotor 2032, the exciter stator 2031 is fixedly ringed on the outer wall of the tower column 1, the exciter rotor 2032 is provided outside the exciter stator 2031, and is fixedly installed on the inner wall of the inner bracket 2012, an exciter stator winding (not shown) is provided in the exciter stator 2031, an exciter rotor winding (not shown) is provided in the exciter rotor 2032, there is air gap 14 between the exciter stator 2031 and the exciter rotor 2032, and the ducts 15 are provided in the said exciter stator 2031 and the exciter rotor 2032; as shown in FIG. 3 and FIG. 4, the said exciter 203 is installed above the generator 202, of course, see FIG. 16, the exciter 203 may also be installed below the generator 202.

Figure 10:
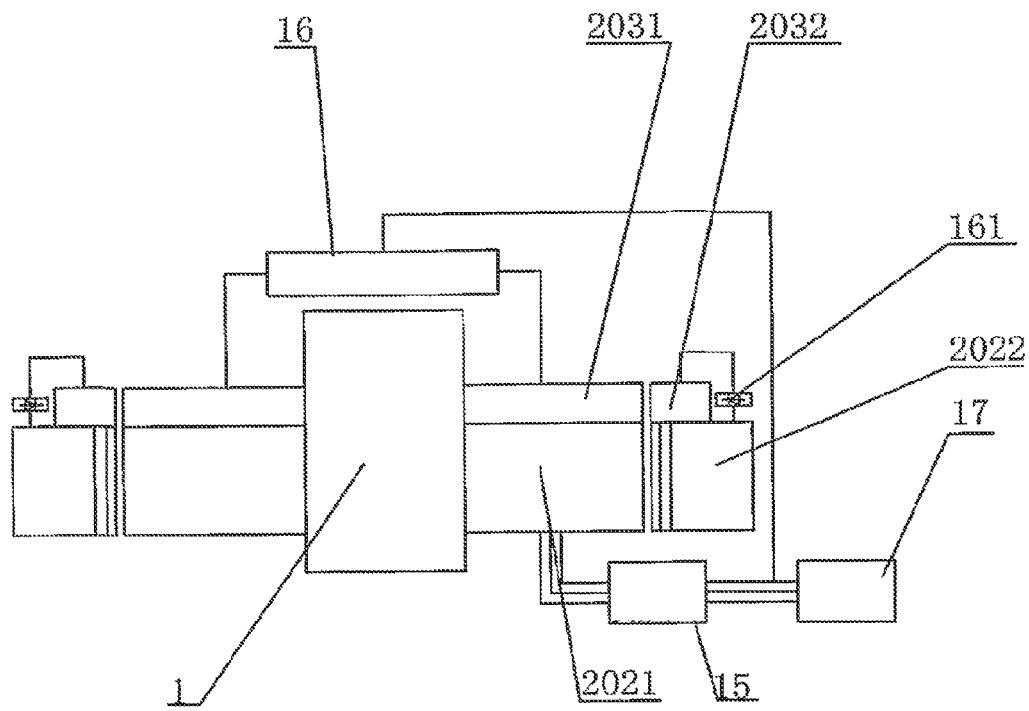
FIG. 10 is the structure view showing the generator acts as the motor to start.

As shown in FIG. 10, the generator stator winding links with a power grid 17 through a bidirectional frequency converter 15, the generator stator winding links with the exciter stator winding through the bidirectional frequency converter 15 and the excitation control device 16; the generator rotor winding links with the exciter rotor winding through a rotation rectifying device 161.

As shown in FIG. 3, a stator holder 2023 is provided on the lower end face of the generator stator 2021, the stator holder 2023 is fixedly ringed on the outer wall of the tower column 1, and the stator holder 2023 plays a role in bearing the stator 2021, increasing the fastness and the accuracy of the position when the stator 2021 is installed on the tower column 1; an exciter stator holder 2033 is provided on the lower end face of the exciter stator 2031, the exciter stator holder 2033 is fixedly ringed on the outer wall of the tower column 1, and the exciter stator holder 2033 plays a role in bearing the exciter stator 2031, increasing the fastness and the accuracy of the position when the exciter stator 2031 is installed on the tower column 1.

Figure 18:
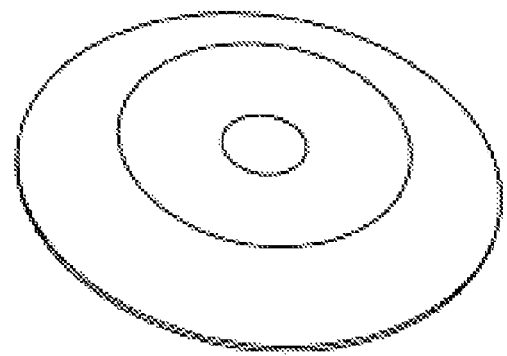
FIG. 18 is the pictorial view of the second form of the first flange and the second flange.
Figure 19:
FIG. 19 is the cutaway view of the second form of the first flange and the second flange.
Figure 20:
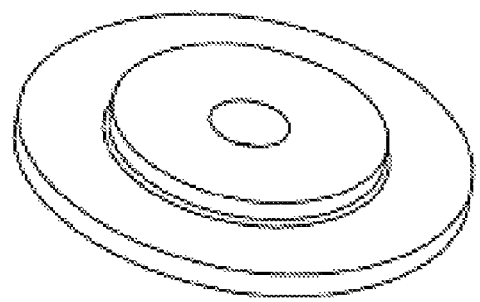
FIG. 20 is the pictorial view of the third form of the first flange and the second flange.
Figure 21:
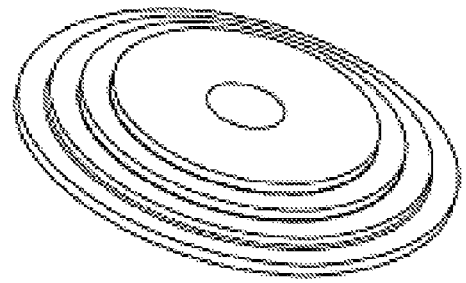
FIG. 21 is the pictorial view of the fourth form of the first flange and the second flange.

As shown in FIG. 3 and FIG. 4, the said fifth flange 11, first flange 7, first bearing 4 are successively provided below the bracket 201 from top to bottom; the upper end face of the fifth flange 11 connects with the lower end face of the bracket 201 by welding; the two cross sections on the upper end and lower end of the said first flange 7 are not equal, as shown in FIG. 4, the first flange 7 is cone platform-type, as shown in FIGS. 18 and 19, the first flange 7 is horn-type, as shown in FIG. 20, the first flange 7 is "convex"-shape, as shown in FIG. 21, the first flange 7 is stepped, of course, the first flange 7 is not limited to the above-mentioned four kinds of structure, the big end of the said first flange 7 connects with the fifth flange 11 by a bolt or welding, and the small end of the first flange 7 connects with the outer ring of the first bearing 4 by a bolt or welding or interference fit; the inner ring of the said first bearing 4 is fixedly ringed on the outer wall of the tower column 1, a first bearing holder 18 is on the lower end face of the inner ring of the first bearing 4, and the first bearing holder 18 is fixedly ringed on the outer wall of the tower column 1.

Using the first flange 7 with the cone platform type or horn type, the cross section from big end to small end of the first flange 7 is uniformly transited, significant inner stress will not produced in the first flange 7, and therefore the strength is high and greater force can be withstand, at the same time, reducing the size of the outer ring of the first bearing 4 and the cost of the vertical wind power generator; using "convex"-shape or stepped, the first flange 7 can be processed using common equipment with simple processing procedure, thus reducing the processing cost and processing time of the flanges; the providing of the fifth flange 11 facilitates the connecting between the first flange 7 and the bracket 201; the said first bearing holder 18 is used to bear the first bearing 4 and all the components it acts on the first bearing 4, thus increasing the installing fastness and the accuracy of position of the first bearing 4 and also enhancing the stability of the structure of the generator.

As shown in FIG. 3 and FIG. 4, the sixth flange 12, the second flange 8 and the second bearing 5 are successively provided above the bracket 201 from top to bottom; the sixth flange 12 is connected on the upper end face of the bracket 201 by welding, the two cross sections of the upper end and the lower end of the said sixth flange 12 are not equal, as shown in FIG. 3 and FIG. 4, the second flange 8 is cone platform-type, as shown in FIG. 18 and FIG. 19, the second flange 8 is horn-type, as shown in FIG. 20, the second flange 8 is "convex"-shape, as shown in FIG. 21, the second flange 8 is stepped, of course, the second flange 8 is not limited to the abovementioned four kinds of structure, the big end of the second flange 8 is connected on the sixth flange 12 by a bolt or welding; the inner ring of the said second bearing 8 is fixedly ringed on the outer wall of the tower column 1; the said seventh flange 13 is ringed on the outer wall of the outer ring of the second bearing 5 by interference fit, and the lower end face of the seventh flange 13 is connected on the small end of the second flange 8 by a bolt or welding; a second bearing holder 19 is provided on the lower end face of the inner ring of the second bearing 5, and the second bearing holder 19 is fixedly ringed on the outer wall of the tower column 1.

Using the second flange 8 with cone platform type or horn type, the cross section from the big end to the small end of the second flange 8 is uniformly transited, significant inner stress will not produced in the second flange 8, and therefore the strength of the second flange 8 is high and greater force can be withstand, at the same time, the size of the outer ring of the second bearing 5 and the cost of the vertical wind power generator are reduced; using "convex"-shape or stepped, the second flange 8 can be processed using common equipment with simple processing procedure, thus reducing the processing cost and processing time of the flanges; the providing of the sixth flange 12 facilitates the connecting between the second flange 8 and the bracket 201; the said second bearing holder 19 is used to bear the second bearing 5 and all the components it acts on the second bearing 5, thus increasing the installing fastness and the accuracy of position of the second bearing 5 and also enhancing the stability of the structure of the generator.

As shown in FIG. 3, the inner ring of the said third bearing 6 is fixedly ringed on the outer wall of the tower column 1, and is located above the second bearing 5, a third bearing holder 20 is provided on the lower end face of the inner ring of the third bearing 6, the third bearing holder 20 is fixedly ringed on the outer wall of the tower column 1, the third bearing holder 20 is used to bear the third bearing 6 and all the components it acts on the third bearing 6, thus increasing the installing fastness and the accuracy of position of the third bearing 6 and also enhancing the stability of the structure of the generator.

Figures 11, 12:
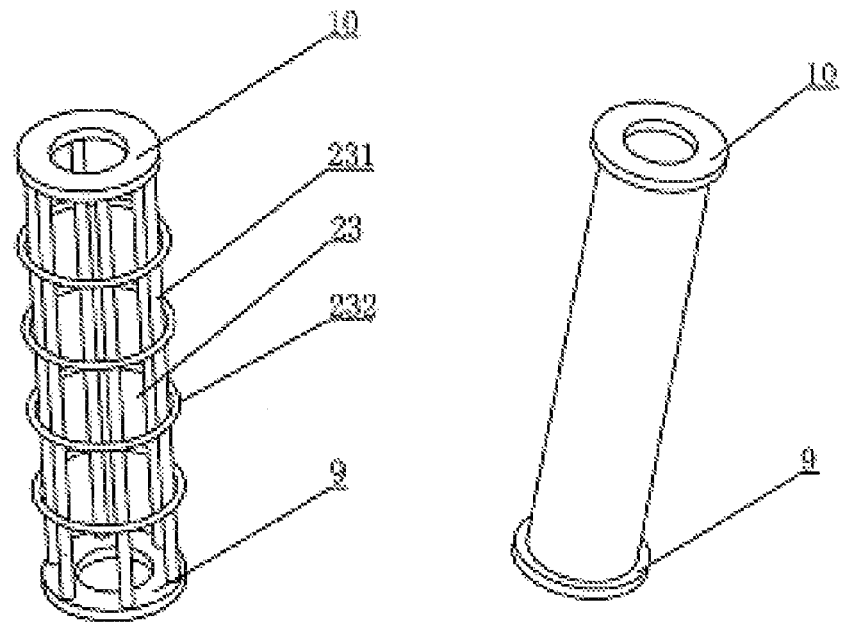
FIG. 11 is the structure diagram of the first form of the connection.
FIG. 12 is the structure diagram of the second form of the connection.

A third flange 9 is connected on the upper end face of the said seventh flange 13 by a bolt or welding, a fourth flange 10 is connected on the outer ring of the third bearing 6 by a bolt or welding, a connection 23 for transmitting torque is provided between the third flange 9 and the fourth flange 10, as shown in FIG. 12, the shown connection 23 is a hollow pipe, as shown in FIG. 11, the said connection 23 comprises at least two connecting rods 231, the upper ends of the said connecting rods 231 connect with the fourth flange 10, and the lower ends of the connecting rods 231 connect with the third flange 9, the said connecting rods 231 are provided on the circle, which is outside the tower column 1 and is concentric with the cross section of the tower column 1, and a reinforcing rib 232 is welded on the connecting rods 231 to enhance the strength of the connection 23; using a hollow pipe as the connection 23, its structure is simple and it is easy to manufacture, and has low manufacturing cost; and, when the hollow pipe rotates along with the third flange 9 and the fourth flange 10, it will not form rotation resistance at the hollow pipe to affect the power of the wind power generator, thus greatly increasing the power generation efficiency; using multiple connecting rods 231 as the connection, its structure is simple and the weight of the vertical wind power generator can be reduced; as shown in FIG. 3, two eighth flanges 21 are connected on the outer circle face of the third flange 9, two ninth flanges 22 are connected on the outer circle face of the fourth flange 10, the lower end of the said blade 3 connects with the third flange 9 by the eighth flange 21, the upper end of the blade 3 connects with the fourth flange 10 by the ninth flange 22. Providing the eighth flange 21 and the ninth flanges 22 facilitates the installing, dismantling and maintenance on the blade 3.

Figure 5:
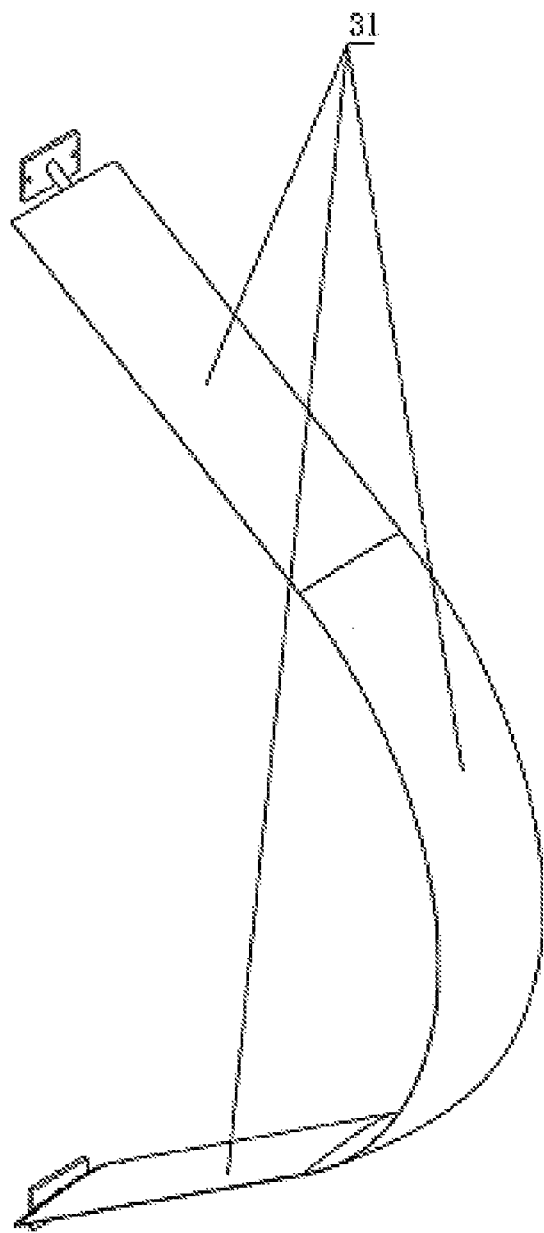
FIG. 5 is the pictorial view of the blade.
Figure 6:
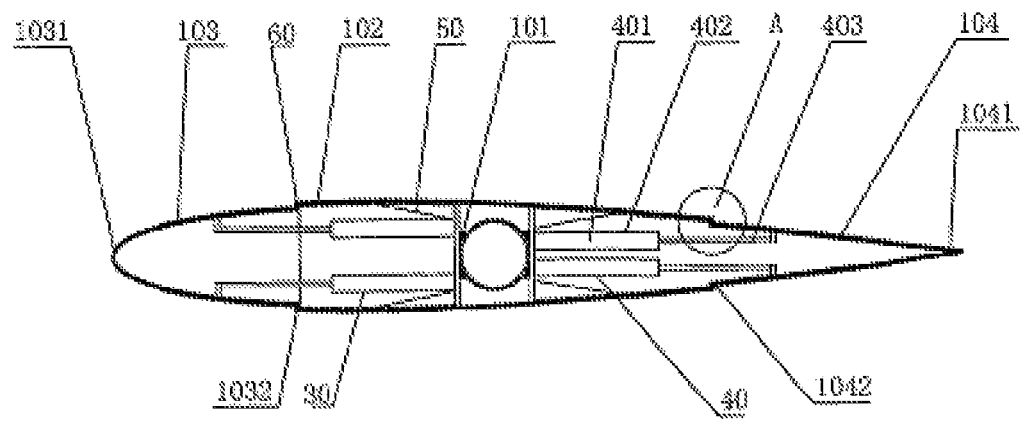
FIG. 6 is the sectional view of the first form of the blade.
Figure 8:
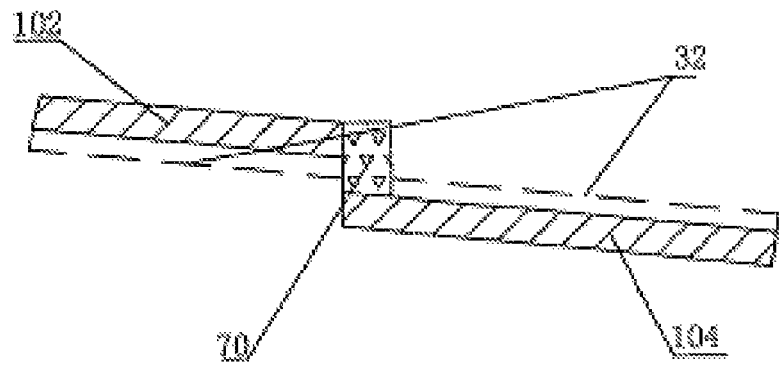
FIG. 8 is the partial enlarged view of A in FIG. 6.
Figure 9:
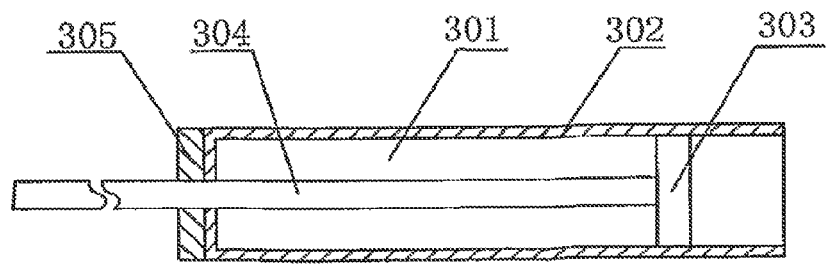
FIG. 9 is the structure diagram of the first hydraulic system.

In the blade 3 of vertical wind power generator as shown in FIG. 5 and FIG. 6, the said blade 3 is comprised of three blade units 31; as shown in FIG. 6, the cross section of the blade units 31 is olive-shaped with big middle and two small ends, and one end of the two small ends is arc-shaped and the other end is a tip, because the blade units 31 uses the kind of structure of cross section, the utilization rate of the wind power is high. The said blade units 31 include a skeleton 101, a blade body 102, a first blade tip 103 and the second blade tip 104; the blade body 102 is installed on the skeleton 103, and the skeleton 103 is located in the blade body 102; the said first blade tip 103 is provided on one end of the blade body 102 along the radial direction of the blade units 31, the tail of the first blade tip 103 is the said arc-shape, and the head 1032 of the first blade tip 103 stretches into the blade 102; the said second blade tip 104 is provided on the opposite end to the first blade tip 103 of the blade body 102 along the radial direction of the blade units 31, the tail 1041 of the second blade tip 104 is the said tip, and the head 1042 of the second blade tip 104 stretches into the blade body 102; as shown in FIG. 6 and FIG. 8, a first guide rail group (not shown) is provided between the blade body 102 and the first blade tip 103, a second guide rail group 32 is provided between the blade body 102 and the second blade tip 104; a first hydraulic system 30 is provided between the skeleton 101 and the first blade tip 103, a second hydraulic system 40 is provided between the skeleton 101 and the second blade tip 104, the said first hydraulic system 30 comprises a first hydraulic pump (not shown), a first hydraulic valve (not shown), a first hydraulic pipe (not shown) and a first hydraulic cylinder 301, as shown in FIG. 9, the said first hydraulic cylinder 301 comprises a first hydraulic cylinder body 302, a first piston 303, a first piston rod 304 and a first seal device 305, the first piston 303 is installed in the first hydraulic cylinder body 302, one end of the first piston rod 304 connects with the first piston 303, and the other end connects with the first blade tip 103 together, the first hydraulic cylinder body 302 is fixed on the skeleton 101, the first seal device 305 is installed on the two ends of the first hydraulic cylinder body 302, the said second hydraulic system 40 comprises a second hydraulic pump (not shown), a second hydraulic valve (not shown), a second hydraulic pipe (not shown) and a second hydraulic cylinder 401, the said second hydraulic cylinder 401 comprises a hydraulic cylinder body 402, a second piston (not shown), a second piston rod 403 and a second seal device (not shown), the second piston is installed in the second hydraulic cylinder body 402, one end of the second piston rod 403 connects with the second piston, and the other end connects with the second blade tip 104 together, the second hydraulic cylinder body 402 is fixed on the skeleton 101, the second seal device is installed on the two ends of the second hydraulic cylinder body 402; using the hydraulic system as the moving device, its stationarity of transmission is good, and it can be used on the moving equipment with big power, and when moving, it can achieve stepless speed regulating. And because the medium in the hydraulic cylinder body is hydraulic oil, which can achieve automatically lubricating, the operating life of the hydraulic system become longer, and the operating life of the blades also become longer. A blade reinforcing rib 50 is installed between the skeleton 101 and the blade body 102, thus enhancing the connecting strength between the skeleton 101 and the blade body 102; a first seal strip 60 is installed on the end of the blade body 102 near the first blade tip 103, and a second seal strip 70 is installed on the end of the blade body 102 near the second blade tip 104, and thus the rain and dust can be prevented from going into the blade unit 31, when the vertical wind power generator works, the working efficiency of the vertical wind power generator will be prevented from be affected caused by the forming of convection on both ends of the cross section of the blade unit.

As shown in FIG. 4, a cooling system is provided in the generator unit 2, including a fan blade 24, a cooler 25, a seal plate 26, a fan 27, and ducts 15 provided on the generator stator 2021, rotor 2022, exciter stator 2031 and exciter rotor 2032; as shown in FIG. 15, the said fan blade 24 is installed obliquely on the outer wall of the outer bracket 2011, each fan blade 24 is arc-shape, the seal plate 26 is fixedly ringed on the outer wall of the tower column 1, is located above of the internal exciter 203 on the upper end of the inner bracket 2012, and the fan 27 is installed on the seal plate 26; the cooler 25 is installed on the seal plate 26, and is provided above the fan 27; an air outlet 29 is opened on the lower end of the inner bracket 2012, and an air inlet 33 is opened on the upper end of the inner bracket 2012, the air inlet 33 is located above the seal plate 26, and the said air outlet 29 and air inlet 33 connect with the bracket duct; an external cooler 34 is provided in the tower column 1, and the cooler 25 connects with the external cooler 34 by a liquid-feeding pipe 35 and a drainpipe 36.

Figure 17:
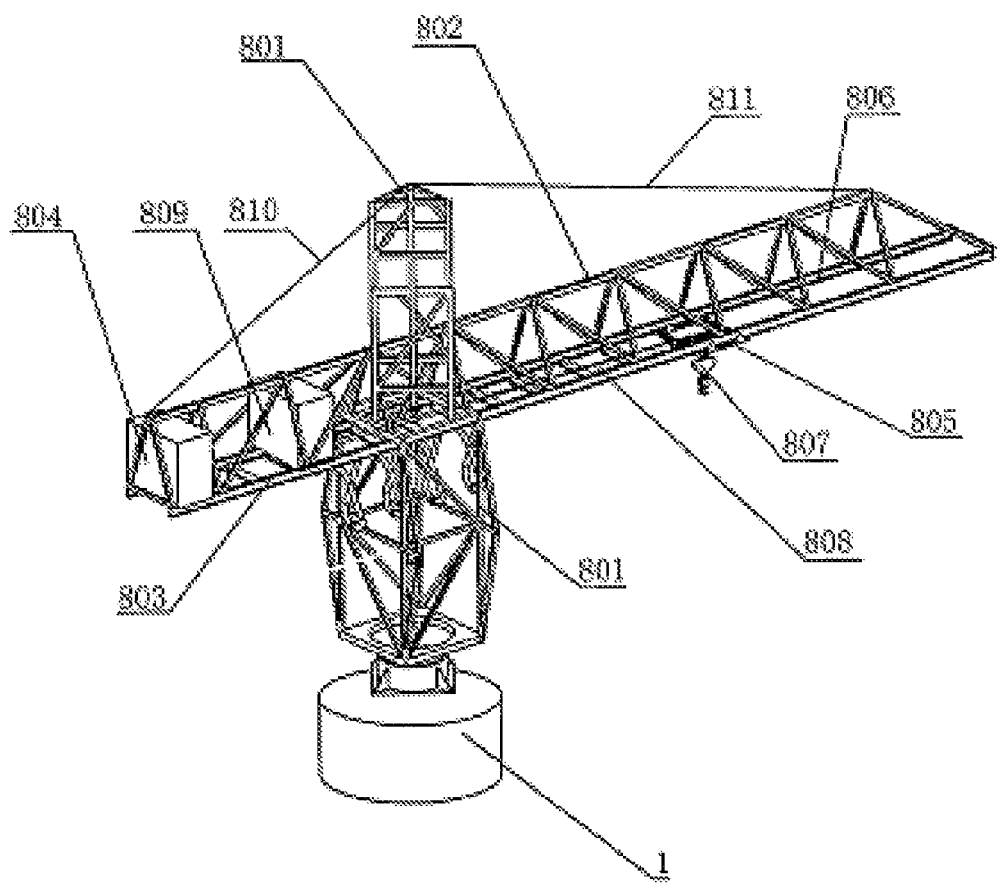
FIG. 17 is the pictorial view of the crane.

As shown in FIG. 17, a crane 80 is provided on the top of the said tower column 1, the said crane 80 comprises a rotating tower 801, a crane arm 802, a balance arm 803, a balance weight 804, a crane car 805, a guide rail 806, a hook 807, an inhaul cable 808, a hoisting mechanism 809 and a controlling system (not shown). The said rotating tower 801 connects with the top of the tower column 1, the crane arm 802 and balance arm 803 are installed on the rotating tower 801, and the rotating tower 801 can rotate 360°; the balance weight 804 is installed on one end of the balance arm 803; the guide rail 806 is provided on the crane arm 802, the crane car 805 is provided on the guide rail 806, and the crane car 805 can move on the guide rail 806 front and back; the hook 807 is provided below the crane car 805, the hook 807 connects with one end of the inhaul cable 808, the other end of the inhaul cable 808 connects with the hoisting mechanism 809, and the up and down of the hook 807 is controlled by the hoisting mechanism 809. In addition, a balance arm pull rod 810 is provided between the top of the said rotating tower 801 and the balance arm 803, one end of the balance arm pull rod 810 fixedly connects with the top of the rotating tower 801, and the other end of the balance arm pull rod 810 fixedly connects with the balance arm 803; a crane arm pull rod 811 is provided between the top of the said rotating tower 801 and the crane arm 802, one end of the crane arm pull rod 811 fixedly connects with the top of the rotating tower 801, and the other end of the crane arm pull rod 811 fixedly connects with the crane arm 802; the balance arm pull rod 810 and the crane arm pull rod 811 ensure the structure stability of the crane 80 and increase the crane load of the crane 80.

As shown in FIG. 3, a lift system is provided in the said tower column 1, the said lift system is an elevator 37, and the said elevator 37 includes a lift car 371 and a lift car lift mechanism 372, the up and down of the lift car 371 is achieved by the lift car lift mechanism 372.

The outer ring of the said first bearing 4, the second bearing 5 and the third bearing 6 is provided with a brake device (not shown).

The operating process of the abovementioned vertical wind power generator mainly includes several parts, i.e., power generating of the wind power generator, the cooling on the generator, the starting of the generator as a motor, and detecting. The working principle of these several parts will be explained in the following.

Figure 7:
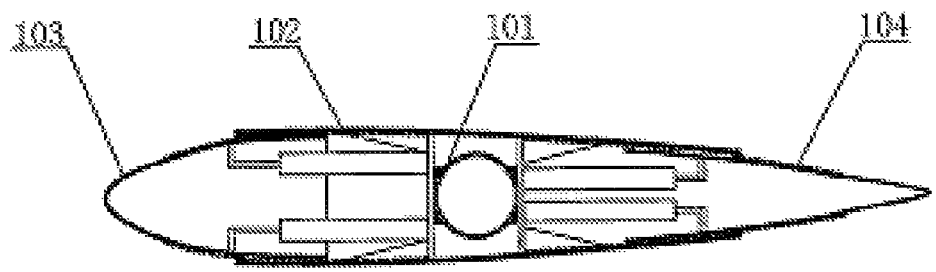
FIG. 7 is the sectional view of the first form of the blade, wherein the first blade tip and the second blade tip stretch into the blade body.

The working principle of power generating of the vertical wind power generator is: the blade 3 starts to rotate by the pushing of the wind, the torque is generated after the blade 3 rotates, and the torque generated by the blade 3 is transmitted to the fourth flange 10 and to the third flange 9 by the lower end of the blade 3, at that time, the third flange 9 and the fourth flange 10 rotate with the blade 3, the torque transmitted to the fourth flange 10 is transmitted to the third flange 9 by the connection 23, the third flange 9 transmits the torque to the bracket 201 successively by the seventh flange 13, the second flange 8 and the sixth flange 12, and the bracket 201 drives the rotor 2022 and the exciter rotor 2032 to rotate, making the rotor 2022 rotate around the stator 2021, and making the exciter rotor 2032 rotate around the exciter stator 2031, in the rotating course of the exciter rotor 2032, the exciter rotor winding in the exciter rotor 2032 generates alternating current, and then the rotation rectifying device transforms the alternating current into direct current and transfers the direct current into the rotor winding of the generator rotor 2022, magnetic field is generated after the generator rotor winding is charged with direct current, because of the rotating action of the generator rotor 2022, the generator rotor winding will generate magnetic field close to sinusoidal distribution, the generator stator winding on the generator stator 2021 does the movement of cutting magnetic field line, and induces the three-phase alternating current potential in the generator stator winding, so as to achieve the purpose of power generation. In this structure, because of the providing of the third flange 9, the fourth flange 10 and the connection 23, the torque generated by the blade 3 is not only transmitted to the third flange 9, but also transmitted to the fourth flange 10, and the fourth flange 10 transmits the torque to the third flange 9 by the connection 23, balancing the force on the upper end and lower end of the blade 3, and thus making blade 3 not easy to deform, therefore, the blade 3 is not easy to be damaged, increasing the life of the vertical wind power generator. As shown in FIG. 6, in the rotating course of the blade 3, when the wind power is small, the first blade tip 103 and the second blade tip 104 are open, thus the area of the windward side of the blade 3 is big, and the power of the vertical wind power generator is big; as shown in FIG. 7, when the wind power becomes bigger, the first blade tip 103 moves toward the direction of the skeleton 101 along the first guide rail group under the action of the first hydraulic system 30, and the first blade tip 103 shrinks, at the same time, the second blade tip 104 moves toward the direction of the skeleton 101 along the second guide rail group 2 under the action of the second hydraulic system 40, and the second blade tip 104 shrinks, at that time, the area of the windward side of the blade 3 decreases, the power of the vertical wind power generator is automatically adjusted, using this structure, preventing the failure of the vertical wind power generator caused by its excessive power leaded by the excessive wind speed.

The working principle of the cooling system is: the fan 27 works and forms wind current, cool wind reaches the lower end of the generator by the duct 15 of the exciter rotor 2032, exciter stator 2031, rotor 2022 and stator 2021, playing the role of cooling the exciter and generator, at that time, the cool wind becomes hot wind, flows into the bracket duct 2013 by the air inlet 29, and does heat exchange with the outside air by the outer bracket 2011 at here, making the hot wind in the wind current become cool wind, and then the wind current flows into the cooler 25 by the air inlet 33, the wind current is further cooler at here and flows into the inner cavity of the wind power generator by the fan 27, forming an inner cycle. Because the fan blade 24 is provided outside the outer bracket 2011 of the rotor, and the fan blade 24 is obliquely installed on the outer wall of the outer bracket 2011, when the bracket 201 rotates, the fan blade 24 rotates along with it, at that time, the upper and lower wind pressure difference is formed on the fan blade 24, making the outside air near the generator form wind current flowing from high pressure to low pressure, that is, form an outer cycle, so the efficiency of heat exchange between the wind current in the inner cycle and the outside is increased, the cooling effect on the generator is improved and the operating life of the generator is increased.

The working process of the external cooler 34 and the cooler 25 is: the external cooler 34 transmits the cooling liquid into the cooler 25 by the liquid-feeding pipe 35, the cooling liquid does heat exchange in the cooler 25 with the wind in the inner cycle, and then becomes hot water and flows into the external cooler 34 by the drainpipe to be cooled, and the abovementioned process continues to cycle, improving the cooling effect of the wind current in the inner cycle in the cooler 25, improving the cooling effect on the generator is and increasing the operating life of the generator.

The working process of the generator used as a motor to start is: (1)

the motor operates: as shown in FIG. 10, when the wind power generator is in a low wind speed or hard to start, the excitation control device 16 is disconnected from the power grid 17, the current in the exciter stator winding is zero, the generator operates in electric mode, the generator stator winding connects with the power grid 17, the power grid 17 provides alternating current to the generator stator winding by the bidirectional frequency converter 15, at that time, a rotating magnetic field is generated in the air gap 14 of the stator 2021 and the rotor 2022, a relative motion is generated between the rotating magnetic field and the generator rotor winding as well as the damper winding 38, the generator rotor winding cuts magnetic field line and generates induced electromotive force in the generator rotor winding and the damper winding 38, induced current is generated in the generator rotor winding and the damper winding 38 after the generator rotor winding and the damper winding close, the rotating magnetic field and the induced current interact and generates electromagnetic torque to make the generator rotor 2022 rotate to achieve asynchronous running, thus the problem of the wind power generator in a low wind speed or hard to start is solved. When the generator operates as a motor, the rotate speed of the generator as a motor is adjusted by adjusting the output frequency of the bidirectional frequency converter 15. (2) the generator operates: when the wind speed becomes bigger, and the rotate speed of the generator meets the cut-in wind speed, firstly, let the generate operates at the abovementioned motor status, and drive the exciter rotor 2032 to rotate, alternating current is induced from the exciter rotor winding, after the alternating current is rectified by the rotation rectifying device 161, the direct current is input into the generator rotor winding, and three-phase alternating current is induced from the generator stator winding. At that time, the bidirectional frequency converter 15 is controlled to stop working temporarily, the generator exits from working status of the motor, the torque generated by the blade 3 drives the bracket 201 to rotate, the bracket 201 drives the generator rotor 2022 and the exciter rotor 2032 to rotate, and lets the excitation control device 16 start to work, and the generator starts to operate as a synchronous generator. After transforming from the motor into the generator, the bidirectional frequency converter 15 starts to work again, and the three-phase alternating current in the generator stator winding goes through the rectifying and filtering of the bidirectional frequency converter 15, is accessed to the power grid 17, and conducts generator operation. When the wind speed changes, the rotate speed of the generator changes with it, the frequency of the induced current in the generator stator winding changes with it as well, at that time, the working parameters of the bidirectional frequency converter 15 can be adjusted to ensure the output frequency invariant and achieve variable speed constant frequency operation. When the generator operates at the generator status, the exciting current obtained by the generator rotor winding is adjusted by adjusting the current output of the excitation control device 16, so as to achieve the adjusting on the output power of the generator. (3) When the wind speed exceeds a certain range, the connection between the excitation control device 16 and the power grid 17 is cut, that between the bidirectional frequency converter 15 and the generator is cut too, the power generation system neither consume electric energy, nor output electric energy, at the same time, the brake device can also limit the rotate speed of the generator, preventing the wind power generator being damaged.

The maintenance and detection on the vertical wind power generator are achieved by the lift system and the crane 80, and the achieving process is: the operators can reach any one generator unit 2 in the tower column 1 by the lift system, and also can reach the crane 80, the operators can operate on the hook 807 in the crane 80, and the said hook 807 connects with the hoisting mechanism 809 by the inhaul cable 808, so the position on the vertical direction of the hook 807 can be adjusted, the crane car 805 is provided on the guide rail 806, and the crane car 805 can slide on the guide rail 806, so the position on the horizontal direction of the hook 807 can be adjusted, because the rotating tower 801 can rotate 360°, hence, the operators can maintain and detect on anywhere of the vertical wind power generator without the need to additionally build a maintaining tower and other large scale equipment, greatly saving the maintenance cost and maintenance and detection time.

The Second Embodiment

The vertical wind power generator as shown in FIG. 1 to FIG. 3, includes a tower column 1, at least one generator unit 2, at least two blades 3, a first bearing 4, a second bearing 5, a third bearing 6, a first flange 7, a second flange 8, a third flange 9, a fourth flange 10, a fifth flange 11, a sixth flange 12, and a seventh flange 13, and in this embodiment, the generator unit 2 is one, the blades 3 are two, the central axis of the tower column 1 is perpendicular to the horizontal plane, and the said tower column 1 is a hollow structure.

As shown in FIG. 3 and FIG. 4, the said generator unit 2 comprises a bracket 201, a generator 202 and an exciter 203.

See FIG. 3 and FIG. 4, the said bracket 201 is comprised of an outer bracket 2011 and an inner bracket 2012, the outer bracket 2011 is provided outside the inner bracket 2012, and a bracket duct 2013 is formed between the outer bracket 2011 and the inner bracket 2012.

See FIG. 3 and FIG. 4, the said generator 202 comprises a stator 2021 and a rotor 2022, the stator 2021 is fixedly ringed on the outer wall of the tower column 1, the rotor 2022 is provided outside the stator 2021, and is fixedly installed on the inner wall of the inner bracket 2012, a generator stator winding (not shown) is provided in the stator 2021, a generator rotor winding (not shown) is provided in the rotor 2022, an air gap 14 is provided between the stator 2021 and the rotor 2022, and ducts 15 is provided in the stator 2021 and the rotor 2022; a damper winding 38 is installed on the rotor 2022, as shown in FIG. 13 and FIG. 14, the damper winding 38 comprises an end ring 381 and a damper bar 382, and the damper bar 382 is installed on the end ring 381.

See FIG. 3 and FIG. 4, the said exciter 203 comprises an exciter stator 2031 and an exciter rotor 2032, the exciter stator 2031 is fixedly ringed on the outer wall of the tower column 1, the exciter rotor 2032 is provided outside the exciter stator 2031, and is fixedly installed on the inner wall of the inner bracket 2012, an exciter stator winding (not shown) is provided in the exciter stator 2031, an exciter rotor winding (not shown) is provided in the exciter rotor 2032, there is air gap 14 between the exciter stator 2031 and the exciter rotor 2032, and the ducts 15 are provided in the said exciter stator 2031 and the exciter rotor 2032; as shown in FIG. 3 and FIG. 4, the said exciter 203 is installed above the generator 202, of course, see FIG. 16, the exciter 203 may also be installed below the generator 202.

As shown in FIG. 10, the generator stator winding links with a power grid 17 through a bidirectional frequency converter 15, the generator stator winding links with the exciter stator winding through the bidirectional frequency converter 15 and the excitation control device 16; the generator rotor winding links with the exciter rotor winding through a rotation rectifying device 161.

As shown in FIG. 3, a stator holder 2023 is provided on the lower end face of the generator stator 2021, the stator holder 2023 is fixedly ringed on the outer wall of the tower column 1, and the stator holder 2023 plays a role in bearing the stator 2021, increasing the fastness and the accuracy of the position when the stator 2021 is installed on the tower column 1; an exciter stator holder 2033 is provided on the lower end face of the exciter stator 2031, the exciter stator holder 2033 is fixedly ringed on the outer wall of the tower column 1, and the exciter stator holder 2033 plays a role in bearing the exciter stator 2031, increasing the fastness and the accuracy of the position when the exciter stator 2031 is installed on the tower column 1.

As shown in FIG. 3 and FIG. 4, the said fifth flange 11, first flange 7, first bearing 4 are successively provided below the bracket 201 from top to bottom; the upper end face of the fifth flange 11 connects with the lower end face of the bracket 201 by welding; the two cross sections on the upper end and lower end of the said first flange 7 are not equal, as shown in FIG. 4, the first flange 7 is cone platform-type, as shown in FIGS. 18 and 19, the first flange 7 is horn-type, as shown in FIG. 20, the first flange 7 is "convex"-shape, as shown in FIG. 21, the first flange 7 is stepped, of course, the first flange 7 is not limited to the above-mentioned four kinds of structure, the big end of the said first flange 7 connects with the fifth flange 11 by a bolt or welding, and the small end of the first flange 7 connects with the outer ring of the first bearing 4 by a bolt or welding or interference fit; the inner ring of the said first bearing 4 is fixedly ringed on the outer wall of the tower column 1, a first bearing holder 18 is on the lower end face of the inner ring of the first bearing 4, and the first bearing holder 18 is fixedly ringed on the outer wall of the tower column 1.

Using the first flange 7 with the cone platform type or horn type, the cross section from big end to small end of the first flange 7 is uniformly transited, significant inner stress will not produced in the first flange 7, and therefore the strength is enhanced and greater force can be withstand, at the same time, reducing the size of the outer ring of the first bearing 4 and the cost of the vertical wind power generator; using "convex"-shape or stepped, the first flange 7 can be processed using common equipment with simple processing procedure, thus reducing the processing cost and processing time of the flanges; the providing of the fifth flange 11 facilitates the connecting between the first flange 7 and the bracket 201; the said first bearing holder 18 is used to bear the first bearing 4 and all the components it acts on the first bearing 4, thus increasing the installing fastness and the accuracy of position of the first bearing 4 and also enhancing the stability of the structure of the generator.

As shown in FIG. 3 and FIG. 4, the sixth flange 12, the second flange 8 and the second bearing 5 are successively provided above the bracket 201 from top to bottom; the sixth flange 12 is connected on the upper end face of the bracket 201 by welding, the two cross sections of the upper end and the lower end of the said sixth flange 12 are not equal, as shown in FIG. 3 and FIG. 4, the second flange 8 is cone platform-type, as shown in FIG. 18 and FIG. 19, the second flange 8 is horn-type, as shown in FIG. 20, the second flange 8 is "convex"-shape, as shown in FIG. 21, the second flange 8 is stepped, of course, the second flange 8 is not limited to the abovementioned four kinds of structure, the big end of the second flange 8 is connected on the sixth flange 12 by a bolt or welding; the inner ring of the said second bearing 8 is fixedly ringed on the outer wall of the tower column 1; the said seventh flange 13 is ringed on the outer wall of the outer ring of the second bearing 5 by interference fit, and the lower end face of the seventh flange 13 is connected on the small end of the second flange 8 by a bolt or welding; a second bearing holder 19 is provided on the lower end face of the inner ring of the second bearing 5, and the second bearing holder 19 is fixedly ringed on the outer wall of the tower column 1.

Using the second flange 8 with cone platform type or horn type, the cross section from the big end to the small end of the second flange 8 is uniformly transited, significant inner stress will not produced in the second flange 8, and therefore the strength of the second flange 8 is enhanced and greater force can be withstand, at the same time, the size of the outer ring of the second bearing 5 and the cost of the vertical wind power generator are reduced; using "convex"-shape or stepped, the second flange 8 can be processed using common equipment with simple processing procedure, thus reducing the processing cost and processing time of the flanges; the providing of the sixth flange 12 facilitates the connecting between the second flange 8 and the bracket 201; the said second bearing holder 19 is used to bear the second bearing 5 and all the components it acts on the second bearing 5, thus increasing the installing fastness and the accuracy of position of the second bearing 5 and also enhancing the stability of the structure of the generator.

As shown in FIG. 3, the inner ring of the said third bearing 6 is fixedly ringed on the outer wall of the tower column 1, and is located above the second bearing 5, a third bearing holder 20 is provided on the lower end face of the inner ring of the third bearing 6, the third bearing holder 20 is fixedly ringed on the outer wall of the tower column 1, the third bearing holder 20 is used to bear the third bearing 6 and all the components it acts on the third bearing 6, thus increasing the installing fastness and the accuracy of position of the third bearing 6 and also enhancing the stability of the structure of the generator.

A third flange 9 is connected on the upper end face of the said seventh flange 13 by a bolt or welding, a fourth flange 10 is connected on the outer ring of the third bearing 6 by a bolt or welding, a connection 23 for transmitting torque is provided between the third flange 9 and the fourth flange 10, as shown in FIG. 12, the shown connection 23 is a hollow pipe, as shown in FIG. 11, the said connection 23 comprises at least two connecting rods 231, the upper ends of the said connecting rods 231 connect with the fourth flange 10, and the lower ends of the connecting rods 231 connect with the third flange 9, the said connecting rods 231 are provided on the circle, which is outside the tower column 1 and is concentric with the cross section of the tower column 1, and a reinforcing rib 232 is welded on the connecting rods 231 to enhance the strength of the connection 23; using a hollow pipe as the connection 23, its structure is simple and it is easy to manufacture, and has low manufacturing cost; and, when the hollow pipe rotates along with the third flange 9 and the fourth flange 10, it will not form rotation resistance at the hollow pipe to affect the power of the wind power generator, thus greatly increasing the power generation efficiency; using multiple connecting rods 231 as the connection, its structure is simple and the weight of the vertical wind power generator can be reduced; as shown in FIG. 3, two eighth flanges 21 are connected on the outer circle face of the third flange 9, two ninth flanges 22 are connected on the outer circle face of the fourth flange 10, the lower end of the said blade 3 connects with the third flange 9 by the eighth flange 21, the upper end of the blade 3 connects with the fourth flange 10 by the ninth flange 22. Providing the eighth flange 21 and the ninth flanges 22 facilitates the installing, dismantling and maintenance on the blade 3.

Figure 22:
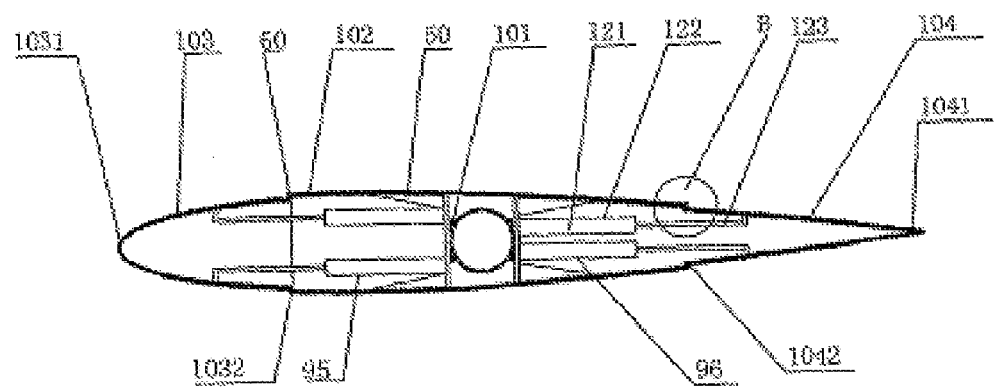
FIG. 22 is the sectional view of the second form of the blade.
Figure 23:
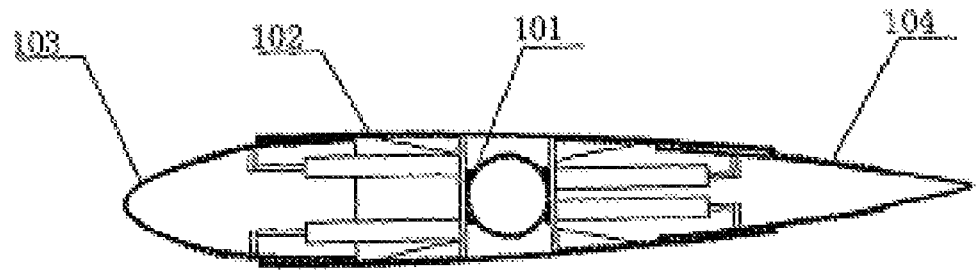
FIG. 23 is the sectional view of the second form of the blade, wherein the first blade tip and the second blade tip stretch into the blade body.
Figure 24:
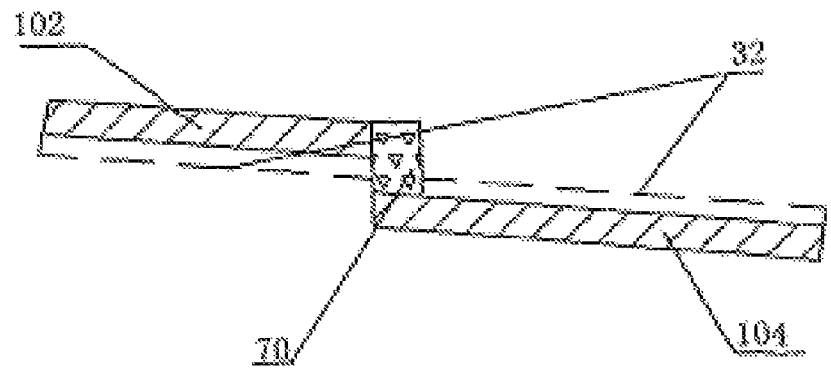
FIG. 24 is the partial enlarged view of B in FIG. 22.
Figure 25:
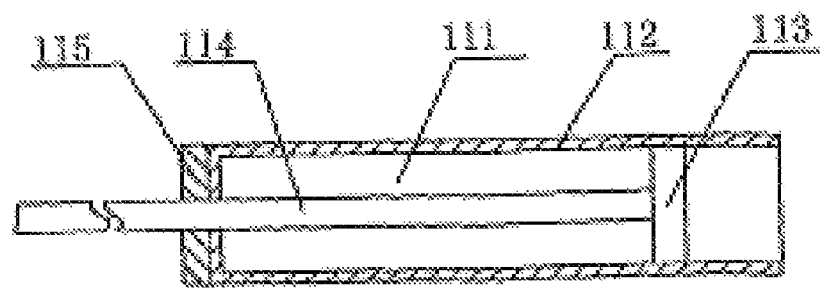
FIG. 25 is the structure diagram of the first pneumatic system.

In the blade 3 of vertical wind power generator as shown in FIG. 5, FIG. 22 to FIG. 25, the said blade 3 is comprised of three blade units 31; as shown in FIG. 22, the cross section of the blade units 31 is olive-shaped with big middle and two small ends, and one end of the two small ends is arc-shaped and the other end is a tip, because the blade units 31 uses the kind of structure of cross section, the utilization rate of the wind power is high. The said blade units 31 include a skeleton 101, a blade body 102, a first blade tip 103 and the second blade tip 104; the blade body 102 is installed on the skeleton 103, and the skeleton 103 is located in the blade body 102; the said first blade tip 103 is provided on one end of the blade body 102 along the radial direction of the blade units 31, the tail of the first blade tip 103 is the said arc-shape, and the head 1032 of the first blade tip 103 stretches into the blade 102; the said second blade tip 104 is provided on the opposite end to the first blade tip 103 of the blade body 102 along the radial direction of the blade units 31, the tail 1041 of the second blade tip 104 is the said tip, and the head 1042 of the second blade tip 104 stretches into the blade body 102; as shown in FIG. 22 and FIG. 25, a first guide rail group (not shown) is provided between the blade body 102 and the first blade tip 103, a second guide rail group 32 is provided between the blade body 102 and the second blade tip 104; a first pneumatic system 95 is provided between the skeleton 101 and the first blade tip 103, a second pneumatic system 96 is provided between the skeleton 101 and the second blade tip 104, the said first pneumatic system 95 comprises a first air compressor (not shown) and a first pneumatic cylinder 111, as shown in FIG. 25, the said first pneumatic cylinder 111 comprises a first pneumatic cylinder body 112, a first pneumatic piston 113, a first pneumatic piston rod 114 and a first pneumatic seal device 115, the first pneumatic piston 113 is installed in the first pneumatic cylinder body 112, one end of the first pneumatic piston rod 114 connects with the first pneumatic piston 113, and the other end connects with the first blade tip 103 together, the first pneumatic cylinder body 112 is fixed on the skeleton 101, the first seal device 115 is installed on the two ends of the first pneumatic cylinder body 112, the said second pneumatic system 121 comprises a second pneumatic cylinder body 122, a second pneumatic piston (not shown), a second pneumatic piston rod 123 and a second pneumatic seal device (not shown), the second pneumatic piston is installed in the second pneumatic cylinder body 122, one end of the second pneumatic seal device connects with the second pneumatic piston, and the other end connects with the second blade tip 104 together, the second pneumatic cylinder 122 is fixed on the skeleton 101 and the second seal device is installed on the two ends of the second pneumatic cylinder 122; using the pneumatic cylinder system as the moving device, because its power medium is gas, it has light weight, and the resource of the medium is rich and is pollution-free; because the viscosity of the gas is small, therefore, the resistance between the gas and pneumatic cylinder body is small. A blade reinforcing rib 50 is also installed between the skeleton 101 and the blade body 102, thus enhancing the connecting strength between the skeleton 101 and the blade body 102; a first seal strip 60 is installed on the end of the blade body 102 near the first blade tip 103, and a second seal strip 70 is installed on the end of the blade body 102 near the second blade tip 104, and thus the rain and dust can be prevented from going into the blade unit, when the vertical wind power generator works, the working efficiency of the vertical wind power generator will be prevented from be affected caused by the forming of convection on both ends of the cross section of the blade unit.

As shown in FIG. 4, a cooling system is provided in the generator unit 2, including a fan blade 24, a cooler 25, a seal plate 26, a fan 27, and ducts 15 provided on the generator stator 2021, rotor 2022, exciter stator 2031 and exciter rotor 2032; as shown in FIG. 15, the said fan blade 24 is installed obliquely on the outer wall of the outer bracket 2011, each fan blade 24 is arc-shape, the seal plate 26 is fixedly ringed on the outer wall of the tower column 1, is located above of the internal exciter 203 on the upper end of the inner bracket 2012, and the fan 27 is installed on the seal plate 26; the cooler 25 is installed on the seal plate 26, and is provided above the fan 27; an air outlet 29 is opened on the lower end of the inner bracket 2012, and an air inlet 33 is opened on the upper end of the inner bracket 2012, the air inlet 33 is located above the seal plate 26, and the said air outlet 29 and air inlet 33 connect with the bracket duct; an external cooler 34 is provided in the tower column 1, and the cooler 25 connects with the external cooler 34 by a liquid-feeding pipe 35 and a drainpipe 36.

As shown in FIG. 17, a crane 80 is provided on the top of the said tower column 1, the said crane 80 comprises a rotating tower 801, a crane arm 802, a balance arm 803, a balance weight 804, a crane car 805, a guide rail 806, a hook 807, an inhaul cable 808, a hoisting mechanism 809 and a controlling system (not shown). The said rotating tower 801 connects with the top of the tower column 1, the crane arm 802 and balance arm 803 are installed on the rotating tower 801, and the rotating tower 801 can rotate 360°; the balance weight 804 is installed on one end of the balance arm 803; the guide rail 806 is provided on the crane arm 802, the crane car 805 is provided on the guide rail 806, and the crane car 805 can move on the guide rail 806 front and back; the hook 807 is provided below the crane car 805, the hook 807 connects with one end of the inhaul cable 808, the other end of the inhaul cable 808 connects with the hoisting mechanism 809, and the up and down of the hook 807 is controlled by the hoisting mechanism 809. In addition, a balance arm pull rod 810 is provided between the top of the said rotating tower 801 and the balance arm 803, one end of the balance arm pull rod 810 fixedly connects with the top of the rotating tower 801, and the other end of the balance arm pull rod 810 fixedly connects with the balance arm 803; a crane arm pull rod 811 is provided between the top of the said rotating tower 801 and the crane arm 802, one end of the crane arm pull rod 811 fixedly connects with the top of the rotating tower 801, and the other end of the crane arm pull rod 811 fixedly connects with the crane arm 802; the balance arm pull rod 810 and the crane arm pull rod 811 ensure the structure stability of the crane 80 and increase the crane load of the crane 80.

As shown in FIG. 3, a lift system is provided in the said tower column 1, the said lift system is an elevator 37, and the said elevator 37 includes a lift car 371 and a lift car lift mechanism 372, the up and down of the lift car 371 is achieved by the lift car lift mechanism 372.

The outer ring of the said first bearing 4, the second bearing 5 and the third bearing 6 is provided with a brake device (not shown).

The operating process of the abovementioned vertical wind power generator mainly includes several parts, i.e., power generating of the wind power generator, the cooling on the generator, the starting of the generator as a motor, and detecting. The working principle of these several parts will be explained in the following.

The working principle of power generating of the vertical wind power generator is: the blade 3 starts to rotate by the pushing of the wind, the torque is generated after the blade 3 rotates, and the torque generated by the blade 3 is transmitted to the fourth flange 10 and to the third flange 9 by the lower end of the blade 3, at that time, the third flange 9 and the fourth flange 10 rotate with the blade 3, the torque transmitted to the fourth flange 10 is transmitted to the third flange 9 by the connection 23, the third flange 9 transmits the torque to the bracket 201 successively by the seventh flange 13, the second flange 8 and the sixth flange 12, and the bracket 201 drives the rotor 2022 and the exciter rotor 2032 to rotate, making the rotor 2022 rotate around the stator 2021, and making the exciter rotor 2032 rotate around the exciter stator 2031, in the rotating course of the exciter rotor 2032, the exciter rotor winding in the exciter rotor 2032 generates alternating current, and then the rotation rectifying device transforms the alternating current into direct current and transfers the direct current into the rotor winding of the generator rotor 2022, magnetic field is generated after the generator rotor winding is charged with direct current, because of the rotating action of the generator rotor 2022, the generator rotor winding will generate magnetic field close to sinusoidal distribution, the generator stator winding on the generator stator 2021 does the movement of cutting magnetic field line, and induces the three-phase alternating current potential in the generator stator winding, so as to achieve the purpose of power generation. In this structure, because of the providing of the third flange 9, the fourth flange 10 and the connection 23, the torque generated by the blade 3 is not only transmitted to the third flange 9, but also transmitted to the fourth flange 10, and the fourth flange 10 transmits the torque to the third flange 9 by the connection 23, balancing the force on the upper end and lower end of the blade 3, and thus making blade 3 not easy to deform, therefore, the blade 3 is not easy to be damaged, increasing the life of the vertical wind power generator. As shown in FIG. 6, in the rotating course of the blade 3, when the wind power is small, the first blade tip 103 and the second blade tip 104 are open, thus the area of the windward side of the blade 3 is big, and the power of the vertical wind power generator is big; as shown in FIG. 7, when the wind power becomes bigger, the first blade tip 103 moves toward the direction of the skeleton 101 along the first guide rail group under the action of the first pneumatic system 95, and the first blade tip 103 shrinks, at the same time, the second blade tip 104 moves toward the direction of the skeleton 101 along the second guide rail group 2 under the action of the second pneumatic system 96, and the second blade tip 104 shrinks, at that time, the area of the windward side of the blade 3 decreases, the power of the vertical wind power generator is automatically adjusted, using this structure, preventing the failure of the vertical wind power generator caused by its excessive power leaded by the excessive wind speed.

The working principle of the cooling system is: the fan 27 works and forms wind current, cool wind reaches the lower end of the generator by the duct 15 of the exciter rotor 2032, exciter stator 2031, rotor 2022 and stator 2021, playing the role of cooling the exciter and generator, at that time, the cool wind becomes hot wind, flows into the bracket duct 2013 by the air inlet 29, and does heat exchange with the outside air by the outer bracket 2011 at here, making the hot wind in the wind current become cool wind, and then the wind current flows into the cooler 25 by the air inlet 33, the wind current is further cooler at here and flows into the inner cavity of the wind power generator by the fan 27, forming an inner cycle. Because the fan blade 24 is provided outside the outer bracket 2011 of the rotor, and the fan blade 24 is obliquely installed on the outer wall of the outer bracket 2011, when the bracket 201 rotates, the fan blade 24 rotates along with it, at that time, the upper and lower wind pressure difference is formed on the fan blade 24, making the outside air near the generator form wind current flowing from high pressure to low pressure, that is, form an outer cycle, so the efficiency of heat exchange between the wind current in the inner cycle and the outside is increased, the cooling effect on the generator is improved and the operating life of the generator is increased.

The working process of the external cooler 34 and the cooler 25 is: the external cooler 34 transmits the cooling liquid into the cooler 25 by the liquid-feeding pipe 35, the cooling liquid does heat exchange in the cooler 25 with the wind in the inner cycle, and then becomes hot water and flows into the external cooler 34 by the drainpipe to be cooled, and the abovementioned process continues to cycle, improving the cooling effect of the wind current in the inner cycle in the cooler 25, improving the cooling effect on the generator is and increasing the operating life of the generator.

The working process of the generator used as a motor to start is: (1) the motor operates: as shown in FIG. 10, when the wind power generator is in a low wind speed or hard to start, the excitation control device 16 is disconnected from the power grid 17, the current in the exciter stator winding is zero, the generator operates in electric mode, the generator stator winding connects with the power grid 17, the power grid 17 provides alternating current to the generator stator winding by the bidirectional frequency converter 15, at that time, a rotating magnetic field is generated in the air gap 14 of the stator 2021 and the rotor 2022, a relative motion is generated between the rotating magnetic field and the generator rotor winding as well as the damper winding 38, the generator rotor winding cuts magnetic field line and generates induced electromotive force in the generator rotor winding and the damper winding 38, induced current is generated in the generator rotor winding and the damper winding 38 after the generator rotor winding and the damper winding close, the rotating magnetic field and the induced current interact and generates electromagnetic torque to make the generator rotor 2022 rotate to achieve asynchronous running, thus the problem of the wind power generator in a low wind speed or hard to start is solved. When the generator operates as a motor, the rotate speed of the generator as a motor is adjusted by adjusting the output frequency of the bidirectional frequency converter 15. (2) the generator operates: when the wind speed becomes bigger, and the rotate speed of the generator meets the cut-in wind speed, firstly, let the generate operates at the abovementioned motor status, and drive the exciter rotor 2032 to rotate, alternating current is induced from the exciter rotor winding, after the alternating current is rectified by the rotation rectifying device 161, the direct current is input into the generator rotor winding, and three-phase alternating current is induced from the generator stator winding. At that time, the bidirectional frequency converter 15 is controlled to stop working temporarily, the generator exits from working status of the motor, the torque generated by the blade 3 drives the bracket 201 to rotate, the bracket 201 drives the generator rotor 2022 and the exciter rotor 2032 to rotate, and lets the excitation control device 16 start to work, and the generator starts to operate as a synchronous generator. After transforming from the motor into the generator, the bidirectional frequency converter 15 starts to work again, and the three-phase alternating current in the generator stator winding goes through the rectifying and filtering of the bidirectional frequency converter 15, is accessed to the power grid 17, and conducts generator operation. When the wind speed changes, the rotate speed of the generator changes with it, the frequency of the induced current in the generator stator winding changes with it as well, at that time, the working parameters of the bidirectional frequency converter 15 can be adjusted to ensure the output frequency invariant and achieve variable speed constant frequency operation. When the generator operates at the generator status, the exciting current obtained by the generator rotor winding is adjusted by adjusting the current output of the excitation control device 16, so as to achieve the adjusting on the output power of the generator. (3) When the wind speed exceeds a certain range, the connection between the excitation control device 16 and the power grid 17 is cut, that between the bidirectional frequency converter 15 and the generator is cut too, the power generation system neither consume electric energy, nor output electric energy, at the same time, the brake device can also limit the rotate speed of the generator, preventing the wind power generator being damaged.

The maintenance and detection on the vertical wind power generator are achieved by the lift system and the crane 80, and the achieving process is: the operators can reach any one generator unit 2 in the tower column 1 by the lift system, and also can reach the crane 80, the operators can operate on the hook 807 in the crane 80, and the said hook 807 connects with the hoisting mechanism 809 by the inhaul cable 808, so the position on the vertical direction of the hook 807 can be adjusted, the crane car 805 is provided on the guide rail 806, and the crane car 805 can slide on the guide rail 806, so the position on the horizontal direction of the hook 807 can be adjusted, because the rotating tower 801 can rotate 360°, hence, the operators can maintain and detect on anywhere of the vertical wind power generator without the need to additionally build a maintaining tower and other large scale equipment, greatly saving the maintenance cost and maintenance and detection time.

The Third Embodiment

The vertical wind power generator as shown in FIG. 1 to FIG. 3, includes a tower column 1, at least one generator unit 2, at least two blades 3, a first bearing 4, a second bearing 5, a third bearing 6, a first flange 7, a second flange 8, a third flange 9, a fourth flange 10, a fifth flange 11, a sixth flange 12, and a seventh flange 13, and in this embodiment, the generator unit 2 is one, the blades 3 are two, the central axis of the tower column 1 is perpendicular to the horizontal plane, and the said tower column 1 is a hollow structure.

As shown in FIG. 3 and FIG. 4, the said generator unit 2 comprises a bracket 201, a generator 202 and an exciter 203.

See FIG. 3 and FIG. 4, the said bracket 201 is comprised of an outer bracket 2011 and an inner bracket 2012, the outer bracket 2011 is provided outside the inner bracket 2012, and a bracket duct 2013 is formed between the outer bracket 2011 and the inner bracket 2012.

See FIG. 3 and FIG. 4, the said generator 202 comprises a stator 2021 and a rotor 2022, the stator 2021 is fixedly ringed on the outer wall of the tower column 1, the rotor 2022 is provided outside the stator 2021, and is fixedly installed on the inner wall of the inner bracket 2012, a generator stator winding (not shown) is provided in the stator 2021, a generator rotor winding (not shown) is provided in the rotor 2022, an air gap 14 is provided between the stator 2021 and the rotor 2022, and ducts 15 is provided in the stator 2021 and the rotor 2022; a damper winding 38 is installed on the rotor 2022, as shown in FIG. 13 and FIG. 14, the damper winding 38 comprises an end ring 381 and a damper bar 382, and the damper bar 382 is installed on the end ring 381.

See FIG. 3 and FIG. 4, the said exciter 203 comprises an exciter stator 2031 and an exciter rotor 2032, the exciter stator 2031 is fixedly ringed on the outer wall of the tower column 1, the exciter rotor 2032 is provided outside the exciter stator 2031, and is fixedly installed on the inner wall of the inner bracket 2012, an exciter stator winding (not shown) is provided in the exciter stator 2031, an exciter rotor winding (not shown) is provided in the exciter rotor 2032, there is air gap 14 between the exciter stator 2031 and the exciter rotor 2032, and the ducts 15 are provided in the said exciter stator 2031 and the exciter rotor 2032; as shown in FIG. 3 and FIG. 4, the said exciter 203 is installed above the generator 202, of course, see FIG. 16, the exciter 203 may also be installed below the generator 202.

As shown in FIG. 10, the generator stator winding links with a power grid 17 through a bidirectional frequency converter 15, the generator stator winding links with the exciter stator winding through the bidirectional frequency converter 15 and the excitation control device 16; the generator rotor winding links with the exciter rotor winding through a rotation rectifying device 161.

As shown in FIG. 3, a stator holder 2023 is provided on the lower end face of the generator stator 2021, the stator holder 2023 is fixedly ringed on the outer wall of the tower column 1, and the stator holder 2023 plays a role in bearing the stator 2021, increasing the fastness and the accuracy of the position when the stator 2021 is installed on the tower column 1; an exciter stator holder 2033 is provided on the lower end face of the exciter stator 2031, the exciter stator holder 2033 is fixedly ringed on the outer wall of the tower column 1, and the exciter stator holder 2033 plays a role in bearing the exciter stator 2031, increasing the fastness and the accuracy of the position when the exciter stator 2031 is installed on the tower column 1.

As shown in FIG. 3 and FIG. 4, the said fifth flange 11, first flange 7, first bearing 4 are successively provided below the bracket 201 from top to bottom; the upper end face of the fifth flange 11 connects with the lower end face of the bracket 201 by welding; the two cross sections on the upper end and lower end of the said first flange 7 are not equal, as shown in FIG. 4, the first flange 7 is cone platform-type, as shown in FIGS. 18 and 19, the first flange 7 is horn-type, as shown in FIG. 20, the first flange 7 is "convex"-shape, as shown in FIG. 21, the first flange 7 is stepped, of course, the first flange 7 is not limited to the above-mentioned four kinds of structure, the big end of the said first flange 7 connects with the fifth flange 11 by a bolt or welding, and the small end of the first flange 7 connects with the outer ring of the first bearing 4 by a bolt or welding or interference fit; the inner ring of the said first bearing 4 is fixedly ringed on the outer wall of the tower column 1, a first bearing holder 18 is on the lower end face of the inner ring of the first bearing 4, and the first bearing holder 18 is fixedly ringed on the outer wall of the tower column 1.

Using the first flange 7 with the cone platform type or horn type, the cross section from big end to small end of the first flange 7 is uniformly transited, significant inner stress will not produced in the first flange 7, and therefore the strength is enhanced and greater force can be withstand, at the same time, reducing the size of the outer ring of the first bearing 4 and the cost of the vertical wind power generator; using "convex"-shape or stepped, the first flange 7 can be processed using common equipment with simple processing procedure, thus reducing the processing cost and processing time of the flanges; the providing of the fifth flange 11 facilitates the connecting between the first flange 7 and the bracket 201; the said first bearing holder 18 is used to bear the first bearing 4 and all the components it acts on the first bearing 4, thus increasing the installing fastness and the accuracy of position of the first bearing 4 and also enhancing the stability of the structure of the generator.

As shown in FIG. 3 and FIG. 4, the sixth flange 12, the second flange 8 and the second bearing 5 are successively provided above the bracket 201 from top to bottom; the sixth flange 12 is connected on the upper end face of the bracket 201 by welding, the two cross sections of the upper end and the lower end of the said sixth flange 12 are not equal, as shown in FIG. 3 and FIG. 4, the second flange 8 is cone platform-type, as shown in FIG. 18 and FIG. 19, the second flange 8 is horn-type, as shown in FIG. 20, the second flange 8 is "convex"-shape, as shown in FIG. 21, the second flange 8 is stepped, of course, the second flange 8 is not limited to the abovementioned four kinds of structure, the big end of the second flange 8 is connected on the sixth flange 12 by a bolt or welding; the inner ring of the said second bearing 8 is fixedly ringed on the outer wall of the tower column 1; the said seventh flange 13 is ringed on the outer wall of the outer ring of the second bearing 5 by interference fit, and the lower end face of the seventh flange 13 is connected on the small end of the second flange 8 by a bolt or welding; a second bearing holder 19 is provided on the lower end face of the inner ring of the second bearing 5, and the second bearing holder 19 is fixedly ringed on the outer wall of the tower column 1.

Using the second flange 8 with cone platform type or horn type, the cross section from the big end to the small end of the second flange 8 is uniformly transited, significant inner stress will not produced in the second flange 8, and therefore the strength of the second flange 8 is enhanced and greater force can be withstand, at the same time, the size of the outer ring of the second bearing 5 and the cost of the vertical wind power generator are reduced; using "convex"-shape or stepped, the second flange 8 can be processed using common equipment with simple processing procedure, thus reducing the processing cost and processing time of the flanges; the providing of the sixth flange 12 facilitates the connecting between the second flange 8 and the bracket 201; the said second bearing holder 19 is used to bear the second bearing 5 and all the components it acts on the second bearing 5, thus increasing the installing fastness and the accuracy of position of the second bearing 5 and also enhancing the stability of the structure of the generator.

As shown in FIG. 3, the inner ring of the said third bearing 6 is fixedly ringed on the outer wall of the tower column 1, and is located above the second bearing 5, a third bearing holder 20 is provided on the lower end face of the inner ring of the third bearing 6, the third bearing holder 20 is fixedly ringed on the outer wall of the tower column 1, the third bearing holder 20 is used to bear the third bearing 6 and all the components it acts on the third bearing 6, thus increasing the installing fastness and the accuracy of position of the third bearing 6 and also enhancing the stability of the structure of the generator.

A third flange 9 is connected on the upper end face of the said seventh flange 13 by a bolt or welding, a fourth flange 10 is connected on the outer ring of the third bearing 6 by a bolt or welding, a connection 23 for transmitting torque is provided between the third flange 9 and the fourth flange 10, as shown in FIG. 12, the shown connection 23 is a hollow pipe, as shown in FIG. 11, the said connection 23 comprises at least two connecting rods 231, the upper ends of the said connecting rods 231 connect with the fourth flange 10, and the lower ends of the connecting rods 231 connect with the third flange 9, the said connecting rods 231 are provided on the circle, which is outside the tower column 1 and is concentric with the cross section of the tower column 1, and a reinforcing rib 232 is welded on the connecting rods 231 to enhance the strength of the connection 23; using a hollow pipe as the connection 23, its structure is simple and it is easy to manufacture, and has low manufacturing cost; and, when the hollow pipe rotates along with the third flange 9 and the fourth flange 10, it will not form rotation resistance at the hollow pipe to affect the power of the wind power generator, thus greatly increasing the power generation efficiency; using multiple connecting rods 231 as the connection, its structure is simple and the weight of the vertical wind power generator can be reduced; as shown in FIG. 3, two eighth flanges 21 are connected on the outer circle face of the third flange 9, two ninth flanges 22 are connected on the outer circle face of the fourth flange 10, the lower end of the said blade 3 connects with the third flange 9 by the eighth flange 21, the upper end of the blade 3 connects with the fourth flange 10 by the ninth flange 22. Providing the eighth flange 21 and the ninth flanges 22 facilitates the installing, dismantling and maintenance on the blade 3.

Figure 26:
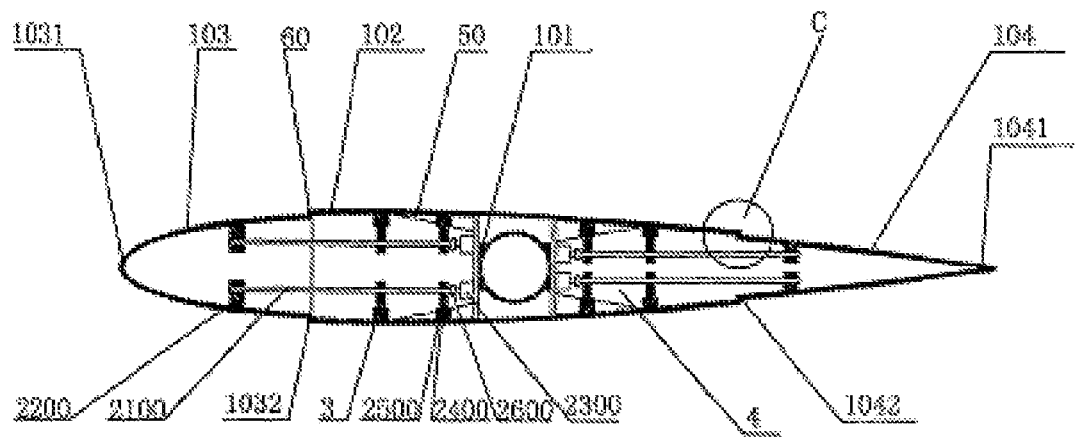
FIG. 26 is the sectional view of the third form of the blade.
Figure 27:
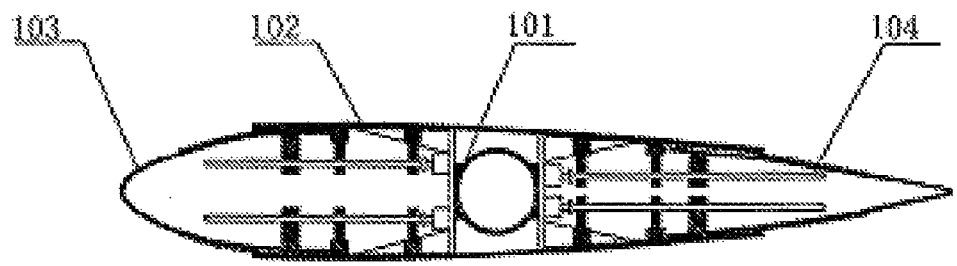
FIG. 27 is the sectional view of the third form of the blade, wherein the first blade tip and the second blade tip stretch into the blade body.
Figure 28:
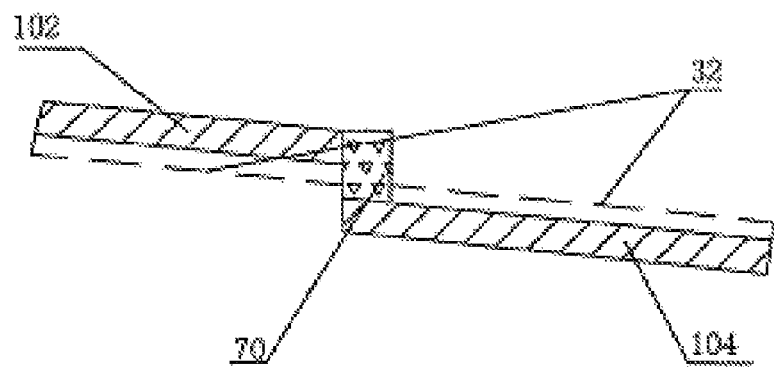
FIG. 28 is the partial enlarged view of C of FIG. 26.
Figure 29:
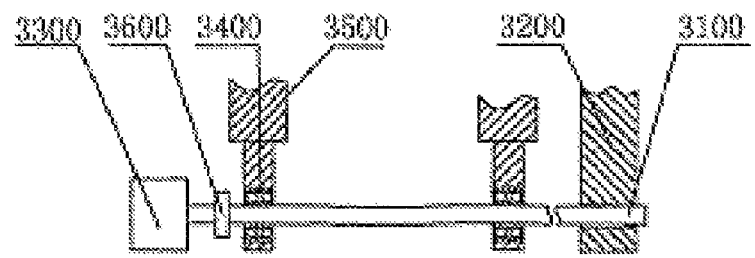
FIG. 29 is the structure diagram of the screw rod and the nut transmission system.

In the blade 3 of vertical wind power generator as shown in FIG. 5, FIG. 26 to FIG. 29, the said blade 3 is comprised of three blade units 31; as shown in FIG. 22, the cross section of the blade units 31 is olive-shaped with big middle and two small ends, and one end of the two small ends is arc-shaped and the other end is a tip, because the blade units 31 uses the kind of structure of cross section, the utilization rate of the wind power is high. The said blade units 31 include a skeleton 101, a blade body 102, a first blade tip 103 and the second blade tip 104; the blade body 102 is installed on the skeleton 103, and the skeleton 103 is located in the blade body 102; the said first blade tip 103 is provided on one end of the blade body 102 along the radial direction of the blade units 31, the tail of the first blade tip 103 is the said arc-shape, and the head 1032 of the first blade tip 103 stretches into the blade 102; the said second blade tip 104 is provided on the opposite end to the first blade tip 103 of the blade body 102 along the radial direction of the blade units 31, the tail 1041 of the second blade tip 104 is the said tip, and the head 1042 of the second blade tip 104 stretches into the blade body 102; as shown in FIG. 26 and FIG. 29, a first guide rail group (not shown) is provided between the blade body 102 and the first blade tip 103, a second guide rail group 32 is provided between the blade body 102 and the second blade tip 104; as shown in FIG. 26, between the skeleton 101 and the first blade tip 103, there provided a first moving device including a first screw rod 2100, a first nut 2200, a first motor 2300, at least two first linear bearing 2400 and a first bearing block 2500 having the same number as the first linear bearing, the said first linear bearing 2400 has two, the corresponding first bearing block 2500 also has two, the said first bearing block 2500 is installed on the blade body 102, the first linear bearing 2400 is installed in the first bearing block 2500, the said first nut 2200 is installed on the first blade tip 103, one end of the said first screw rod 2100 connects with the first motor 2300, the first screw rod 2100 passes through the first linear bearing 2400, the first screw rod 2100 engages with the first nut 2200, a first coupler 2600 is provided between the said first motor 2300 and the first screw rod 2100; as shown in FIG. 26 and FIG. 29, between the skeleton 101 and the second blade tip 104, there provided a second moving device including a second screw rod 3100, a second nut 3200, a second motor 3300, at least two second linear bearing 3400 and a second bearing block 3500 having the same number as the second linear bearing, the said second linear bearing 3400 has two, the corresponding second bearing block 3500 also has two, the said second bearing block 3500 is installed on the blade body 102, the second linear bearing 3400 is installed in the second bearing block 3500, the said second nut 3200 is installed on the second blade tip 104, one end of the said second screw rod 3100 connects with the second motor 3300, the second screw rod 3100 passes through the second linear bearing 3400, the second screw rod 3100 engages with the second nut 3200, a second coupler 3600 is provided between the said second motor 3300 and the second screw rod 3100; using the screw rod, nut and linear bearing as the moving device, the transmission precision is high. As shown in FIG. 26, a reinforcing rib 50 is also installed between the skeleton 101 and the blade body 102, thus can enhancing the connecting strength between the skeleton 101 and the blade body 102; a first seal strip 60 is installed on the end of the blade body 102 near the first blade tip 103, and a second seal strip 70 is installed on the end of the blade body 102 near the second blade tip 104, and thus the rain and dust can be prevented from going into the blade unit, when the vertical wind power generator works, the working efficiency of the vertical wind power generator will be prevented from be affected caused by the forming of convection on both ends of the cross section of the blade unit.

As shown in FIG. 4, a cooling system is provided in the generator unit 2, including a fan blade 24, a cooler 25, a seal plate 26, a fan 27, and ducts 15 provided on the generator stator 2021, rotor 2022, exciter stator 2031 and exciter rotor 2032; as shown in FIG. 15, the said fan blade 24 is installed obliquely on the outer wall of the outer bracket 2011, each fan blade 24 is arc-shape, the seal plate 26 is fixedly ringed on the outer wall of the tower column 1, is located above of the internal exciter 203 on the upper end of the inner bracket 2012, and the fan 27 is installed on the seal plate 26; the cooler 25 is installed on the seal plate 26, and is provided above the fan 27; an air outlet 29 is opened on the lower end of the inner bracket 2012, and an air inlet 33 is opened on the upper end of the inner bracket 2012, the air inlet 33 is located above the seal plate 26, and the said air outlet 29 and air inlet 33 connect with the bracket duct; an external cooler 34 is provided in the tower column 1, and the cooler 25 connects with the external cooler 34 by a liquid-feeding pipe 35 and a drainpipe 36.

As shown in FIG. 17, a crane 80 is provided on the top of the said tower column 1, the said crane 80 comprises a rotating tower 801, a crane arm 802, a balance arm 803, a balance weight 804, a crane car 805, a guide rail 806, a hook 807, an inhaul cable 808, a hoisting mechanism 809 and a controlling system (not shown). The said rotating tower 801 connects with the top of the tower column 1, the crane arm 802 and balance arm 803 are installed on the rotating tower 801, and the rotating tower 801 can rotate 360°; the balance weight 804 is installed on one end of the balance arm 803; the guide rail 806 is provided on the crane arm 802, the crane car 805 is provided on the guide rail 806, and the crane car 805 can move on the guide rail 806 front and back; the hook 807 is provided below the crane car 805, the hook 807 connects with one end of the inhaul cable 808, the other end of the inhaul cable 808 connects with the hoisting mechanism 809, and the up and down of the hook 807 is controlled by the hoisting mechanism 809. In addition, a balance arm pull rod 810 is provided between the top of the said rotating tower 801 and the balance arm 803, one end of the balance arm pull rod 810 fixedly connects with the top of the rotating tower 801, and the other end of the balance arm pull rod 810 fixedly connects with the balance arm 803; a crane arm pull rod 811 is provided between the top of the said rotating tower 801 and the crane arm 802, one end of the crane arm pull rod 811 fixedly connects with the top of the rotating tower 801, and the other end of the crane arm pull rod 811 fixedly connects with the crane arm 802; the balance arm pull rod 810 and the crane arm pull rod 811 ensure the structure stability of the crane 80 and increase the crane load of the crane 80.

As shown in FIG. 3, a lift system is provided in the said tower column 1, the said lift system is an elevator 37, and the said elevator 37 includes a lift car 371 and a lift car lift mechanism 372, the up and down of the lift car 371 is achieved by the lift car lift mechanism 372.

The outer ring of the said first bearing 4, the second bearing 5 and the third bearing 6 is provided with a brake device (not shown).

The operating process of the abovementioned vertical wind power generator mainly includes several parts, i.e., power generating of the wind power generator, the cooling on the generator, the starting of the generator as a motor, and detecting. The working principle of these several parts will be explained in the following.

The working principle of power generating of the vertical wind power generator is: the blade 3 starts to rotate by the pushing of the wind, the torque is generated after the blade 3 rotates, and the torque generated by the blade 3 is transmitted to the fourth flange 10 and to the third flange 9 by the lower end of the blade 3, at that time, the third flange 9 and the fourth flange 10 rotate with the blade 3, the torque transmitted to the fourth flange 10 is transmitted to the third flange 9 by the connection 23, the third flange 9 transmits the torque to the bracket 201 successively by the seventh flange 13, the second flange 8 and the sixth flange 12, and the bracket 201 drives the rotor 2022 and the exciter rotor 2032 to rotate, making the rotor 2022 rotate around the stator 2021, and making the exciter rotor 2032 rotate around the exciter stator 2031, in the rotating course of the exciter rotor 2032, the exciter rotor winding in the exciter rotor 2032 generates alternating current, and then the rotation rectifying device transforms the alternating current into direct current and transfers the direct current into the rotor winding of the generator rotor 2022, magnetic field is generated after the generator rotor winding is charged with direct current, because of the rotating action of the generator rotor 2022, the generator rotor winding will generate magnetic field close to sinusoidal distribution, the generator stator winding on the generator stator 2021 does the movement of cutting magnetic field line, and induces the three-phase alternating current potential in the generator stator winding, so as to achieve the purpose of power generation. In this structure, because of the providing of the third flange 9, the fourth flange 10 and the connection 23, the torque generated by the blade 3 is not only transmitted to the third flange 9, but also transmitted to the fourth flange 10, and the fourth flange 10 transmits the torque to the third flange 9 by the connection 23, balancing the force on the upper end and lower end of the blade 3, and thus making blade 3 not easy to deform, therefore, the blade 3 is not easy to be damaged, increasing the life of the vertical wind power generator. As shown in FIG. 6, in the rotating course of the blade 3, when the wind power is small, the first blade tip 103 and the second blade tip 104 are open, thus the area of the windward side of the blade 3 is big, and the power of the vertical wind power generator is big; as shown in FIG. 7, when the wind power becomes bigger, the first blade tip 103 moves toward the direction of the skeleton 101 along the first guide rail group under the action of the first moving device, and the first blade tip 103 shrinks, at the same time, the second blade tip 104 moves toward the direction of the skeleton 101 along the second guide rail group 2 under the action of the second moving device, and the second blade tip 104 shrinks, at that time, the area of the windward side of the blade 3 decreases, the power of the vertical wind power generator is automatically adjusted, using this structure, preventing the failure of the vertical wind power generator caused by its excessive power leaded by the excessive wind speed.

The working principle of the cooling system is: the fan 27 works and forms wind current, cool wind reaches the lower end of the generator by the duct 15 of the exciter rotor 2032, exciter stator 2031, rotor 2022 and stator 2021, playing the role of cooling the exciter and generator, at that time, the cool wind becomes hot wind, flows into the bracket duct 2013 by the air inlet 29, and does heat exchange with the outside air by the outer bracket 2011 at here, making the hot wind in the wind current become cool wind, and then the wind current flows into the cooler 25 by the air inlet 33, the wind current is further cooler at here and flows into the inner cavity of the wind power generator by the fan 27, forming an inner cycle. Because the fan blade 24 is provided outside the outer bracket 2011 of the rotor, and the fan blade 24 is obliquely installed on the outer wall of the outer bracket 2011, when the bracket 201 rotates, the fan blade 24 rotates along with it, at that time, the upper and lower wind pressure difference is formed on the fan blade 24, making the outside air near the generator form wind current flowing from high pressure to low pressure, that is, form an outer cycle, so the efficiency of heat exchange between the wind current in the inner cycle and the outside is increased, the cooling effect on the generator is improved and the operating life of the generator is increased.

The working process of the external cooler 34 and the cooler 25 is: the external cooler 34 transmits the cooling liquid into the cooler 25 by the liquid-feeding pipe 35, the cooling liquid does heat exchange in the cooler 25 with the wind in the inner cycle, and then becomes hot water and flows into the external cooler 34 by the drainpipe to be cooled, and the abovementioned process continues to cycle, improving the cooling effect of the wind current in the inner cycle in the cooler 25, improving the cooling effect on the generator is and increasing the operating life of the generator.

The working process of the generator used as a motor to start is: (1) the motor operates: as shown in FIG. 10, when the wind power generator is in a low wind speed or hard to start, the excitation control device 16 is disconnected from the power grid 17, the current in the exciter stator winding is zero, the generator operates in electric mode, the generator stator winding connects with the power grid 17, the power grid 17 provides alternating current to the generator stator winding by the bidirectional frequency converter 15, at that time, a rotating magnetic field is generated in the air gap 14 of the stator 2021 and the rotor 2022, a relative motion is generated between the rotating magnetic field and the generator rotor winding as well as the damper winding 38, the generator rotor winding cuts magnetic field line and generates induced electromotive force in the generator rotor winding and the damper winding 38, induced current is generated in the generator rotor winding and the damper winding 38 after the generator rotor winding and the damper winding close, the rotating magnetic field and the induced current interact and generates electromagnetic torque to make the generator rotor 2022 rotate to achieve asynchronous running, thus the problem of the wind power generator in a low wind speed or hard to start is solved. When the generator operates as a motor, the rotate speed of the generator as a motor is adjusted by adjusting the output frequency of the bidirectional frequency converter 15. (2) the generator operates: when the wind speed becomes bigger, and the rotate speed of the generator meets the cut-in wind speed, firstly, let the generate operates at the abovementioned motor status, and drive the exciter rotor 2032 to rotate, alternating current is induced from the exciter rotor winding, after the alternating current is rectified by the rotation rectifying device 161, the direct current is input into the generator rotor winding, and three-phase alternating current is induced from the generator stator winding. At that time, the bidirectional frequency converter 15 is controlled to stop working temporarily, the generator exits from working status of the motor, the torque generated by the blade 3 drives the bracket 201 to rotate, the bracket 201 drives the generator rotor 2022 and the exciter rotor 2032 to rotate, and lets the excitation control device 16 start to work, and the generator starts to operate as a synchronous generator. After transforming from the motor into the generator, the bidirectional frequency converter 15 starts to work again, and the three-phase alternating current in the generator stator winding goes through the rectifying and filtering of the bidirectional frequency converter 15, is accessed to the power grid 17, and conducts generator operation. When the wind speed changes, the rotate speed of the generator changes with it, the frequency of the induced current in the generator stator winding changes with it as well, at that time, the working parameters of the bidirectional frequency converter 15 can be adjusted to ensure the output frequency invariant and achieve variable speed constant frequency operation. When the generator operates at the generator status, the exciting current obtained by the generator rotor winding is adjusted by adjusting the current output of the excitation control device 16, so as to achieve the adjusting on the output power of the generator. (3) When the wind speed exceeds a certain range, the connection between the excitation control device 16 and the power grid 17 is cut, that between the bidirectional frequency converter 15 and the generator is cut too, the power generation system neither consume electric energy, nor output electric energy, at the same time, the brake device can also limit the rotate speed of the generator, preventing the wind power generator being damaged.

The maintenance and detection on the vertical wind power generator are achieved by the lift system and the crane 80, and the achieving process is: the operators can reach any one generator unit 2 in the tower column 1 by the lift system, and also can reach the crane 80, the operators can operate on the hook 807 in the crane 80, and the said hook 807 connects with the hoisting mechanism 809 by the inhaul cable 808, so the position on the vertical direction of the hook 807 can be adjusted, the crane car 805 is provided on the guide rail 806, and the crane car 805 can slide on the guide rail 806, so the position on the horizontal direction of the hook 807 can be adjusted, because the rotating tower 801 can rotate 360°, hence, the operators can maintain and detect on anywhere of the vertical wind power generator without the need to additionally build a maintaining tower and other large scale equipment, greatly saving the maintenance cost and maintenance and detection time.

The Fourth Embodiment

Figure 30:
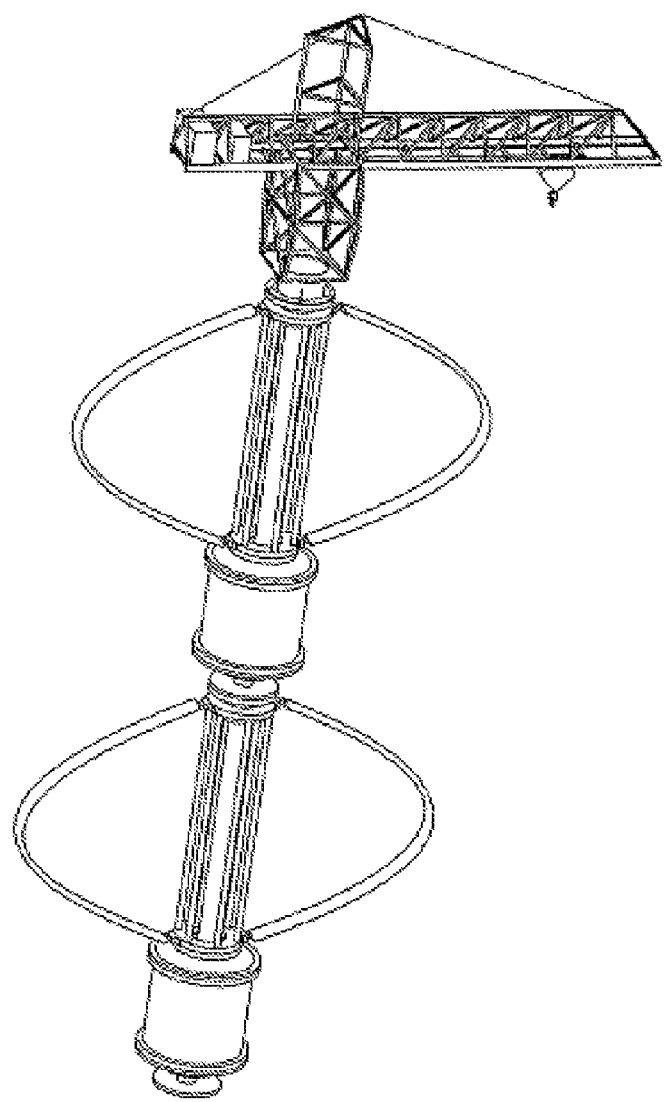
FIG. 30 is the pictorial view of two generator units.
Figure 31:
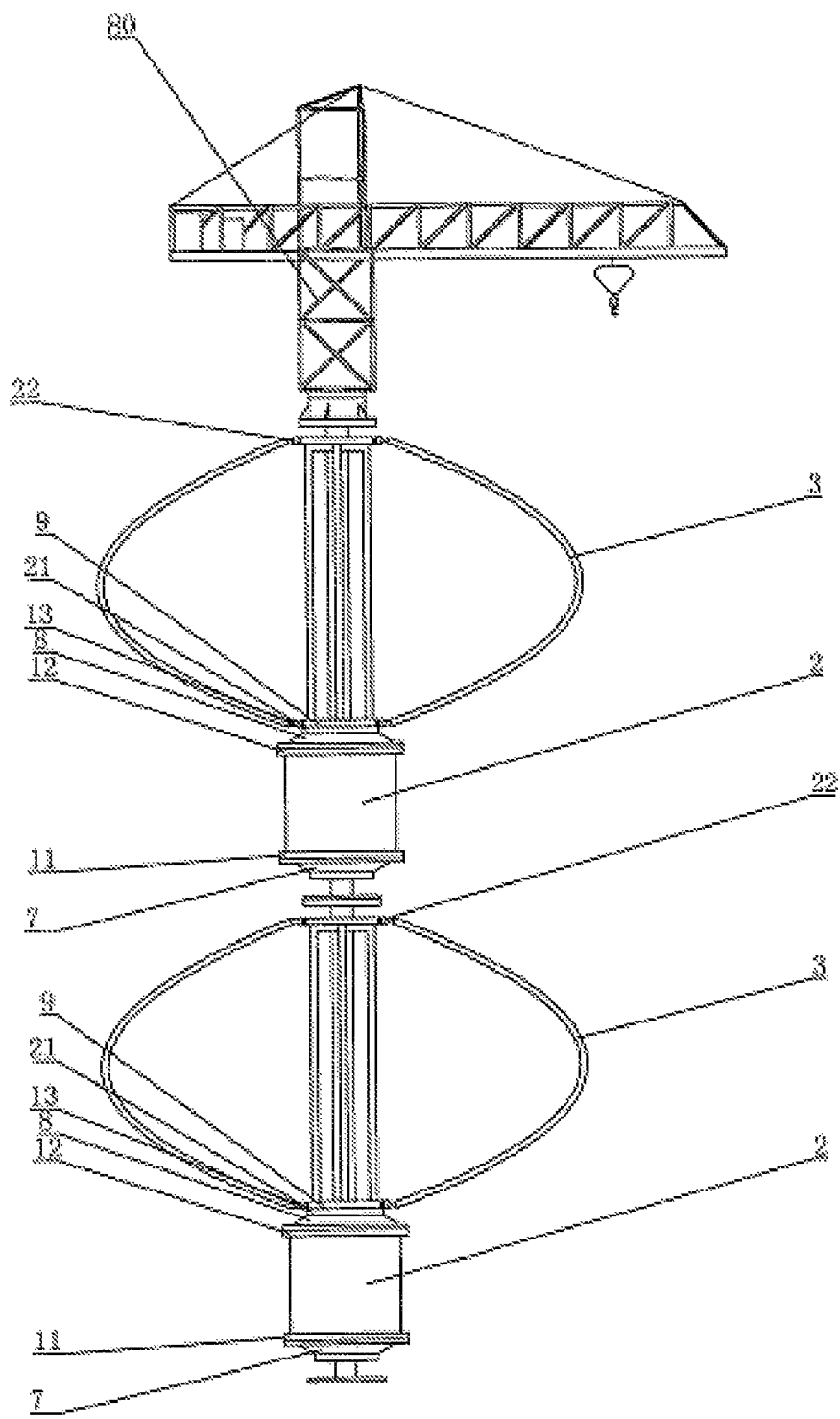
FIG. 31 is the front view of two generator units.
Figure 32:
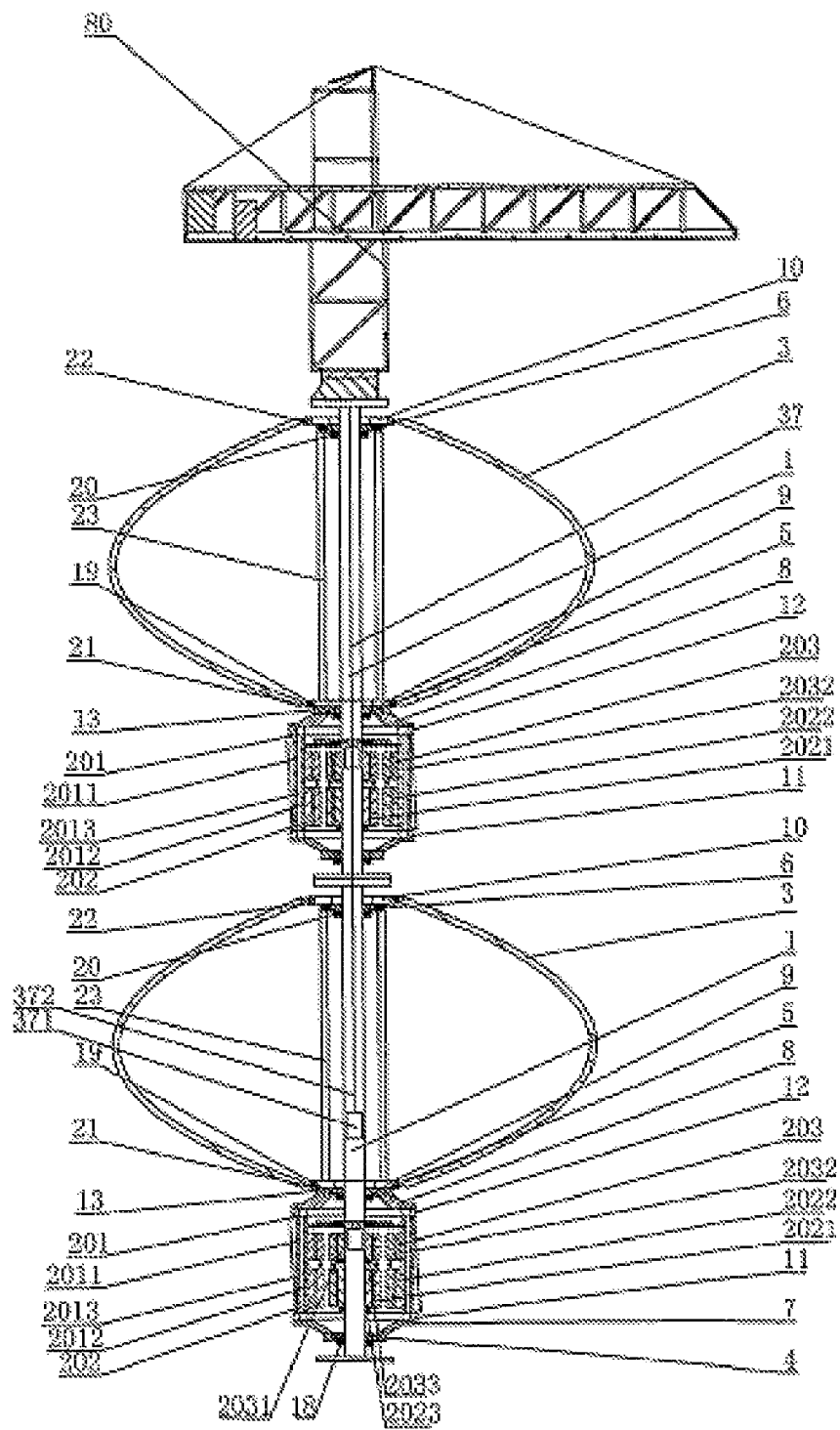
FIG. 32 is the cutaway view of two generator units.

The vertical wind power generator as shown in FIG. 30 to FIG. 32, includes a tower column 1, at least one generator unit 2, at least two blades 3, a first bearing 4, a second bearing 5, a third bearing 6, a first flange 7, a second flange 8, a third flange 9, a fourth flange 10, a fifth flange 11, a sixth flange 12, and a seventh flange 13, and in this embodiment, the generator units 2 are two, the blades 3 are two, the central axis of the tower column 1 is perpendicular to the horizontal plane, and the said tower column 1 is a hollow structure. Using two generator units 2, the generated energy is increased, and both of the two generator units 2 are installed on the tower column 1, occupied area is greatly reduced and land resources is saved.

As shown in FIG. 32 and FIG. 4, the said generator unit 2 comprises a bracket 201, a generator 202 and an exciter 203.

See FIG. 32 and FIG. 4, the said bracket 201 is comprised of an outer bracket 2011 and an inner bracket 2012, the outer bracket 2011 is provided outside the inner bracket 2012, and a bracket duct 2013 is formed between the outer bracket 2011 and the inner bracket 2012.

See FIG. 32 and FIG. 4, the said generator 202 comprises a stator 2021 and a rotor 2022, the stator 2021 is fixedly ringed on the outer wall of the tower column 1, the rotor 2022 is provided outside the stator 2021, and is fixedly installed on the inner wall of the inner bracket 2012, a generator stator winding (not shown) is provided in the stator 2021, a generator rotor winding (not shown) is provided in the rotor 2022, an air gap 14 is provided between the stator 2021 and the rotor 2022, and ducts 15 is provided in the stator 2021 and the rotor 2022; a damper winding 38 is installed on the rotor 2022, as shown in FIG. 13 and FIG. 14, the damper winding 38 comprises an end ring 381 and a damper bar 382, and the damper bar 382 is installed on the end ring 381.

See FIG. 32 and FIG. 4, the said exciter 203 comprises an exciter stator 2031 and an exciter rotor 2032, the exciter stator 2031 is fixedly ringed on the outer wall of the tower column 1, the exciter rotor 2032 is provided outside the exciter stator 2031, and is fixedly installed on the inner wall of the inner bracket 2012, an exciter stator winding (not shown) is provided in the exciter stator 2031, an exciter rotor winding (not shown) is provided in the exciter rotor 2032, there is air gap 14 between the exciter stator 2031 and the exciter rotor 2032, and the ducts 15 are provided in the said exciter stator 2031 and the exciter rotor 2032; as shown in FIG. 32, the said exciter 203 is installed above the generator 202, of course, see FIG. 16, the exciter 203 may also be installed below the generator 202.

As shown in FIG. 10, the generator stator winding links with a power grid 17 through a bidirectional frequency converter 15, the generator stator winding links with the exciter stator winding through the bidirectional frequency converter 15 and the excitation control device 16; the generator rotor winding links with the exciter rotor winding through a rotation rectifying device 161.

As shown in FIG. 32, a stator holder 2023 is provided on the lower end face of the generator stator 2021, the stator holder 2023 is fixedly ringed on the outer wall of the tower column 1, and the stator holder 2023 plays a role in bearing the stator 2021, increasing the fastness and the accuracy of the position when the stator 2021 is installed on the tower column 1; an exciter stator holder 2033 is provided on the lower end face of the exciter stator 2031, the exciter stator holder 2033 is fixedly ringed on the outer wall of the tower column 1, and the exciter stator holder 2033 plays a role in bearing the exciter stator 2031, increasing the fastness and the accuracy of the position when the exciter stator 2031 is installed on the tower column 1.

As shown in FIG. 32 and FIG. 4, the said fifth flange 11, first flange 7, first bearing 4 are successively provided below the bracket 201 from top to bottom; the upper end face of the fifth flange 11 connects with the lower end face of the bracket 201 by welding; the two cross sections on the upper end and lower end of the said first flange 7 are not equal, as shown in FIG. 4, the first flange 7 is cone platform-type, as shown in FIGS. 18 and 19, the first flange 7 is horn-type, as shown in FIG. 20, the first flange 7 is "convex"-shape, as shown in FIG. 21, the first flange 7 is stepped, of course, the first flange 7 is not limited to the above-mentioned four kinds of structure, the big end of the said first flange 7 connects with the fifth flange 11 by a bolt or welding, and the small end of the first flange 7 connects with the outer ring of the first bearing 4 by a bolt or welding or interference fit; the inner ring of the said first bearing 4 is fixedly ringed on the outer wall of the tower column 1, a first bearing holder 18 is on the lower end face of the inner ring of the first bearing 4, and the first bearing holder 18 is fixedly ringed on the outer wall of the tower column 1.

Using the first flange 7 with the cone platform type or horn type, the cross section from big end to small end of the first flange 7 is uniformly transited, significant inner stress will not produced in the first flange 7, and therefore the strength is enhanced and greater force can be withstand, at the same time, reducing the size of the outer ring of the first bearing 4 and the cost of the vertical wind power generator; using "convex"-shape or stepped, the first flange 7 can be processed using common equipment with simple processing procedure, thus reducing the processing cost and processing time of the flanges; the providing of the fifth flange 11 facilitates the connecting between the first flange 7 and the bracket 201; the said first bearing holder 18 is used to bear the first bearing 4 and all the components it acts on the first bearing 4, thus increasing the installing fastness and the accuracy of position of the first bearing 4 and also enhancing the stability of the structure of the generator.

As shown in FIG. 32 and FIG. 4, the sixth flange 12, the second flange 8 and the second bearing 5 are successively provided above the bracket 201 from top to bottom; the sixth flange 12 is connected on the upper end face of the bracket 201 by welding, the two cross sections of the upper end and the lower end of the said sixth flange 12 are not equal, as shown in FIG. 32 and FIG. 4, the second flange 8 is cone platform-type, as shown in FIG. 18 and FIG. 19, the second flange 8 is horn-type, as shown in FIG. 20, the second flange 8 is "convex"-shape, as shown in FIG. 21, the second flange 8 is stepped, of course, the second flange 8 is not limited to the abovementioned four kinds of structure, the big end of the second flange 8 is connected on the sixth flange 12 by a bolt or welding; the inner ring of the said second bearing 8 is fixedly ringed on the outer wall of the tower column 1; the said seventh flange 13 is ringed on the outer wall of the outer ring of the second bearing 5 by interference fit, and the lower end face of the seventh flange 13 is connected on the small end of the second flange 8 by a bolt or welding; a second bearing holder 19 is provided on the lower end face of the inner ring of the second bearing 5, and the second bearing holder 19 is fixedly ringed on the outer wall of the tower column 1.

Using the second flange 8 with cone platform type or horn type, the cross section from the big end to the small end of the second flange 8 is uniformly transited, significant inner stress will not produced in the second flange 8, and therefore the strength of the second flange 8 is enhanced and greater force can be withstand, at the same time, the size of the outer ring of the second bearing 5 and the cost of the vertical wind power generator are reduced; using "convex"-shape or stepped, the second flange 8 can be processed using common equipment with simple processing procedure, thus reducing the processing cost and processing time of the flanges; the providing of the sixth flange 12 facilitates the connecting between the second flange 8 and the bracket 201; the said second bearing holder 19 is used to bear the second bearing 5 and all the components it acts on the second bearing 5, thus increasing the installing fastness and the accuracy of position of the second bearing 5 and also enhancing the stability of the structure of the generator.

As shown in FIG. 32, the inner ring of the said third bearing 6 is fixedly ringed on the outer wall of the tower column 1, and is located above the second bearing 5, a third bearing holder 20 is provided on the lower end face of the inner ring of the third bearing 6, the third bearing holder 20 is fixedly ringed on the outer wall of the tower column 1, the third bearing holder 20 is used to bear the third bearing 6 and all the components it acts on the third bearing 6, thus increasing the installing fastness and the accuracy of position of the third bearing 6 and also enhancing the stability of the structure of the generator.

A third flange 9 is connected on the upper end face of the said seventh flange 13 by a bolt or welding, a fourth flange 10 is connected on the outer ring of the third bearing 6 by a bolt or welding, a connection 23 for transmitting torque is provided between the third flange 9 and the fourth flange 10, as shown in FIG. 12, the shown connection 23 is a hollow pipe, as shown in FIG. 11, the said connection 23 comprises at least two connecting rods 231, the upper ends of the said connecting rods 231 connect with the fourth flange 10, and the lower ends of the connecting rods 231 connect with the third flange 9, the said connecting rods 231 are provided on the circle, which is outside the tower column 1 and is concentric with the cross section of the tower column 1, and a reinforcing rib 232 is welded on the connecting rods 231 to enhance the strength of the connection 23; using a hollow pipe as the connection 23, its structure is simple and it is easy to manufacture, and has low manufacturing cost; and, when the hollow pipe rotates along with the third flange 9 and the fourth flange 10, it will not form rotation resistance at the hollow pipe to affect the power of the wind power generator, thus greatly increasing the power generation efficiency; using multiple connecting rods 231 as the connection, its structure is simple and the weight of the vertical wind power generator can be reduced; as shown in FIG. 32, two eighth flanges 21 are connected on the outer circle face of the third flange 9, two ninth flanges 22 are connected on the outer circle face of the fourth flange 10, the lower end of the said blade 3 connects with the third flange 9 by the eighth flange 21, the upper end of the blade 3 connects with the fourth flange 10 by the ninth flange 22. Providing the eighth flange 21 and the ninth flanges 22 facilitates the installing, dismantling and maintenance on the blade 3.

In the blade 3 of vertical wind power generator as shown in FIG. 5 and FIG. 6, the said blade 3 is comprised of three blade units 31; as shown in FIG. 6, the cross section of the blade units 31 is olive-shaped with big middle and two small ends, and one end of the two small ends is arc-shaped and the other end is a tip, because the blade units 31 uses the kind of structure of cross section, the utilization rate of the wind power is high. The said blade units 31 include a skeleton 101, a blade body 102, a first blade tip 103 and the second blade tip 104; the blade body 102 is installed on the skeleton 103, and the skeleton 103 is located in the blade body 102; the said first blade tip 103 is provided on one end of the blade body 102 along the radial direction of the blade units 31, the tail of the first blade tip 103 is the said arc-shape, and the head 1032 of the first blade tip 103 stretches into the blade 102; the said second blade tip 104 is provided on the opposite end to the first blade tip 103 of the blade body 102 along the radial direction of the blade units 31, the tail 1041 of the second blade tip 104 is the said tip, and the head 1042 of the second blade tip 104 stretches into the blade body 102; as shown in FIG. 6 and FIG. 8, a first guide rail group (not shown) is provided between the blade body 102 and the first blade tip 103, a second guide rail group 32 is provided between the blade body 102 and the second blade tip 104; a first hydraulic system 30 is provided between the skeleton 101 and the first blade tip 103, a second hydraulic system 40 is provided between the skeleton 101 and the second blade tip 104, the said first hydraulic system 30 comprises a first hydraulic pump (not shown), a first hydraulic valve (not shown), a first hydraulic pipe (not shown) and a first hydraulic cylinder 301, as shown in FIG. 9, the said first hydraulic cylinder 301 comprises a first hydraulic cylinder body 302, a first piston 303, a first piston rod 304 and a first seal device 305, the first piston 303 is installed in the first hydraulic cylinder body 302, one end of the first piston rod 304 connects with the first piston 303, and the other end connects with the first blade tip 103 together, the first hydraulic cylinder body 302 is fixed on the skeleton 101, the first seal device 305 is installed on the two ends of the first hydraulic cylinder body 302, the said second hydraulic system 40 comprises a second hydraulic pump (not shown), a second hydraulic valve (not shown), a second hydraulic pipe (not shown) and a second hydraulic cylinder 401, the said second hydraulic cylinder 401 comprises a hydraulic cylinder body 402, a second piston (not shown), a second piston rod 403 and a second seal device (not shown), the second piston is installed in the second hydraulic cylinder body 402, one end of the second piston rod 403 connects with the second piston, and the other end connects with the second blade tip 104 together, the second hydraulic cylinder body 402 is fixed on the skeleton 101, the second seal device is installed on the two ends of the second hydraulic cylinder body 402; using the hydraulic system as the moving device, its stationarity of transmission is good, and it can be used on the moving equipment with big power, and when moving, it can achieve stepless speed regulating. And because the medium in the hydraulic cylinder body is hydraulic oil, which can achieve automatically lubricating, the operating life of the hydraulic system become longer, and the operating life of the blades also become longer. A blade reinforcing rib 50 is installed between the skeleton 101 and the blade body 102, thus enhancing the connecting strength between the skeleton 101 and the blade body 102; a first seal strip 60 is installed on the end of the blade body 102 near the first blade tip 103, and a second seal strip 70 is installed on the end of the blade body 102 near the second blade tip 104, and thus the rain and dust can be prevented from going into the blade unit 31, when the vertical wind power generator works, the working efficiency of the vertical wind power generator will be prevented from be affected caused by the forming of convection on both ends of the cross section of the blade unit.

As shown in FIG. 4, a cooling system is provided in the generator unit 2, including a fan blade 24, a cooler 25, a seal plate 26, a fan 27, and ducts 15 provided on the generator stator 2021, rotor 2022, exciter stator 2031 and exciter rotor 2032; as shown in FIG. 15, the said fan blade 24 is installed obliquely on the outer wall of the outer bracket 2011, the seal plate 26 is fixedly ringed on the outer wall of the tower column 1, is located above of the internal exciter 203 on the upper end of the inner bracket 2012, and the fan 27 is installed on the seal plate 26; the cooler 25 is installed on the seal plate 26, and is provided above the fan 27; an air outlet 29 is opened on the lower end of the inner bracket 2012, and an air inlet 33 is opened on the upper end of the inner bracket 2012, the air inlet 33 is located above the seal plate 26, and the said air outlet 29 and air inlet 33 connect with the bracket duct; an external cooler 34 is provided in the tower column 1, and the cooler 25 connects with the external cooler 34 by a liquid-feeding pipe 35 and a drainpipe 36.

As shown in FIG. 17, a crane 80 is provided on the top of the said tower column 1, the said crane 80 comprises a rotating tower 801, a crane arm 802, a balance arm 803, a balance weight 804, a crane car 805, a guide rail 806, a hook 807, an inhaul cable 808, a hoisting mechanism 809 and a controlling system (not shown). The said rotating tower 801 connects with the top of the tower column 1, the crane arm 802 and balance arm 803 are installed on the rotating tower 801, and the rotating tower 801 can rotate 360°; the balance weight 804 is installed on one end of the balance arm 803; the guide rail 806 is provided on the crane arm 802, the crane car 805 is provided on the guide rail 806, and the crane car 805 can move on the guide rail 806 front and back; the hook 807 is provided below the crane car 805, the hook 807 connects with one end of the inhaul cable 808, the other end of the inhaul cable 808 connects with the hoisting mechanism 809, and the up and down of the hook 807 is controlled by the hoisting mechanism 809. In addition, a balance arm pull rod 810 is provided between the top of the said rotating tower 801 and the balance arm 803, one end of the balance arm pull rod 810 fixedly connects with the top of the rotating tower 801, and the other end of the balance arm pull rod 810 fixedly connects with the balance arm 803; a crane arm pull rod 811 is provided between the top of the said rotating tower 801 and the crane arm 802, one end of the crane arm pull rod 811 fixedly connects with the top of the rotating tower 801, and the other end of the crane arm pull rod 811 fixedly connects with the crane arm 802; the balance arm pull rod 810 and the crane arm pull rod 811 ensure the structure stability of the crane 80 and increase the crane load of the crane 80.

As shown in FIG. 32, a lift system is provided in the said tower column 1, the said lift system is an elevator 37, and the said elevator 37 includes a lift car 371 and a lift car lift mechanism 372, the up and down of the lift car 371 is achieved by the lift car lift mechanism 372.

The outer ring of the said first bearing 4, the second bearing 5 and the third bearing 6 is provided with a brake device (not shown).

The operating process of the abovementioned vertical wind power generator mainly includes several parts, i.e., power generating of the wind power generator, the cooling on the generator, the starting of the generator as a motor, and detecting. The working principle of these several parts will be explained in the following.

The working principle of power generating of the vertical wind power generator is: the blade 3 starts to rotate by the pushing of the wind, the torque is generated after the blade 3 rotates, and the torque generated by the blade 3 is transmitted to the fourth flange 10 and to the third flange 9 by the lower end of the blade 3, at that time, the third flange 9 and the fourth flange 10 rotate with the blade 3, the torque transmitted to the fourth flange 10 is transmitted to the third flange 9 by the connection 23, the third flange 9 transmits the torque to the bracket 201 successively by the seventh flange 13, the second flange 8 and the sixth flange 12, and the bracket 201 drives the rotor 2022 and the exciter rotor 2032 to rotate, making the rotor 2022 rotate around the stator 2021, and making the exciter rotor 2032 rotate around the exciter stator 2031, in the rotating course of the exciter rotor 2032, the exciter rotor winding in the exciter rotor 2032 generates alternating current, and then the rotation rectifying device transforms the alternating current into direct current and transfers the direct current into the rotor winding of the generator rotor 2022, magnetic field is generated after the generator rotor winding is charged with direct current, because of the rotating action of the generator rotor 2022, the generator rotor winding will generate magnetic field close to sinusoidal distribution, the generator stator winding on the generator stator 2021 does the movement of cutting magnetic field line, and induces the three-phase alternating current potential in the generator stator winding, so as to achieve the purpose of power generation. In this structure, because of the providing of the third flange 9, the fourth flange 10 and the connection 23, the torque generated by the blade 3 is not only transmitted to the third flange 9, but also transmitted to the fourth flange 10, and the fourth flange 10 transmits the torque to the third flange 9 by the connection 23, balancing the force on the upper end and lower end of the blade 3, and thus making blade 3 not easy to deform, therefore, the blade 3 is not easy to be damaged, increasing the life of the vertical wind power generator. As shown in FIG. 6, in the rotating course of the blade 3, when the wind power is small, the first blade tip 103 and the second blade tip 104 are open, thus the area of the windward side of the blade 3 is big, and the power of the vertical wind power generator is big; as shown in FIG. 7, when the wind power becomes bigger, the first blade tip 103 moves toward the direction of the skeleton 101 along the first guide rail group under the action of the first hydraulic system 30, and the first blade tip 103 shrinks, at the same time, the second blade tip 104 moves toward the direction of the skeleton 101 along the second guide rail group 2 under the action of the second hydraulic system 40, and the second blade tip 104 shrinks, at that time, the area of the windward side of the blade 3 decreases, the power of the vertical wind power generator is automatically adjusted, using this structure, preventing the failure of the vertical wind power generator caused by its excessive power leaded by the excessive wind speed.

The working principle of the cooling system is: the fan 27 works and forms wind current, cool wind reaches the lower end of the generator by the duct 15 of the exciter rotor 2032, exciter stator 2031, rotor 2022 and stator 2021, playing the role of cooling the exciter and generator, at that time, the cool wind becomes hot wind, flows into the bracket duct 2013 by the air inlet 29, and does heat exchange with the outside air by the outer bracket 2011 at here, making the hot wind in the wind current become cool wind, and then the wind current flows into the cooler 25 by the air inlet 33, the wind current is further cooler at here and flows into the inner cavity of the wind power generator by the fan 27, forming an inner cycle. Because the fan blade 24 is provided outside the outer bracket 2011 of the rotor, and the fan blade 24 is obliquely installed on the outer wall of the outer bracket 2011, when the bracket 201 rotates, the fan blade 24 rotates along with it, at that time, the upper and lower wind pressure difference is formed on the fan blade 24, making the outside air near the generator form wind current flowing from high pressure to low pressure, that is, form an outer cycle, so the efficiency of heat exchange between the wind current in the inner cycle and the outside is increased, the cooling effect on the generator is improved and the operating life of the generator is increased.

The working process of the external cooler 34 and the cooler 25 is: the external cooler 34 transmits the cooling liquid into the cooler 25 by the liquid-feeding pipe 35, the cooling liquid does heat exchange in the cooler 25 with the wind in the inner cycle, and then becomes hot water and flows into the external cooler 34 by the drainpipe to be cooled, and the abovementioned process continues to cycle, improving the cooling effect of the wind current in the inner cycle in the cooler 25, improving the cooling effect on the generator is and increasing the operating life of the generator.

The working process of the generator used as a motor to start is: (1) the motor operates: as shown in FIG. 10, when the wind power generator is in a low wind speed or hard to start, the excitation control device 16 is disconnected from the power grid 17, the current in the exciter stator winding is zero, the generator operates in electric mode, the generator stator winding connects with the power grid 17, the power grid 17 provides alternating current to the generator stator winding by the bidirectional frequency converter 15, at that time, a rotating magnetic field is generated in the air gap 14 of the stator 2021 and the rotor 2022, a relative motion is generated between the rotating magnetic field and the generator rotor winding as well as the damper winding 38, the generator rotor winding cuts magnetic field line and generates induced electromotive force in the generator rotor winding and the damper winding 38, induced current is generated in the generator rotor winding and the damper winding 38 after the generator rotor winding and the damper winding close, the rotating magnetic field and the induced current interact and generates electromagnetic torque to make the generator rotor 2022 rotate to achieve asynchronous running, thus the problem of the wind power generator in a low wind speed or hard to start is solved. When the generator operates as a motor, the rotate speed of the generator as a motor is adjusted by adjusting the output frequency of the bidirectional frequency converter 15. (2) the generator operates: when the wind speed becomes bigger, and the rotate speed of the generator meets the cut-in wind speed, firstly, let the generate operates at the abovementioned motor status, and drive the exciter rotor 2032 to rotate, alternating current is induced from the exciter rotor winding, after the alternating current is rectified by the rotation rectifying device 161, the direct current is input into the generator rotor winding, and three-phase alternating current is induced from the generator stator winding. At that time, the bidirectional frequency converter 15 is controlled to stop working temporarily, the generator exits from working status of the motor, the torque generated by the blade 3 drives the bracket 201 to rotate, the bracket 201 drives the generator rotor 2022 and the exciter rotor 2032 to rotate, and lets the excitation control device 16 start to work, and the generator starts to operate as a synchronous generator. After transforming from the motor into the generator, the bidirectional frequency converter 15 starts to work again, and the three-phase alternating current in the generator stator winding goes through the rectifying and filtering of the bidirectional frequency converter 15, is accessed to the power grid 17, and conducts generator operation. When the wind speed changes, the rotate speed of the generator changes with it, the frequency of the induced current in the generator stator winding changes with it as well, at that time, the working parameters of the bidirectional frequency converter 15 can be adjusted to ensure the output frequency invariant and achieve variable speed constant frequency operation. When the generator operates at the generator status, the exciting current obtained by the generator rotor winding is adjusted by adjusting the current output of the excitation control device 16, so as to achieve the adjusting on the output power of the generator. (3) When the wind speed exceeds a certain range, the connection between the excitation control device 16 and the power grid 17 is cut, that between the bidirectional frequency converter 15 and the generator is cut too, the power generation system neither consume electric energy, nor output electric energy, at the same time, the brake device can also limit the rotate speed of the generator, preventing the wind power generator being damaged.

The maintenance and detection on the vertical wind power generator are achieved by the lift system and the crane 80, and the achieving process is: the operators can reach any one generator unit 2 in the tower column 1 by the lift system, and also can reach the crane 80, the operators can operate on the hook 807 in the crane 80, and the said hook 807 connects with the hoisting mechanism 809 by the inhaul cable 808, so the position on the vertical direction of the hook 807 can be adjusted, the crane car 805 is provided on the guide rail 806, and the crane car 805 can slide on the guide rail 806, so the position on the horizontal direction of the hook 807 can be adjusted, because the rotating tower 801 can rotate 360°, hence, the operators can maintain and detect on anywhere of the vertical wind power generator without the need to additionally build a maintaining tower and other large scale equipment, greatly saving the maintenance cost and maintenance and detection time.

The Fifth Embodiment

The vertical wind power generator as shown in FIG. 32 to FIG. 32, includes a tower column 1, at least one generator unit 2, at least two blades 3, a first bearing 4, a second bearing 5, a third bearing 6, a first flange 7, a second flange 8, a third flange 9, a fourth flange 10, a fifth flange 11, a sixth flange 12, and a seventh flange 13, and in this embodiment, the generator unit 2 has two, the blades 3 are two, the central axis of the tower column 1 is perpendicular to the horizontal plane, and the said tower column 1 is a hollow structure. Using two generator units 2, the generated energy is increased, and both of the two generator units 2 are installed on the tower column 1, occupied area is greatly reduced and land resources is saved.

As shown in FIG. 32 and FIG. 4, the said generator unit 2 comprises a bracket 201, a generator 202 and an exciter 203.

See FIG. 32 and FIG. 4, the said bracket 201 is comprised of an outer bracket 2011 and an inner bracket 2012, the outer bracket 2011 is provided outside the inner bracket 2012, and a bracket duct 2013 is formed between the outer bracket 2011 and the inner bracket 2012.

See FIG. 32 and FIG. 4, the said generator 202 comprises a stator 2021 and a rotor 2022, the stator 2021 is fixedly ringed on the outer wall of the tower column 1, the rotor 2022 is provided outside the stator 2021, and is fixedly installed on the inner wall of the inner bracket 2012, a generator stator winding (not shown) is provided in the stator 2021, a generator rotor winding (not shown) is provided in the rotor 2022, an air gap 14 is provided between the stator 2021 and the rotor 2022, and ducts 15 is provided in the stator 2021 and the rotor 2022; a damper winding 38 is installed on the rotor 2022, as shown in FIG. 13 and FIG. 14, the damper winding 38 comprises an end ring 381 and a damper bar 382, and the damper bar 382 is installed on the end ring 381.

See FIG. 32 and FIG. 4, the said exciter 203 comprises an exciter stator 2031 and an exciter rotor 2032, the exciter stator 2031 is fixedly ringed on the outer wall of the tower column 1, the exciter rotor 2032 is provided outside the exciter stator 2031, and is fixedly installed on the inner wall of the inner bracket 2012, an exciter stator winding (not shown) is provided in the exciter stator 2031, an exciter rotor winding (not shown) is provided in the exciter rotor 2032, there is air gap 14 between the exciter stator 2031 and the exciter rotor 2032, and the ducts 15 are provided in the said exciter stator 2031 and the exciter rotor 2032; as shown in FIG. 32, the said exciter 203 is installed above the generator 202, of course, see FIG. 16, the exciter 203 may also be installed below the generator 202.

As shown in FIG. 10, the generator stator winding links with a power grid 17 through a bidirectional frequency converter 15, the generator stator winding links with the exciter stator winding through the bidirectional frequency converter 15 and the excitation control device 16; the generator rotor winding links with the exciter rotor winding through a rotation rectifying device 161.

As shown in FIG. 32, a stator holder 2023 is provided on the lower end face of the generator stator 2021, the stator holder 2023 is fixedly ringed on the outer wall of the tower column 1, and the stator holder 2023 plays a role in bearing the stator 2021, increasing the fastness and the accuracy of the position when the stator 2021 is installed on the tower column 1; an exciter stator holder 2033 is provided on the lower end face of the exciter stator 2031, the exciter stator holder 2033 is fixedly ringed on the outer wall of the tower column 1, and the exciter stator holder 2033 plays a role in bearing the exciter stator 2031, increasing the fastness and the accuracy of the position when the exciter stator 2031 is installed on the tower column 1.

As shown in FIG. 32 and FIG. 4, the said fifth flange 11, first flange 7, first bearing 4 are successively provided below the bracket 201 from top to bottom; the upper end face of the fifth flange 11 connects with the lower end face of the bracket 201 by welding; the two cross sections on the upper end and lower end of the said first flange 7 are not equal, as shown in FIG. 4, the first flange 7 is cone platform-type, as shown in FIGS. 18 and 19, the first flange 7 is horn-type, as shown in FIG. 20, the first flange 7 is "convex"-shape, as shown in FIG. 21, the first flange 7 is stepped, of course, the first flange 7 is not limited to the above-mentioned four kinds of structure, the big end of the said first flange 7 connects with the fifth flange 11 by a bolt or welding, and the small end of the first flange 7 connects with the outer ring of the first bearing 4 by a bolt or welding or interference fit; the inner ring of the said first bearing 4 is fixedly ringed on the outer wall of the tower column 1, a first bearing holder 18 is on the lower end face of the inner ring of the first bearing 4, and the first bearing holder 18 is fixedly ringed on the outer wall of the tower column 1.

Using the first flange 7 with the cone platform type or horn type, the cross section from big end to small end of the first flange 7 is uniformly transited, significant inner stress will not produced in the first flange 7, and therefore the strength is enhanced and greater force can be withstand, at the same time, reducing the size of the outer ring of the first bearing 4 and the cost of the vertical wind power generator; using "convex"-shape or stepped, the first flange 7 can be processed using common equipment with simple processing procedure, thus reducing the processing cost and processing time of the flanges; the providing of the fifth flange 11 facilitates the connecting between the first flange 7 and the bracket 201; the said first bearing holder 18 is used to bear the first bearing 4 and all the components it acts on the first bearing 4, thus increasing the installing fastness and the accuracy of position of the first bearing 4 and also enhancing the stability of the structure of the generator.

As shown in FIG. 32 and FIG. 4, the sixth flange 12, the second flange 8 and the second bearing 5 are successively provided above the bracket 201 from top to bottom; the sixth flange 12 is connected on the upper end face of the bracket 201 by welding, the two cross sections of the upper end and the lower end of the said sixth flange 12 are not equal, as shown in FIG. 32 and FIG. 4, the second flange 8 is cone platform-type, as shown in FIG. 18 and FIG. 19, the second flange 8 is horn-type, as shown in FIG. 20, the second flange 8 is "convex"-shape, as shown in FIG. 21, the second flange 8 is stepped, of course, the second flange 8 is not limited to the abovementioned four kinds of structure, the big end of the second flange 8 is connected on the sixth flange 12 by a bolt or welding; the inner ring of the said second bearing 8 is fixedly ringed on the outer wall of the tower column 1; the said seventh flange 13 is ringed on the outer wall of the outer ring of the second bearing 5 by interference fit, and the lower end face of the seventh flange 13 is connected on the small end of the second flange 8 by a bolt or welding; a second bearing holder 19 is provided on the lower end face of the inner ring of the second bearing 5, and the second bearing holder 19 is fixedly ringed on the outer wall of the tower column 1.

As to the second flange 8 with cone platform type or horn type, the cross section from the big end to the small end of the second flange 8 is uniformly transited, significant inner stress will not produced in the second flange 8, and therefore the strength of the second flange 8 is enhanced and greater force can be withstand, at the same time, the size of the outer ring of the second bearing 5 and the cost of the vertical wind power generator are reduced; using "convex"-shape or stepped, the second flange 8 can be processed using common equipment with simple processing procedure, thus reducing the processing cost and processing time of the flanges; the providing of the sixth flange 12 facilitates the connecting between the second flange 8 and the bracket 201; the said second bearing holder 19 is used to bear the second bearing 5 and all the components it acts on the second bearing 5, thus increasing the installing fastness and the accuracy of position of the second bearing 5 and also enhancing the stability of the structure of the generator.

As shown in FIG. 32, the inner ring of the said third bearing 6 is fixedly ringed on the outer wall of the tower column 1, and is located above the second bearing 5, a third bearing holder 20 is provided on the lower end face of the inner ring of the third bearing 6, the third bearing holder 20 is fixedly ringed on the outer wall of the tower column 1, the third bearing holder 20 is used to bear the third bearing 6 and all the components it acts on the third bearing 6, thus increasing the installing fastness and the accuracy of position of the third bearing 6 and also enhancing the stability of the structure of the generator.

A third flange 9 is connected on the upper end face of the said seventh flange 13 by a bolt or welding, a fourth flange 10 is connected on the outer ring of the third bearing 6 by a bolt or welding, a connection 23 for transmitting torque is provided between the third flange 9 and the fourth flange 10, as shown in FIG. 12, the shown connection 23 is a hollow pipe, as shown in FIG. 11, the said connection 23 comprises at least two connecting rods 231, the upper ends of the said connecting rods 231 connect with the fourth flange 10, and the lower ends of the connecting rods 231 connect with the third flange 9, the said connecting rods 231 are provided on the circle, which is outside the tower column 1 and is concentric with the cross section of the tower column 1, and a reinforcing rib 232 is welded on the connecting rods 231 to enhance the strength of the connection 23; using a hollow pipe as the connection 23, its structure is simple and it is easy to manufacture, and has low manufacturing cost; and, when the hollow pipe rotates along with the third flange 9 and the fourth flange 10, it will not form rotation resistance at the hollow pipe to affect the power of the wind power generator, thus greatly increasing the power generation efficiency; using multiple connecting rods 231 as the connection, its structure is simple and the weight of the vertical wind power generator can be reduced; as shown in FIG. 32, two eighth flanges 21 are connected on the outer circle face of the third flange 9, two ninth flanges 22 are connected on the outer circle face of the fourth flange 10, the lower end of the said blade 3 connects with the third flange 9 by the eighth flange 21, the upper end of the blade 3 connects with the fourth flange 10 by the ninth flange 22. Providing the eighth flange 21 and the ninth flanges 22 facilitates the installing, dismantling and maintenance on the blade 3.

In the blade 3 of vertical wind power generator as shown in FIG. 5, FIG. 22 to FIG. 25, the said blade 3 is comprised of three blade units 31; as shown in FIG. 22, the cross section of the blade units 31 is olive-shaped with big middle and two small ends, and one end of the two small ends is arc-shaped and the other end is a tip, because the blade units 31 uses the kind of structure of cross section, the utilization rate of the wind power is high. The said blade units 31 include a skeleton 101, a blade body 102, a first blade tip 103 and the second blade tip 104; the blade body 102 is installed on the skeleton 103, and the skeleton 103 is located in the blade body 102; the said first blade tip 103 is provided on one end of the blade body 102 along the radial direction of the blade units 31, the tail of the first blade tip 103 is the said arc-shape, and the head 1032 of the first blade tip 103 stretches into the blade 102; the said second blade tip 104 is provided on the opposite end to the first blade tip 103 of the blade body 102 along the radial direction of the blade units 31, the tail 1041 of the second blade tip 104 is the said tip, and the head 1042 of the second blade tip 104 stretches into the blade body 102; as shown in FIG. 22 and FIG. 25, a first guide rail group (not shown) is provided between the blade body 102 and the first blade tip 103, a second guide rail group 32 is provided between the blade body 102 and the second blade tip 104; a first pneumatic system 95 is provided between the skeleton 101 and the first blade tip 103, a second pneumatic system 96 is provided between the skeleton 101 and the second blade tip 104, the said first pneumatic system 95 comprises a first air compressor (not shown) and a first pneumatic cylinder 111, as shown in FIG. 25, the said first pneumatic cylinder 111 comprises a first pneumatic cylinder body 112, a first pneumatic piston 113, a first pneumatic piston rod 114 and a first pneumatic seal device 115, the first pneumatic piston 113 is installed in the first pneumatic cylinder body 112, one end of the first pneumatic piston rod 114 connects with the first pneumatic piston 113, and the other end connects with the first blade tip 103 together, the first pneumatic cylinder body 112 is fixed on the skeleton 101, the first seal device 115 is installed on the two ends of the first pneumatic cylinder body 112, the said second pneumatic system 121 comprises a second pneumatic cylinder body 122, a second pneumatic piston (not shown), a second pneumatic piston rod 123 and a second pneumatic seal device (not shown), the second pneumatic piston is installed in the second pneumatic cylinder body 122, one end of the second pneumatic seal device connects with the second pneumatic piston, and the other end connects with the second blade tip 104 together, the second pneumatic cylinder 122 is fixed on the skeleton 101 and the second seal device is installed on the two ends of the second pneumatic cylinder 122; using the pneumatic cylinder system as the moving device, because its power medium is gas, it has light weight, and the resource of the medium is rich and is pollution-free; because the viscosity of the gas is small, therefore, the resistance between the gas and pneumatic cylinder body is small. A blade reinforcing rib 50 is also installed between the skeleton 101 and the blade body 102, thus enhancing the connecting strength between the skeleton 101 and the blade body 102; a first seal strip 60 is installed on the end of the blade body 102 near the first blade tip 103, and a second seal strip 70 is installed on the end of the blade body 102 near the second blade tip 104, and thus the rain and dust can be prevented from going into the blade unit, when the vertical wind power generator works, the working efficiency of the vertical wind power generator will be prevented from be affected caused by the forming of convection on both ends of the cross section of the blade unit.

As shown in FIG. 4, a cooling system is provided in the generator unit 2, including a fan blade 24, a cooler 25, a seal plate 26, a fan 27, and ducts 15 provided on the generator stator 2021, rotor 2022, exciter stator 2031 and exciter rotor 2032; as shown in FIG. 15, the said fan blade 24 is installed obliquely on the outer wall of the outer bracket 2011, the seal plate 26 is fixedly ringed on the outer wall of the tower column 1, is located above of the internal exciter 203 on the upper end of the inner bracket 2012, and the fan 27 is installed on the seal plate 26; the cooler 25 is installed on the seal plate 26, and is provided above the fan 27; an air outlet 29 is opened on the lower end of the inner bracket 2012, and an air inlet 33 is opened on the upper end of the inner bracket 2012, the air inlet 33 is located above the seal plate 26, and the said air outlet 29 and air inlet 33 connect with the bracket duct; an external cooler 34 is provided in the tower column 1, and the cooler 25 connects with the external cooler 34 by a liquid-feeding pipe 35 and a drainpipe 36.

As shown in FIG. 17, a crane 80 is provided on the top of the said tower column 1, the said crane 80 comprises a rotating tower 801, a crane arm 802, a balance arm 803, a balance weight 804, a crane car 805, a guide rail 806, a hook 807, an inhaul cable 808, a hoisting mechanism 809 and a controlling system (not shown). The said rotating tower 801 connects with the top of the tower column 1, the crane arm 802 and balance arm 803 are installed on the rotating tower 801, and the rotating tower 801 can rotate 360°; the balance weight 804 is installed on one end of the balance arm 803; the guide rail 806 is provided on the crane arm 802, the crane car 805 is provided on the guide rail 806, and the crane car 805 can move on the guide rail 806 front and back; the hook 807 is provided below the crane car 805, the hook 807 connects with one end of the inhaul cable 808, the other end of the inhaul cable 808 connects with the hoisting mechanism 809, and the up and down of the hook 807 is controlled by the hoisting mechanism 809. In addition, a balance arm pull rod 810 is provided between the top of the said rotating tower 801 and the balance arm 803, one end of the balance arm pull rod 810 fixedly connects with the top of the rotating tower 801, and the other end of the balance arm pull rod 810 fixedly connects with the balance arm 803; a crane arm pull rod 811 is provided between the top of the said rotating tower 801 and the crane arm 802, one end of the crane arm pull rod 811 fixedly connects with the top of the rotating tower 801, and the other end of the crane arm pull rod 811 fixedly connects with the crane arm 802; the balance arm pull rod 810 and the crane arm pull rod 811 ensure the structure stability of the crane 80 and increase the crane load of the crane 80.

As shown in FIG. 32, a lift system is provided in the said tower column 1, the said lift system is an elevator 37, and the said elevator 37 includes a lift car 371 and a lift car lift mechanism 372, the up and down of the lift car 371 is achieved by the lift car lift mechanism 372.

The outer ring of the said first bearing 4, the second bearing 5 and the third bearing 6 is provided with a brake device (not shown).

The operating process of the abovementioned vertical wind power generator mainly includes several parts, i.e., power generating of the wind power generator, the cooling on the generator, the starting of the generator as a motor, and detecting. The working principle of these several parts will be explained in the following.

The working principle of power generating of the vertical wind power generator is: the blade 3 starts to rotate by the pushing of the wind, the torque is generated after the blade 3 rotates, and the torque generated by the blade 3 is transmitted to the fourth flange 10 and to the third flange 9 by the lower end of the blade 3, at that time, the third flange 9 and the fourth flange 10 rotate with the blade 3, the torque transmitted to the fourth flange 10 is transmitted to the third flange 9 by the connection 23, the third flange 9 transmits the torque to the bracket 201 successively by the seventh flange 13, the second flange 8 and the sixth flange 12, and the bracket 201 drives the rotor 2022 and the exciter rotor 2032 to rotate, making the rotor 2022 rotate around the stator 2021, and making the exciter rotor 2032 rotate around the exciter stator 2031, in the rotating course of the exciter rotor 2032, the exciter rotor winding in the exciter rotor 2032 generates alternating current, and then the rotation rectifying device transforms the alternating current into direct current and transfers the direct current into the rotor winding of the generator rotor 2022, magnetic field is generated after the generator rotor winding is charged with direct current, because of the rotating action of the generator rotor 2022, the generator rotor winding will generate magnetic field close to sinusoidal distribution, the generator stator winding on the generator stator 2021 does the movement of cutting magnetic field line, and induces the three-phase alternating current potential in the generator stator winding, so as to achieve the purpose of power generation. In this structure, because of the providing of the third flange 9, the fourth flange 10 and the connection 23, the torque generated by the blade 3 is not only transmitted to the third flange 9, but also transmitted to the fourth flange 10, and the fourth flange 10 transmits the torque to the third flange 9 by the connection 23, balancing the force on the upper end and lower end of the blade 3, and thus making blade 3 not easy to deform, therefore, the blade 3 is not easy to be damaged, increasing the life of the vertical wind power generator. As shown in FIG. 6, in the rotating course of the blade 3, when the wind power is small, the first blade tip 103 and the second blade tip 104 are open, thus the area of the windward side of the blade 3 is big, and the power of the vertical wind power generator is big; as shown in FIG. 7, when the wind power becomes bigger, the first blade tip 103 moves toward the direction of the skeleton 101 along the first guide rail group under the action of the first pneumatic system 95, and the first blade tip 103 shrinks, at the same time, the second blade tip 104 moves toward the direction of the skeleton 101 along the second guide rail group 2 under the action of the second pneumatic system 96, and the second blade tip 104 shrinks, at that time, the area of the windward side of the blade 3 decreases, the power of the vertical wind power generator is automatically adjusted, using this structure, preventing the failure of the vertical wind power generator caused by its excessive power leaded by the excessive wind speed.

The working principle of the cooling system is: the fan 27 works and forms wind current, cool wind reaches the lower end of the generator by the duct 15 of the exciter rotor 2032, exciter stator 2031, rotor 2022 and stator 2021, playing the role of cooling the exciter and generator, at that time, the cool wind becomes hot wind, flows into the bracket duct 2013 by the air inlet 29, and does heat exchange with the outside air by the outer bracket 2011 at here, making the hot wind in the wind current become cool wind, and then the wind current flows into the cooler 25 by the air inlet 33, the wind current is further cooler at here and flows into the inner cavity of the wind power generator by the fan 27, forming an inner cycle. Because the fan blade 24 is provided outside the outer bracket 2011 of the rotor, and the fan blade 24 is obliquely installed on the outer wall of the outer bracket 2011, when the bracket 201 rotates, the fan blade 24 rotates along with it, at that time, the upper and lower wind pressure difference is formed on the fan blade 24, making the outside air near the generator form wind current flowing from high pressure to low pressure, that is, form an outer cycle, so the efficiency of heat exchange between the wind current in the inner cycle and the outside is increased, the cooling effect on the generator is improved and the operating life of the generator is increased.

The working process of the external cooler 34 and the cooler 25 is: the external cooler 34 transmits the cooling liquid into the cooler 25 by the liquid-feeding pipe 35, the cooling liquid does heat exchange in the cooler 25 with the wind in the inner cycle, and then becomes hot water and flows into the external cooler 34 by the drainpipe to be cooled, and the abovementioned process continues to cycle, improving the cooling effect of the wind current in the inner cycle in the cooler 25, improving the cooling effect on the generator is and increasing the operating life of the generator.

The working process of the generator used as a motor to start is: (1) the motor operates: as shown in FIG. 10, when the wind power generator is in a low wind speed or hard to start, the excitation control device 16 is disconnected from the power grid 17, the current in the exciter stator winding is zero, the generator operates in electric mode, the generator stator winding connects with the power grid 17, the power grid 17 provides alternating current to the generator stator winding by the bidirectional frequency converter 15, at that time, a rotating magnetic field is generated in the air gap 14 of the stator 2021 and the rotor 2022, a relative motion is generated between the rotating magnetic field and the generator rotor winding as well as the damper winding 38, the generator rotor winding cuts magnetic field line and generates induced electromotive force in the generator rotor winding and the damper winding 38, induced current is generated in the generator rotor winding and the damper winding 38 after the generator rotor winding and the damper winding close, the rotating magnetic field and the induced current interact and generates electromagnetic torque to make the generator rotor 2022 rotate to achieve asynchronous running, thus the problem of the wind power generator in a low wind speed or hard to start is solved. When the generator operates as a motor, the rotate speed of the generator as a motor is adjusted by adjusting the output frequency of the bidirectional frequency converter 15. (2) the generator operates: when the wind speed becomes bigger, and the rotate speed of the generator meets the cut-in wind speed, firstly, let the generate operates at the abovementioned motor status, and drive the exciter rotor 2032 to rotate, alternating current is induced from the exciter rotor winding, after the alternating current is rectified by the rotation rectifying device 161, the direct current is input into the generator rotor winding, and three-phase alternating current is induced from the generator stator winding. At that time, the bidirectional frequency converter 15 is controlled to stop working temporarily, the generator exits from working status of the motor, the torque generated by the blade 3 drives the bracket 201 to rotate, the bracket 201 drives the generator rotor 2022 and the exciter rotor 2032 to rotate, and lets the excitation control device 16 start to work, and the generator starts to operate as a synchronous generator. After transforming from the motor into the generator, the bidirectional frequency converter 15 starts to work again, and the three-phase alternating current in the generator stator winding goes through the rectifying and filtering of the bidirectional frequency converter 15, is accessed to the power grid 17, and conducts generator operation. When the wind speed changes, the rotate speed of the generator changes with it, the frequency of the induced current in the generator stator winding changes with it as well, at that time, the working parameters of the bidirectional frequency converter 15 can be adjusted to ensure the output frequency invariant and achieve variable speed constant frequency operation. When the generator operates at the generator status, the exciting current obtained by the generator rotor winding is adjusted by adjusting the current output of the excitation control device 16, so as to achieve the adjusting on the output power of the generator. (3) When the wind speed exceeds a certain range, the connection between the excitation control device 16 and the power grid 17 is cut, that between the bidirectional frequency converter 15 and the generator is cut too, the power generation system neither consume electric energy, nor output electric energy, at the same time, the brake device can also limit the rotate speed of the generator, preventing the wind power generator being damaged.

The maintenance and detection on the vertical wind power generator are achieved by the lift system and the crane 80, and the achieving process is: the operators can reach any one generator unit 2 in the tower column 1 by the lift system, and also can reach the crane 80, the operators can operate on the hook 807 in the crane 80, and the said hook 807 connects with the hoisting mechanism 809 by the inhaul cable 808, so the position on the vertical direction of the hook 807 can be adjusted, the crane car 805 is provided on the guide rail 806, and the crane car 805 can slide on the guide rail 806, so the position on the horizontal direction of the hook 807 can be adjusted, because the rotating tower 801 can rotate 360°, hence, the operators can maintain and detect on anywhere of the vertical wind power generator without the need to additionally build a maintaining tower and other large scale equipment, greatly saving the maintenance cost and maintenance and detection time.

The Sixth Embodiment

The vertical wind power generator as shown in FIG. 30 to FIG. 32, includes a tower column 1, at least one generator unit 2, at least two blades 3, a first bearing 4, a second bearing 5, a third bearing 6, a first flange 7, a second flange 8, a third flange 9, a fourth flange 10, a fifth flange 11, a sixth flange 12, and a seventh flange 13, and in this embodiment, the generator units 2 are two, the blades 3 are two, the central axis of the tower column 1 is perpendicular to the horizontal plane, and the said tower column 1 is a hollow structure. Using two generator units 2, the generated energy is increased, and both of the two generator units 2 are installed on the tower column 1, occupied area is greatly reduced and land resources is saved.

As shown in FIG. 32 and FIG. 4, the said generator unit 2 comprises a bracket 201, a generator 202 and an exciter 203.

See FIG. 32 and FIG. 4, the said bracket 201 is comprised of an outer bracket 2011 and an inner bracket 2012, the outer bracket 2011 is provided outside the inner bracket 2012, and a bracket duct 2013 is formed between the outer bracket 2011 and the inner bracket 2012.

See FIG. 32 and FIG. 4, the said generator 202 comprises a stator 2021 and a rotor 2022, the stator 2021 is fixedly ringed on the outer wall of the tower column 1, the rotor 2022 is provided outside the stator 2021, and is fixedly installed on the inner wall of the inner bracket 2012, a generator stator winding (not shown) is provided in the stator 2021, a generator rotor winding (not shown) is provided in the rotor 2022, an air gap 14 is provided between the stator 2021 and the rotor 2022, and ducts 15 is provided in the stator 2021 and the rotor 2022; a damper winding 38 is installed on the rotor 2022, as shown in FIG. 13 and FIG. 14, the damper winding 38 comprises an end ring 381 and a damper bar 382, and the damper bar 382 is installed on the end ring 381.

See FIG. 32 and FIG. 4, the said exciter 203 comprises an exciter stator 2031 and an exciter rotor 2032, the exciter stator 2031 is fixedly ringed on the outer wall of the tower column 1, the exciter rotor 2032 is provided outside the exciter stator 2031, and is fixedly installed on the inner wall of the inner bracket 2012, an exciter stator winding (not shown) is provided in the exciter stator 2031, an exciter rotor winding (not shown) is provided in the exciter rotor 2032, there is air gap 14 between the exciter stator 2031 and the exciter rotor 2032, and the ducts 15 are provided in the said exciter stator 2031 and the exciter rotor 2032; as shown in FIG. 32, the said exciter 203 is installed above the generator 202, of course, see FIG. 16, the exciter 203 may also be installed below the generator 202.

As shown in FIG. 10, the generator stator winding links with a power grid 17 through a bidirectional frequency converter 15, the generator stator winding links with the exciter stator winding through the bidirectional frequency converter 15 and the excitation control device 16; the generator rotor winding links with the exciter rotor winding through a rotation rectifying device 161.

As shown in FIG. 32, a stator holder 2023 is provided on the lower end face of the generator stator 2021, the stator holder 2023 is fixedly ringed on the outer wall of the tower column 1, and the stator holder 2023 plays a role in bearing the stator 2021, increasing the fastness and the accuracy of the position when the stator 2021 is installed on the tower column 1; an exciter stator holder 2033 is provided on the lower end face of the exciter stator 2031, the exciter stator holder 2033 is fixedly ringed on the outer wall of the tower column 1, and the exciter stator holder 2033 plays a role in bearing the exciter stator 2031, increasing the fastness and the accuracy of the position when the exciter stator 2031 is installed on the tower column 1.

As shown in FIG. 32 and FIG. 4, the said fifth flange 11, first flange 7, first bearing 4 are successively provided below the bracket 201 from top to bottom; the upper end face of the fifth flange 11 connects with the lower end face of the bracket 201 by welding; the two cross sections on the upper end and lower end of the said first flange 7 are not equal, as shown in FIG. 4, the first flange 7 is cone platform-type, as shown in FIGS. 18 and 19, the first flange 7 is horn-type, as shown in FIG. 20, the first flange 7 is "convex"-shape, as shown in FIG. 21, the first flange 7 is stepped, of course, the first flange 7 is not limited to the above-mentioned four kinds of structure, the big end of the said first flange 7 connects with the fifth flange 11 by a bolt or welding, and the small end of the first flange 7 connects with the outer ring of the first bearing 4 by a bolt or welding or interference fit; the inner ring of the said first bearing 4 is fixedly ringed on the outer wall of the tower column 1, a first bearing holder 18 is on the lower end face of the inner ring of the first bearing 4, and the first bearing holder 18 is fixedly ringed on the outer wall of the tower column 1.

Using the first flange 7 with the cone platform type or horn type, the cross section from big end to small end of the first flange 7 is uniformly transited, significant inner stress will not produced in the first flange 7, and therefore the strength is enhanced and greater force can be withstand, at the same time, reducing the size of the outer ring of the first bearing 4 and the cost of the vertical wind power generator; using "convex"-shape or stepped, the first flange 7 can be processed using common equipment with simple processing procedure, thus reducing the processing cost and processing time of the flanges; the providing of the fifth flange 11 facilitates the connecting between the first flange 7 and the bracket 201; the said first bearing holder 18 is used to bear the first bearing 4 and all the components it acts on the first bearing 4, thus increasing the installing fastness and the accuracy of position of the first bearing 4 and also enhancing the stability of the structure of the generator.

As shown in FIG. 32 and FIG. 4, the sixth flange 12, the second flange 8 and the second bearing 5 are successively provided above the bracket 201 from top to bottom; the sixth flange 12 is connected on the upper end face of the bracket 201 by welding, the two cross sections of the upper end and the lower end of the said sixth flange 12 are not equal, as shown in FIG. 32 and FIG. 4, the second flange 8 is cone platform-type, as shown in FIG. 18 and FIG. 19, the second flange 8 is horn-type, as shown in FIG. 20, the second flange 8 is "convex"-shape, as shown in FIG. 21, the second flange 8 is stepped, of course, the second flange 8 is not limited to the abovementioned four kinds of structure, the big end of the second flange 8 is connected on the sixth flange 12 by a bolt or welding; the inner ring of the said second bearing 8 is fixedly ringed on the outer wall of the tower column 1; the said seventh flange 13 is ringed on the outer wall of the outer ring of the second bearing 5 by interference fit, and the lower end face of the seventh flange 13 is connected on the small end of the second flange 8 by a bolt or welding; a second bearing holder 19 is provided on the lower end face of the inner ring of the second bearing 5, and the second bearing holder 19 is fixedly ringed on the outer wall of the tower column 1.

Using the second flange 8 with cone platform type or horn type, the cross section from the big end to the small end of the second flange 8 is uniformly transited, significant inner stress will not produced in the second flange 8, and therefore the strength of the second flange 8 is high and greater force can be withstand, at the same time, the size of the outer ring of the second bearing 5 and the cost of the vertical wind power generator are reduced; using "convex"-shape or stepped, the second flange 8 can be processed using common equipment with simple processing procedure, thus reducing the processing cost and processing time of the flanges; the providing of the sixth flange 12 facilitates the connecting between the second flange 8 and the bracket 201; the said second bearing holder 19 is used to bear the second bearing 5 and all the components it acts on the second bearing 5, thus increasing the installing fastness and the accuracy of position of the second bearing 5 and also enhancing the stability of the structure of the generator.

As shown in FIG. 32, the inner ring of the said third bearing 6 is fixedly ringed on the outer wall of the tower column 1, and is located above the second bearing 5, a third bearing holder 20 is provided on the lower end face of the inner ring of the third bearing 6, the third bearing holder 20 is fixedly ringed on the outer wall of the tower column 1, the third bearing holder 20 is used to bear the third bearing 6 and all the components it acts on the third bearing 6, thus increasing the installing fastness and the accuracy of position of the third bearing 6 and also enhancing the stability of the structure of the generator.

A third flange 9 is connected on the upper end face of the said seventh flange 13 by a bolt or welding, a fourth flange 10 is connected on the outer ring of the third bearing 6 by a bolt or welding, a connection 23 for transmitting torque is provided between the third flange 9 and the fourth flange 10, as shown in FIG. 12, the shown connection 23 is a hollow pipe, as shown in FIG. 11, the said connection 23 comprises at least two connecting rods 231, the upper ends of the said connecting rods 231 connect with the fourth flange 10, and the lower ends of the connecting rods 231 connect with the third flange 9, the said connecting rods 231 are provided on the circle, which is outside the tower column 1 and is concentric with the cross section of the tower column 1, and a reinforcing rib 232 is welded on the connecting rods 231 to enhance the strength of the connection 23; using a hollow pipe as the connection 23, its structure is simple and it is easy to manufacture, and has low manufacturing cost; and, when the hollow pipe rotates along with the third flange 9 and the fourth flange 10, it will not form rotation resistance at the hollow pipe to affect the power of the wind power generator, thus greatly increasing the power generation efficiency; using multiple connecting rods 231 as the connection, its structure is simple and the weight of the vertical wind power generator can be reduced; as shown in FIG. 32, two eighth flanges 21 are connected on the outer circle face of the third flange 9, two ninth flanges 22 are connected on the outer circle face of the fourth flange 10, the lower end of the said blade 3 connects with the third flange 9 by the eighth flange 21, the upper end of the blade 3 connects with the fourth flange 10 by the ninth flange 22. Providing the eighth flange 21 and the ninth flanges 22 facilitates the installing, dismantling and maintenance on the blade 3.

In the blade 3 of vertical wind power generator as shown in FIG. 5, FIG. 26 to FIG. 29, the said blade 3 is comprised of three blade units 31; as shown in FIG. 22, the cross section of the blade units 31 is olive-shaped with big middle and two small ends, and one end of the two small ends is arc-shaped and the other end is a tip, because the blade units 31 uses the kind of structure of cross section, the utilization rate of the wind power is high. The said blade units 31 include a skeleton 101, a blade body 102, a first blade tip 103 and the second blade tip 104; the blade body 102 is installed on the skeleton 103, and the skeleton 103 is located in the blade body 102; the said first blade tip 103 is provided on one end of the blade body 102 along the radial direction of the blade units 31, the tail of the first blade tip 103 is the said arc-shape, and the head 1032 of the first blade tip 103 stretches into the blade 102; the said second blade tip 104 is provided on the opposite end to the first blade tip 103 of the blade body 102 along the radial direction of the blade units 31, the tail 1041 of the second blade tip 104 is the said tip, and the head 1042 of the second blade tip 104 stretches into the blade body 102; as shown in FIG. 26 and FIG. 29, a first guide rail group (not shown) is provided between the blade body 102 and the first blade tip 103, a second guide rail group 32 is provided between the blade body 102 and the second blade tip 104; as shown in FIG. 26, between the skeleton 101 and the first blade tip 103, there provided a first moving device including a first screw rod 2100, a first nut 2200, a first motor 2300, at least two first linear bearing 2400 and a first bearing block 2500 having the same number as the first linear bearing, the said first linear bearing 2400 has two, the corresponding first bearing block 2500 also has two, the said first bearing block 2500 is installed on the blade body 102, the first linear bearing 2400 is installed in the first bearing block 2500, the said first nut 2200 is installed on the first blade tip 103, one end of the said first screw rod 2100 connects with the first motor 2300, the first screw rod 2100 passes through the first linear bearing 2400, the first screw rod 2100 engages with the first nut 2200, a first coupler 2600 is provided between the said first motor 2300 and the first screw rod 2100; as shown in FIG. 26 and FIG. 29, between the skeleton 101 and the second blade tip 104, there provided a second moving device including a second screw rod 3100, a second nut 3200, a second motor 3300, at least two second linear bearing 3400 and a second bearing block 3500 having the same number as the second linear bearing, the said second linear bearing 3400 has two, the corresponding second bearing block 3500 also has two, the said second bearing block 3500 is installed on the blade body 102, the second linear bearing 3400 is installed in the second bearing block 3500, the said second nut 3200 is installed on the second blade tip 104, one end of the said second screw rod 3100 connects with the second motor 3300, the second screw rod 3100 passes through the second linear bearing 3400, the second screw rod 3100 engages with the second nut 3200, a second coupler 3600 is provided between the said second motor 3300 and the second screw rod 3100; using the screw rod, nut and linear bearing as the moving device, the transmission precision is high. As shown in FIG. 26, a reinforcing rib 50 is also installed between the skeleton 101 and the blade body 102, thus can enhancing the connecting strength between the skeleton 101 and the blade body 102; a first seal strip 60 is installed on the end of the blade body 102 near the first blade tip 103, and a second seal strip 70 is installed on the end of the blade body 102 near the second blade tip 104, and thus the rain and dust can be prevented from going into the blade unit, when the vertical wind power generator works, the working efficiency of the vertical wind power generator will be prevented from be affected caused by the forming of convection on both ends of the cross section of the blade unit.

As shown in FIG. 4, a cooling system is provided in the generator unit 2, including a fan blade 24, a cooler 25, a seal plate 26, a fan 27, and ducts 15 provided on the generator stator 2021, rotor 2022, exciter stator 2031 and exciter rotor 2032; as shown in FIG. 15, the said fan blade 24 is installed obliquely on the outer wall of the outer bracket 2011, each fan blade 24 is arc-shape, the seal plate 26 is fixedly ringed on the outer wall of the tower column 1, is located above of the internal exciter 203 on the upper end of the inner bracket 2012, and the fan 27 is installed on the seal plate 26; the cooler 25 is installed on the seal plate 26, and is provided above the fan 27; an air outlet 29 is opened on the lower end of the inner bracket 2012, and an air inlet 33 is opened on the upper end of the inner bracket 2012, the air inlet 33 is located above the seal plate 26, and the said air outlet 29 and air inlet 33 connect with the bracket duct; an external cooler 34 is provided in the tower column 1, and the cooler 25 connects with the external cooler 34 by a liquid-feeding pipe 35 and a drainpipe 36.

As shown in FIG. 17, a crane 80 is provided on the top of the said tower column 1, the said crane 80 comprises a rotating tower 801, a crane arm 802, a balance arm 803, a balance weight 804, a crane car 805, a guide rail 806, a hook 807, an inhaul cable 808, a hoisting mechanism 809 and a controlling system (not shown). The said rotating tower 801 connects with the top of the tower column 1, the crane arm 802 and balance arm 803 are installed on the rotating tower 801, and the rotating tower 801 can rotate 360°; the balance weight 804 is installed on one end of the balance arm 803; the guide rail 806 is provided on the crane arm 802, the crane car 805 is provided on the guide rail 806, and the crane car 805 can move on the guide rail 806 front and back; the hook 807 is provided below the crane car 805, the hook 807 connects with one end of the inhaul cable 808, the other end of the inhaul cable 808 connects with the hoisting mechanism 809, and the up and down of the hook 807 is controlled by the hoisting mechanism 809. In addition, a balance arm pull rod 810 is provided between the top of the said rotating tower 801 and the balance arm 803, one end of the balance arm pull rod 810 fixedly connects with the top of the rotating tower 801, and the other end of the balance arm pull rod 810 fixedly connects with the balance arm 803; a crane arm pull rod 811 is provided between the top of the said rotating tower 801 and the crane arm 802, one end of the crane arm pull rod 811 fixedly connects with the top of the rotating tower 801, and the other end of the crane arm pull rod 811 fixedly connects with the crane arm 802; the balance arm pull rod 810 and the crane arm pull rod 811 ensure the structure stability of the crane 80 and increase the crane load of the crane 80.

As shown in FIG. 32, a lift system is provided in the said tower column 1, the said lift system is an elevator 37, and the said elevator 37 includes a lift car 371 and a lift car lift mechanism 372, the up and down of the lift car 371 is achieved by the lift car lift mechanism 372.

The outer ring of the said first bearing 4, the second bearing 5 and the third bearing 6 is provided with a brake device (not shown).

The operating process of the abovementioned vertical wind power generator mainly includes several parts, i.e., power generating of the wind power generator, the cooling on the generator, the starting of the generator as a motor, and detecting. The working principle of these several parts will be explained in the following.

The working principle of power generating of the vertical wind power generator is: the blade 3 starts to rotate by the pushing of the wind, the torque is generated after the blade 3 rotates, and the torque generated by the blade 3 is transmitted to the fourth flange 10 and to the third flange 9 by the lower end of the blade 3, at that time, the third flange 9 and the fourth flange 10 rotate with the blade 3, the torque transmitted to the fourth flange 10 is transmitted to the third flange 9 by the connection 23, the third flange 9 transmits the torque to the bracket 201 successively by the seventh flange 13, the second flange 8 and the sixth flange 12, and the bracket 201 drives the rotor 2022 and the exciter rotor 2032 to rotate, making the rotor 2022 rotate around the stator 2021, and making the exciter rotor 2032 rotate around the exciter stator 2031, in the rotating course of the exciter rotor 2032, the exciter rotor winding in the exciter rotor 2032 generates alternating current, and then the rotation rectifying device transforms the alternating current into direct current and transfers the direct current into the rotor winding of the generator rotor 2022, magnetic field is generated after the generator rotor winding is charged with direct current, because of the rotating action of the generator rotor 2022, the generator rotor winding will generate magnetic field close to sinusoidal distribution, the generator stator winding on the generator stator 2021 does the movement of cutting magnetic field line, and induces the three-phase alternating current potential in the generator stator winding, so as to achieve the purpose of power generation. In this structure, because of the providing of the third flange 9, the fourth flange 10 and the connection 23, the torque generated by the blade 3 is not only transmitted to the third flange 9, but also transmitted to the fourth flange 10, and the fourth flange 10 transmits the torque to the third flange 9 by the connection 23, balancing the force on the upper end and lower end of the blade 3, and thus making blade 3 not easy to deform, therefore, the blade 3 is not easy to be damaged, increasing the life of the vertical wind power generator. As shown in FIG. 6, in the rotating course of the blade 3, when the wind power is small, the first blade tip 103 and the second blade tip 104 are open, thus the area of the windward side of the blade 3 is big, and the power of the vertical wind power generator is big; as shown in FIG. 7, when the wind power becomes bigger, the first blade tip 103 moves toward the direction of the skeleton 101 along the first guide rail group under the action of the first moving device, and the first blade tip 103 shrinks, at the same time, the second blade tip 104 moves toward the direction of the skeleton 101 along the second guide rail group 2 under the action of the second moving device, and the second blade tip 104 shrinks, at that time, the area of the windward side of the blade 3 decreases, the power of the vertical wind power generator is automatically adjusted, using this structure, preventing the failure of the vertical wind power generator caused by its excessive power leaded by the excessive wind speed.

The working principle of the cooling system is: the fan 27 works and forms wind current, cool wind reaches the lower end of the generator by the duct 15 of the exciter rotor 2032, exciter stator 2031, rotor 2022 and stator 2021, playing the role of cooling the exciter and generator, at that time, the cool wind becomes hot wind, flows into the bracket duct 2013 by the air inlet 29, and does heat exchange with the outside air by the outer bracket 2011 at here, making the hot wind in the wind current become cool wind, and then the wind current flows into the cooler 25 by the air inlet 33, the wind current is further cooler at here and flows into the inner cavity of the wind power generator by the fan 27, forming an inner cycle. Because the fan blade 24 is provided outside the outer bracket 2011 of the rotor, and the fan blade 24 is obliquely installed on the outer wall of the outer bracket 2011, when the bracket 201 rotates, the fan blade 24 rotates along with it, at that time, the upper and lower wind pressure difference is formed on the fan blade 24, making the outside air near the generator form wind current flowing from high pressure to low pressure, that is, form an outer cycle, so the efficiency of heat exchange between the wind current in the inner cycle and the outside is increased, the cooling effect on the generator is improved and the operating life of the generator is increased.

The working process of the external cooler 34 and the cooler 25 is: the external cooler 34 transmits the cooling liquid into the cooler 25 by the liquid-feeding pipe 35, the cooling liquid does heat exchange in the cooler 25 with the wind in the inner cycle, and then becomes hot water and flows into the external cooler 34 by the drainpipe to be cooled, and the abovementioned process continues to cycle, improving the cooling effect of the wind current in the inner cycle in the cooler 25, improving the cooling effect on the generator is and increasing the operating life of the generator.

The working process of the generator used as a motor to start is: (1) the motor operates: as shown in FIG. 10, when the wind power generator is in a low wind speed or hard to start, the excitation control device 16 is disconnected from the power grid 17, the current in the exciter stator winding is zero, the generator operates in electric mode, the generator stator winding connects with the power grid 17, the power grid 17 provides alternating current to the generator stator winding by the bidirectional frequency converter 15, at that time, a rotating magnetic field is generated in the air gap 14 of the stator 2021 and the rotor 2022, a relative motion is generated between the rotating magnetic field and the generator rotor winding as well as the damper winding 38, the generator rotor winding cuts magnetic field line and generates induced electromotive force in the generator rotor winding and the damper winding 38, induced current is generated in the generator rotor winding and the damper winding 38 after the generator rotor winding and the damper winding close, the rotating magnetic field and the induced current interact and generates electromagnetic torque to make the generator rotor 2022 rotate to achieve asynchronous running, thus the problem of the wind power generator in a low wind speed or hard to start is solved. When the generator operates as a motor, the rotate speed of the generator as a motor is adjusted by adjusting the output frequency of the bidirectional frequency converter 15. (2) the generator operates: when the wind speed becomes bigger, and the rotate speed of the generator meets the cut-in wind speed, firstly, let the generate operates at the abovementioned motor status, and drive the exciter rotor 2032 to rotate, alternating current is induced from the exciter rotor winding, after the alternating current is rectified by the rotation rectifying device 161, the direct current is input into the generator rotor winding, and three-phase alternating current is induced from the generator stator winding. At that time, the bidirectional frequency converter 15 is controlled to stop working temporarily, the generator exits from working status of the motor, the torque generated by the blade 3 drives the bracket 201 to rotate, the bracket 201 drives the generator rotor 2022 and the exciter rotor 2032 to rotate, and lets the excitation control device 16 start to work, and the generator starts to operate as a synchronous generator. After transforming from the motor into the generator, the bidirectional frequency converter 15 starts to work again, and the three-phase alternating current in the generator stator winding goes through the rectifying and filtering of the bidirectional frequency converter 15, is accessed to the power grid 17, and conducts generator operation. When the wind speed changes, the rotate speed of the generator changes with it, the frequency of the induced current in the generator stator winding changes with it as well, at that time, the working parameters of the bidirectional frequency converter 15 can be adjusted to ensure the output frequency invariant and achieve variable speed constant frequency operation. When the generator operates at the generator status, the exciting current obtained by the generator rotor winding is adjusted by adjusting the current output of the excitation control device 16, so as to achieve the adjusting on the output power of the generator. (3) When the wind speed exceeds a certain range, the connection between the excitation control device 16 and the power grid 17 is cut, that between the bidirectional frequency converter 15 and the generator is cut too, the power generation system neither consume electric energy, nor output electric energy, at the same time, the brake device can also limit the rotate speed of the generator, preventing the wind power generator being damaged.

The maintenance and detection on the vertical wind power generator are achieved by the lift system and the crane 80, and the achieving process is: the operators can reach any one generator unit 2 in the tower column 1 by the lift system, and also can reach the crane 80, the operators can operate on the hook 807 in the crane 80, and the said hook 807 connects with the hoisting mechanism 809 by the inhaul cable 808, so the position on the vertical direction of the hook 807 can be adjusted, the crane car 805 is provided on the guide rail 806, and the crane car 805 can slide on the guide rail 806, so the position on the horizontal direction of the hook 807 can be adjusted, because the rotating tower 801 can rotate 360°, hence, the operators can maintain and detect on anywhere of the vertical wind power generator without the need to additionally build a maintaining tower and other large scale equipment, greatly saving the maintenance cost and maintenance and detection time.

The invention claimed is:

1. A vertical wind power generator, comprising a tower column, at least one generator unit and at least two blades;
   is characterized in that: a central axis of the tower column is perpendicular to a horizontal plane;
   the at least one generator unit includes a bracket, a generator and an exciter;
   the bracket includes an outer bracket and an inner bracket;
   the generator includes a stator and a rotor, the stator is fixedly ringed on the tower column, the rotor is provided outside of the stator and is fixedly provided on the inner bracket, a generator stator winding is provided on the stator, and a generator rotor winding is provided on the rotor;
   the exciter includes an exciter stator and an exciter rotor, the exciter stator is fixedly ringed on the tower column, the exciter rotor is provided outside of the exciter stator and is fixedly provided on the inner bracket, an exciter stator winding is provided on the exciter stator, and an exciter rotor winding is provided on the exciter rotor;

an excitation control device and a rotation rectifying device are provided inside the bracket, the generator stator winding links with the exciter stator winding through the excitation control device, and the generator rotor winding links with the exciter rotor winding through the rotation rectifying device; the generator stator winding is linked with one end of a bidirectional frequency converter; the other end of the bidirectional frequency converter is linked with a power grid, and linked with the excitation control device;

a lower end of the bracket is provided with a first flange with different cross sections on an upper end and a lower end of the first flange, the lower end of the first flange is provided with a first bearing, an outer ring of the first bearing connects with a small end of the first flange, an inner ring of the first bearing is fixedly ringed on the tower column, and a big end of the first flange connects with the lower end of the bracket;

an upper end of the bracket is provided with a second flange with different cross sections on an upper end and a lower end of the second flange, the upper end of the second flange is provided with a second bearing, an outer ring of the second bearing connects with a small end of the second flange, an inner ring of the second bearing is fixedly ringed on the tower column, and a big end of the second flange connects with the upper end of the bracket;

a third bearing is provided above the second bearing and an inner ring of the third bearing is fixedly ringed on the tower column;

each of the at least two blades includes at least one blade unit; a cross section of the blade unit is olive-shaped with big middle and two small ends, and one end of the two small ends is arc-shaped and the other end is a tip; the blade unit includes a skeleton and a blade body, the blade body is installed on the skeleton, one end of the blade body is provided with a first blade tip and the other end of the blade body is provided with a second blade tip on a radial direction of the blade unit, a tail of the first blade tip is the arc shape of the blade unit, the tail of the second blade tip is the tip of the blade unit, a head of the first blade tip stretches into the blade body, and the head of the second blade tip stretches into the blade body; a first moving device, which drives the first blade tip to move along the radial direction of the blade unit, is provided between the skeleton and the first blade tip, and, a second moving device, which drives the second blade tip to move along the radial direction of the blade unit, is provided between the skeleton and the second blade tip; a first guide rail group is provided between the first blade tip and the blade body, a second guide rail group is provided between the second blade tip and the blade body, and the blade unit after connected is arc-shaped; an upper end of the blade connects with an outer ring of the third bearing, and a lower end of the blade connects with the outer ring of the second bearing;

a cooling system is provided on the generator unit, the cooling system includes a fan blade, a cooler, a seal plate and a fan; a bracket duct is provided between the outer bracket and the inner bracket; a duct is provided on the stator, the rotor, the exciter stator and the exciter rotor; an air outlet is provided on a lower end of the inner bracket, and an air inlet is provided on an upper end of the inner bracket; the bracket duct connects with the air outlet and the air inlet; the fan blade is provided obliquely on an outer wall of the outer bracket; the seal plate is provided on the tower column, and is located in the upper end of the inner bracket; the fan is provided on the seal plate, and the cooler is provided above the fan;

a crane is provided on a top of the tower column; and wherein the tower column is a hollow tower column, and a lift system is provided in the tower column.

2. The vertical wind power generator according to claim 1 is characterized in that: a third flange is provided above the second flange on the tower column, and the third flange connects with the second flange; a fourth flange is provided above the third flange on the tower column, and the fourth flange connects with the outer ring of the third bearing; a connection for transmitting torque is provided between the third flange and the fourth flange, an upper end of the connection connects with the fourth flange, and a lower end of the connection connects with the third flange; the upper end of the blade connects with the fourth flange, and the lower end of the blade connects with the third flange.

3. The vertical wind power generator according to claim 2 is characterized in that: the connection is a hollow pipe, the hollow pipe is ringed outside the tower column, an upper end of the hollow pipe connects with the fourth flange, and a lower end of the hollow pipe connects with the third flange.

4. The vertical wind power generator according to claim 2 is characterized in that: the connection includes at least two connecting rods, an upper end of the connecting rods connects with the fourth flange, a lower end of the connecting rods connects with the third flange, and the connecting rod is provided on the circle, which is outside the tower column and is concentric with a cross section of the tower column; a reinforcing rib is provided along a direction of the cross section of the tower column on the connecting rods.

5. The vertical wind power generator according to claim 1 is characterized in that: a stator holder is provided on a lower end face of the stator, and the stator holder is fixedly ringed on the tower column; an exciter stator holder is provided on a lower end face of the exciter stator, and the exciter stator holder is fixedly ringed on the tower column; a first bearing holder is provided on a lower end face of the inner ring of the first bearing, and the first bearing holder is fixedly ringed on the tower column; a second bearing holder is provided on a lower end face of the inner ring of the second bearing, and the second bearing holder is fixedly ringed on the tower column; a third bearing holder is provided on a lower end face of the inner ring of the third bearing, and the third bearing holder is fixedly ringed on the tower column.

6. The vertical wind power generator according to claim 1 is characterized in that: a damper winding are provided on the rotor, the damper winding include an end ring and a damper bar, and the damper bar is installed on the end ring.

7. The vertical wind power generator according to claim 1 is characterized in that: the first flange is cone platform-type, horn-type, "convex"-shape or stepped; the second flange is cone platform-type, horn-type, "convex"-shape or stepped.

8. The vertical wind power generator according to claim 1 is characterized in that: a fifth flange is provided between the bracket and the first flange, an upper end face of the fifth flange connects with the bracket, and a lower end face of the fifth flange connects with the big end of the first flange; a sixth flange is provided between the bracket and the second flange, an upper end face of the sixth flange connects with the big end of the second flange, and a lower end face of the sixth flange connects with the bracket; a seventh flange is ringed outside the outer ring of the second bearing, an upper end face of the seventh flange connects with the third flange, and a lower end face connects with the small end of the second flange.

9. The vertical wind power generator according to claim 2 is characterized in that: an eighth flange is provided between the lower end of the blade and the third flange and a ninth flange is provided between the upper end of the blade and the fourth flange.

10. The vertical wind power generator according to claim 1 is characterized in that: the first moving device is a first hydraulic system, and the second moving device is a second hydraulic system; the first hydraulic system includes a first hydraulic pump, a first hydraulic valve, a first hydraulic pipe and a first hydraulic cylinder; the first hydraulic cylinder includes a first hydraulic cylinder body, a first piston, a first piston rod and a first seal device, the first hydraulic cylinder body connects with the skeleton far from one end of the first piston rod, and the first piston rod connects with the first blade tip far from one end of the first hydraulic cylinder body; the second hydraulic system includes a second hydraulic pump, a second hydraulic valve, a second hydraulic pipe and a second hydraulic cylinder; the second hydraulic cylinder includes a second hydraulic cylinder body, a second piston, a second piston rod and a second seal device, the second hydraulic cylinder body connects with the skeleton far from one end of the second piston rod, and the second piston rod connects with the second blade tip far from one end of the second hydraulic cylinder body.

11. The vertical wind power generator according to claim 1 is characterized in that: the first moving device is a first pneumatic system, the first pneumatic system includes a first air compressor and a first pneumatic cylinder, the first pneumatic cylinder includes a first pneumatic cylinder body, a first pneumatic piston, a first pneumatic piston rod and a first pneumatic seal device, the first pneumatic cylinder body is installed on the skeleton, and the first pneumatic piston rod connects with the first blade tip far from one end of the first pneumatic cylinder body; the second moving device is a second pneumatic system, the second pneumatic system includes a second air compressor and a second pneumatic cylinder, the second pneumatic cylinder includes a second pneumatic cylinder body, a second pneumatic piston, a second pneumatic piston rod and a second pneumatic seal device, the second pneumatic cylinder body is installed on the skeleton, and the second pneumatic piston rod connects with the second blade tip far from one end of the second pneumatic cylinder body.

12. The vertical wind power generator according to claim 1 is characterized in that: the first moving device includes a first screw rod, a first nut, a first motor, at least two first linear bearing and first bearing block, the first bearing block is installed on the blade body, the first linear bearing is installed on the first bearing block, the first nut is installed on the first blade tip, one end of the first screw rod connects with the first motor, the first screw rod engages with the first nut, and a first coupler is provided between the first motor and the first screw rod; the second moving device includes a second screw rod, a second nut, a second motor, at least two second linear bearing and second bearing block, the second bearing block is installed on the blade body, the second linear bearing is installed on the second bearing block, the second nut is installed on the second blade tip, one end of the second screw rod connects with the second motor, the second screw rod engages with the second nut, and a second coupler is provided between the second motor and the second screw rod.

13. The vertical wind power generator according to claim 1 is characterized in that: a first seal strip is provided on the end of the blade body near the first blade tip, and a second seal strip is provided on the end of the blade body near the second blade tip; a blade reinforcing rib is provided between the skeleton and the blade body.

14. The vertical wind power generator according to claim 1 is characterized in that: an external cooler is connected on the cooler, and the external cooler is provided in the tower column.

15. The vertical wind power generator according to claim 1 is characterized in that: the crane comprises a rotating tower, a crane arm, a balance arm, a balance weight, a crane car, a car running mechanism, a hook, an inhaul cable, a hoisting mechanism and a controlling system; the rotating tower is provided on the top of the tower column, the crane arm and the balance arm are installed on the rotating tower, the balance weight is installed on one end of the balance arm, the car running mechanism is provided on the crane arm, the crane car is provided on the car running mechanism, the hook is provided below the crane car, the hook connects with one end of the inhaul cable, and the other end of the inhaul cable connects with the hoisting mechanism; the car running mechanism is a guide rail provided on the crane arm, and the crane car is provided on the guide rail; a balance arm pull rod is provided between the top of the rotating tower and the balance arm, one end of the balance arm pull rod fixedly connects with the top of the rotating tower, and the other end of the balance arm pull rod fixedly connects with the balance arm; a crane arm pull rod is provided between the top of the rotating tower and the crane arm, one end of the crane arm pull rod fixedly connects with the top of the rotating tower, and the other end of the crane arm pull rod fixedly connects with the crane arm.

16. The vertical wind power generator according to claim 1 is characterized in that: the lift system is an elevator, and the elevator includes a lift car and a lift car lift mechanism.

17. The vertical wind power generator according to claim 1 is characterized in that: a brake device is provided on the outer rings of the first bearing, the second bearing and the third bearing.

* * * * *